US012607848B2

(12) United States Patent
Jarvenpaa et al.

(10) Patent No.: US 12,607,848 B2
(45) Date of Patent: Apr. 21, 2026

(54) OPTICAL APPARATUS, OPTICAL MODULES, OPTICAL DEVICES AND METHODS

(71) Applicant: Nokia Technologies Oy, Espoo (FI)

(72) Inventors: Toni Johan Jarvenpaa, Akaa (FI); Marja Pauliina Salmimaa, Tampere (FI); Jyrki Sakari Kimmel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 320 days.

(21) Appl. No.: 18/293,422

(22) PCT Filed: Jul. 14, 2022

(86) PCT No.: PCT/EP2022/069740
§ 371 (c)(1),
(2) Date: Jan. 30, 2024

(87) PCT Pub. No.: WO2023/011882
PCT Pub. Date: Feb. 9, 2023

(65) Prior Publication Data
US 2024/0337834 A1     Oct. 10, 2024

(30) Foreign Application Priority Data
Aug. 2, 2021     (EP) ..................................... 21189149

(51) Int. Cl.
*G02B 27/01*          (2006.01)
*G02B 6/34*           (2006.01)
(52) U.S. Cl.
CPC ........... *G02B 27/0101* (2013.01); *G02B 6/34* (2013.01); *G02B 2027/0123* (2013.01)

(58) Field of Classification Search
None
See application file for complete search history.

(56) References Cited

U.S. PATENT DOCUMENTS

2006/0132914 A1* 6/2006 Weiss ...................... G02B 30/40
                                                    359/462
2010/0296163 A1* 11/2010 Saarikko .............. G02B 5/1814
                                                    359/569
(Continued)

FOREIGN PATENT DOCUMENTS

EP          2733517 A1     5/2014
EP          2834698        2/2015
(Continued)

*Primary Examiner* — Ryan Crockett
(74) *Attorney, Agent, or Firm* — McCarter & English LLP

(57) ABSTRACT

An apparatus includes a first light waveguide including: a first in-coupling diffraction grating to in-couple first input beams of light into the first light waveguide from a first light engine, a first expander to expand the first input beams of light to form first expanded beams of light, a first out-coupling diffraction grating to out-couple the first expanded beams of light; and a second light waveguide including: a second in-coupling diffraction grating to in-couple second input beams of light into the second light waveguide from a second light engine, a second expander to expand the second input beams of light to form second expanded beams of light, and a second out-coupling diffraction grating to out-couple the second expanded beams of light. The first light waveguide provides a first image, and the second light waveguide provides a second image.

15 Claims, 53 Drawing Sheets

(56) References Cited

U.S. PATENT DOCUMENTS

2021/0011305 A1* 1/2021 Chang ................ G02B 27/0075
2022/0082824 A1* 3/2022 Jarvenpaa .......... G02B 27/0101
2023/0324682 A1* 10/2023 Jarvenpaa ............. G02B 30/24
                                        385/37

FOREIGN PATENT DOCUMENTS

WO     WO 2004/109349 A2   12/2004
WO     WO 2009/077802 A1    6/2009

* cited by examiner

355

353

351

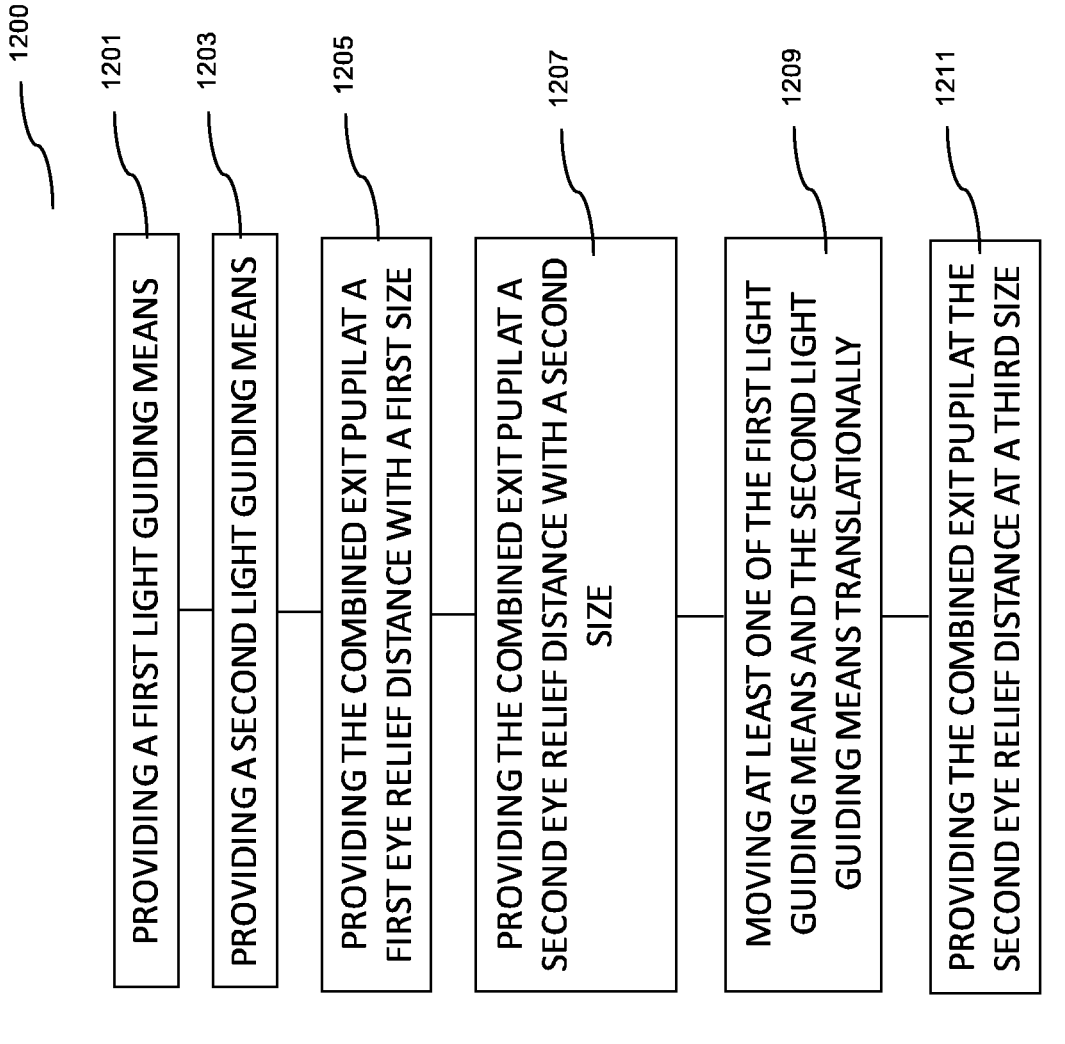

1200

1201 PROVIDING A FIRST LIGHT GUIDING MEANS

1203 PROVIDING A SECOND LIGHT GUIDING MEANS

1205 PROVIDING THE COMBINED EXIT PUPIL AT A FIRST EYE RELIEF DISTANCE WITH A FIRST SIZE

1207 PROVIDING THE COMBINED EXIT PUPIL AT A SECOND EYE RELIEF DISTANCE WITH A SECOND SIZE

1209 MOVING AT LEAST ONE OF THE FIRST LIGHT GUIDING MEANS AND THE SECOND LIGHT GUIDING MEANS TRANSLATIONALLY

1211 PROVIDING THE COMBINED EXIT PUPIL AT THE SECOND EYE RELIEF DISTANCE AT A THIRD SIZE

FIG 12A

OPTICAL APPARATUS, OPTICAL MODULES, OPTICAL DEVICES AND METHODS

CROSS REFERENCE TO RELATED APPLICATION

This patent application is a U.S. National Stage application of International Patent Application Number PCT/EP2022/069740 filed Jul. 14, 2022, which is hereby incorporated by reference in its entirety, and claims priority to EP 21189149.4 filed Aug. 2, 2021.

TECHNOLOGICAL FIELD

Examples of the disclosure relate to optical apparatus, optical modules, optical devices and methods. Some relate to optical apparatus, optical modules, optical devices and methods for head-up displays.

BACKGROUND

Head-up displays can be provided in vehicles, including aircraft and automobiles. Head-up displays can be provided by concave mirrors and projectors or other means to project images onto a transparent surface viewable by a user.

BRIEF SUMMARY

According to various, but not necessarily all, embodiments there is provided an apparatus comprising:

first light guiding means comprising at least: first in-coupling diffractive means configured to in-couple one or more first input beams of light into the first light guiding means from a first light engine, first expanding means configured to expand the one or more first input beams of light from the first light engine to form one or more first expanded beams of light, first out-coupling diffractive means configured to out-couple the one or more first expanded beams of light from the first light guiding means; and second light guiding means comprising at least: second in-coupling diffractive means configured to in-couple one or more second input beams of light into the second light guiding means from a second light engine, second expanding means configured to expand the one or more second input beams of light from the second light engine to form one or more second expanded beams of light, second out-coupling diffractive means configured to out-couple the one or more second expanded beams of light from the second light guiding means;

wherein the first light guiding means is configured to provide a first image, the second light guiding means is configured to provide a second image;

wherein the apparatus is configured so that at least one of the first light guiding means and the second light guiding means can be moved between at least two different positions to change the relative position of the first light guiding means and the second light guiding means;

wherein the apparatus is configured to maintain a combined exit pupil formed from outcoupled beams from the first light guiding means and the second light guiding means as the relative position of the first and second light guiding means is changed;

wherein within at least a part of the combined exit pupil the image viewed is at least a part of the first image and at least a part of the second image.

In some, but not necessarily all, examples, the movement of at least one of the first light guiding means and the second light guiding means between at least two different positions comprises translational movement.

In some, but not necessarily all, examples, the first image and second image comprise the same image content, wherein in at least a part of the combined exit pupil the image viewed is a combination of a part of the first image and a part of the second image, wherein the part of the first image and the part of the second image that combine to form the viewed image vary depending on the viewing position; wherein the translational movement changes the size of the combined exit pupil and changes the brightness of part of the image viewed in at least some of the viewing positions within the combined exit pupil.

In some, but not necessarily all, examples, the combined exit pupil is a combined field-of-view exit pupil, wherein within the combined field-of-view exit pupil, the image viewed is a third image, wherein the third image is a combination of the first image and the second image, wherein the third image has a larger field-of-view than the field-of-view of first image or the field-of-view of the second image;

wherein the translational movement changes the size of the combined field-of-view exit pupil.

In some, but not necessarily all, examples, the first image and second image comprise the same image content, wherein in at least a part of the combined exit pupil the image viewed is a combination of a part of the first image and a part of the second image, wherein the part of the first image and the part of the second image that combine to form the viewed image vary depending on the viewing position; wherein the translational movement from a first relative position of the first light guiding means and the second light guiding means to a second relative position changes the brightness of part of the image viewed in some of the viewing positions within the combined exit pupil.

In some, but not necessarily all, examples, the apparatus comprises a third light guiding means comprising at least: third in-coupling diffractive means configured to in-couple one or more third input beams of light into the third light guiding means from a third light engine, third expanding means configured to expand the one or more third input beams of light from the third light engine to form one or more third expanded beams of light, third out-coupling diffractive means configured to out-couple the one or more third expanded beams of light from the third light guiding means;

wherein the third light guiding means provides a third image;

wherein the first image, the second image and the third image comprise the same image content;

wherein outcoupled beams from the first light guiding means and the third light guiding means provide a second combined exit pupil, wherein within a part of the second combined exit pupil, the image viewed is a combination of a part of the first image and a part of the third image, wherein the part of the first image and the part of the third image that combine to form the viewed image vary depending on the viewing position;

wherein the apparatus is configured so that the second light guiding means can move translationally relative to the first light guiding means and the third light guiding means, wherein the translational movement of the second light guiding means from a first position to a second position changes the brightness of part of the image viewed at some viewing positions within the second combined exit pupil.

In some, but not necessarily all, examples, the first light guiding means provides the first image at a finite distance focus, wherein the second light guiding means provides the second image at infinite distance focus, wherein the apparatus is configured so that the second light guiding means can move between at least two different positions, wherein the position of the combined exit pupil changes between the at least two different positions of the second light guiding means.

In some, but not necessarily all, examples, the movement of at least one of the first light guiding means and the second light guiding means between at least two different positions comprises rotational movement of the first light guiding means and the second light guiding means.

In some, but not necessarily all, examples, in a first relative position of the first light guiding means and the second light guiding means, the first image and the second image comprise the same image content and in at least a part of the combined exit pupil the image viewed is a combination of a part of the first image and a part of the second image, wherein the part of the first image and the part of the second image that combine to form the viewed image vary depending on the viewing position;

wherein in a second relative position of the first light guiding means and the second light guiding means, the first image and the second image comprise image content which is at least partially different and the combined exit pupil is a combined field-of-view exit pupil, wherein within the combined field-of-view exit pupil, the image viewed is a third image, wherein the third image is a combination of the first image and the second image, wherein the third image has a larger field-of-view than the field-of-view of first image or the field-of-view of the second image;

wherein in the second relative position the first light guiding means and the second light guiding means have rotated from each of their positions in the first relative position.

In some, but not necessarily all, examples, the apparatus is configured so that when the first light guiding means and the second light guiding means are in the second relative position at least one of the first light guiding means and the second light guiding means can move translationally, so that the first and second light guiding means can move translationally between being in the second relative position to at least one other relative position;

wherein the image content of the first image remains the same between the second relative position and the at least one other relative position;

wherein the image content of the second image remains the same between the second relative position and the at least one other relative position;

wherein within the second relative position and the at least one other relative position the first light guiding means and the second light guiding means are arranged so that in the combined field-of-view exit pupil a portion of the first image and a portion of the second image overlap and align; and wherein translationally moving from the second relative position to the at least one other relative position changes the size of the combined field-of-view exit pupil.

In some, but not necessarily all, examples, translationally moving from the second relative position to the at least one other relative position changes the brightness of part of the third image viewed at some viewing positions within the combined field-of-view exit pupil.

According to various, but not necessarily all, embodiments there is provided a Head-Up-Display device comprising the apparatus of any preceding paragraph.

According to various, but not necessarily all, embodiments there is provided a method comprising:

providing first light guiding means comprising at least: first in-coupling diffractive means configured to in-couple one or more first input beams of light into the first light guiding means from a first light engine, first expanding means configured to expand the one or more first input beams of light from the first light engine to form one or more first expanded beams of light, first out-coupling diffractive means configured to out-couple the one or more first expanded beams of light from the first light guiding means;

providing second light guiding means comprising at least: second in-coupling diffractive means configured to in-couple one or more second input beams of light into the second light guiding means from a second light engine, second expanding means configured to expand the one or more second input beams of light from the second light engine to form one or more second expanded beams of light, second out-coupling diffractive means configured to out-couple the one or more second expanded beams 30 of light from the second light guiding means;

wherein the first light guiding means is configured to provide a first image, the second light guiding means is configured to provide a second image;

moving at least one of the first or second light guiding means between at least two different positions to change the relative position of the first light guiding means and the second light guiding means;

maintaining a combined exit pupil formed from out-coupled beams from the first light guiding means and the second light guiding means as the relative position of the first and second light guiding means is changed, wherein within at least a part of the combined exit pupil the image viewed is at least a part of the first image and at least a part of the second image.

In some, but not necessarily all, examples, the movement of at least one of the first light guiding means and the second light guiding means between at least two different positions comprises translational movement, wherein the first image and second image comprise the same image content, wherein in at least a part of the combined exit pupil the image viewed is a combination of a part of the first image and a part of the second image, wherein the part of the first image and the part of the second image that combine to form the viewed image vary depending on the viewing position; wherein the translational movement changes the size of the combined exit pupil and changes the brightness of part of the image viewed in at least some of the viewing positions within the combined exit pupil, wherein the method additionally comprises:

providing the combined exit pupil at a first eye relief distance with a first size, with the first light guiding means and the second light guiding means in a first relative position;

providing the combined exit pupil at a second eye relief distance with a second size with the first light guiding means and the second light guiding means in the first relative position;

wherein moving at least one of the first light guiding means and the second light guiding means between at least two different positions to change the relative position of the first light guiding means and the second light guiding means comprises: moving at least one of the first light guiding means and the second light guiding means translationally to provide the combined exit pupil at the second eye relief distance at a third size, different to the second size;

wherein maintaining the combined exit pupil comprises providing the combined exit pupil at the second eye relief distance at the third size.

In some, but not necessarily all, examples, the movement of at least one of the first light guiding means and the second light guiding means between at least two different positions comprises translational movement, wherein the first image and the second image comprise image content which is at least partially different and the combined exit pupil is a combined field-of-view exit pupil, wherein in the combined field-of-view exit pupil, the image viewed is a third image, wherein the third image is a combination of the first image and the second image, wherein the third image has a larger field-of-view than the field-of-view of first image or the field-of-view of the second image;

wherein the translational movement changes the size of the combined field-of-view exit pupil;

wherein the method additionally comprises:

providing the combined field-of-view exit pupil at a first eye relief distance with a first size with the first light guiding means and the second light guiding means in a first relative position;

providing the combined field-of-view exit pupil at a second eye relief distance with a second size with the first light guiding means and the second light guiding means in the first relative position;

wherein moving at least one of the first light guiding means and the second light guiding means between at least two different positions to change the relative position of the first light guiding means and the second light guiding means comprises: moving at least one of the first light guiding means and the second light guiding means translationally to provide the combined field-of-view exit pupil at the second eye relief distance at a third size, different to the second size;

wherein maintaining the combined exit pupil comprises providing the combined field-of-view exit pupil at the second eye relief distance at the third size.

According to various, but not necessarily all, embodiments there is provided examples as claimed in the appended claims. The scope of protection sought for various embodiments of the invention is set out by the independent claims. The examples and features, if any, described in this specification that do not fall under the scope of the independent claims are to be interpreted as examples useful for understanding various embodiments of the invention.

BRIEF DESCRIPTION

Some examples will now be described with reference to the accompanying drawings in which:

FIG. 12A shows an example method of the subject matter described herein;

Figure 1:
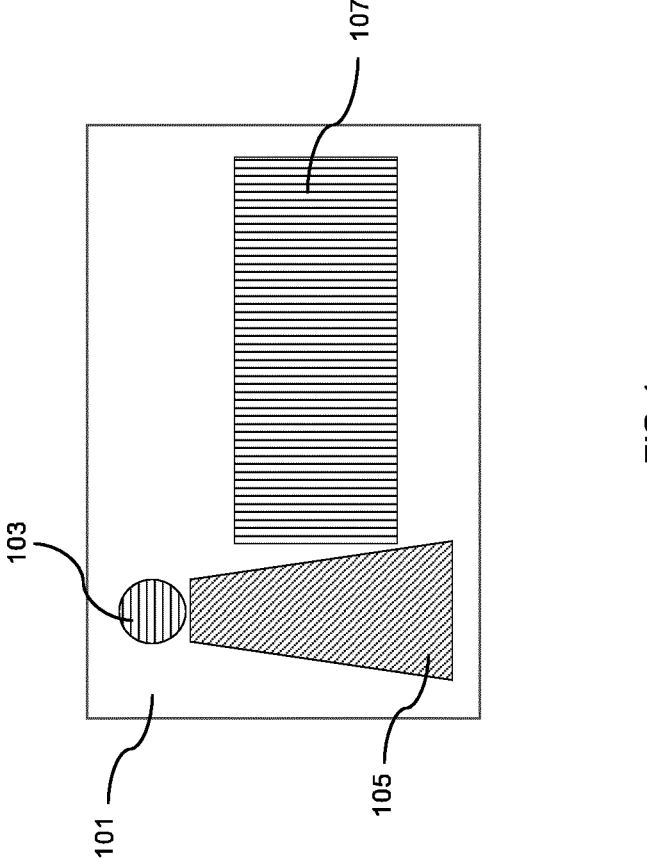
FIG. 1 shows an example apparatus of the subject matter described herein.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

FIG. 1 shows an example light guiding means 101 that can be used in examples of the disclosure. The light guiding means 101 can be formed on a waveguide, an optical substrate, a transparent plate or any other suitable material or composite material.

In this example the light guiding means 101 comprises an exit pupil expander. The exit pupil expander is configured to increase the size of an exit pupil from a light engine or other optical arrangement. The light engine could be a display means such as a projection engine.)

The light guiding means 101 comprises in-coupling diffractive means 103, expanding means 105, and out-coupling diffractive means 107.

The in-coupling diffractive means 103 comprise any means that is configured to in-couple one or more beams of light from a light engine into the light guiding means 101. The in-coupling diffractive means 103 is positioned within the light guiding means 101 so that, in use, the in-coupling diffractive means 103 can be positioned adjacent to the light engine.

The one or more in-coupled beams of light travel though the light guiding means 101 via total internal reflection. The refractive index of the material that is used for the light guiding means 101, the wavelength of the one or more in-coupled beams, and the parameters of the in-coupling diffractive means 103 determine the total internal reflection angles.

The expanding means 105 is positioned within the light guiding means 101 so that the one or more in-coupled beams of light are provided from the in-coupling diffractive means 103 to the expanding means 105.

The expanding means 105 comprise any means that is configured to expand the one or more in-coupled beams of light in at least one dimension. The expanding means 105 can comprise a diffractive means such as a diffraction grating or any other suitable means. In the diffraction grating an in-coupled beam of light is split into two with every internal reflection. The two split sections of the beam travel in different directions and continue splitting and so expand the exit pupil of the light engine. In the example shown in FIG. 1 the expanding means 105 has a grating which expands the beam in a vertical direction.

The out-coupling diffractive means 107 is positioned within the light guiding means 101 so that the one or more vertically expanded beams of light are provided from the expanding means 105 to the out-coupling diffractive means 107.

The out-coupling diffractive means 107 comprises any means that is configured to out-couple the one or more vertically expanded light beams out of the light guiding means 101. The out-coupling diffractive means 107 can function in a similar manner to the expanding means 105 so that an expanded beam of light is split into two with every internal reflection. The out-coupling diffractive means 107 can also be configured to expand the vertically expanded beam of light in a second dimension. In the example shown in FIG. 1 the out-coupling diffractive means 107 has a vertical grating which expands the vertical expanded beam in the horizontal direction.

The light guiding means 101 is configured so that the one or more out-coupled expanded beams of light can be viewed by a user. The one or more out-coupled expanded beams of light provide a virtual image that can be observed by a user. The one or more out-coupled beams of light therefore provide an expanded exit pupil.

It is to be appreciated that the variations in the size, shape, position, and expansion direction of the different diffractive means are examples and that other variations could be used in other examples of the disclosure. For example, the expanding means 105 could expand the light beam in some other direction than vertical. As another example, the diffractive out-coupling means 107 could expand the beam in some other direction than horizontal. As a third example, the exit pupil of the one or more beams of light in-coupled by the in-coupling means 103 would be expanded in the first expansion dimension already prior to in-coupling the one or more beams into the light guiding means 101. In this example there would be no expanding means 105 positioned within the light guiding means 101, and the properties of the in-coupling means 103 can be different to the properties of the in-coupling means 103 illustrated in FIG. 1.

The diffractive means that are used for the in-coupling diffractive means 103, expanding means 105, and out-coupling diffractive means 107 can comprise any means that can be configured to diffract the input beams of light. The diffractive means can comprise any one or more of a diffractive optical element, diffractive structure, diffraction gratings, holographic gratings, Bragg gratings, rulings, ridges, surface relief diffractive gratings or any suitable optical component or feature having a periodic structure that splits and diffracts light into several beams travelling in different directions.

Figures 2A, 2B:
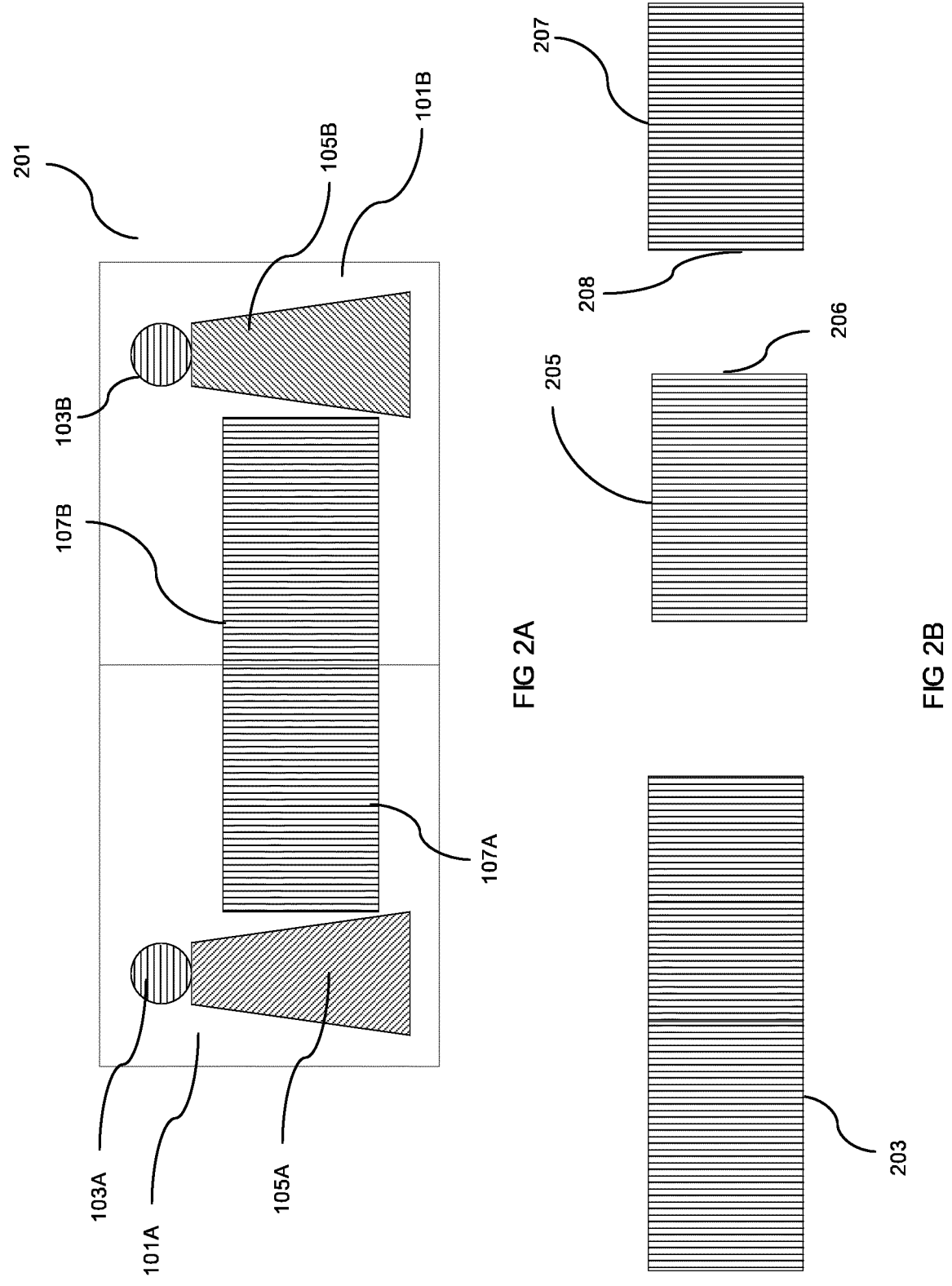
FIGS. 2A-2K show another example apparatus of the subject matter described herein.

FIG. 2A shows an example apparatus 201 in plan view. In some examples the apparatus 201 could be used in a head-up display device or module. The head-up display device or module could be used in vehicles, such as aircraft or automobiles, or any other suitable apparatus.

The example apparatus 201 shown in FIG. 2A comprises a first light guiding means 101A and a second light guiding means 101B. The first light guiding means 101A and the second light guiding means 101B can comprise an exit pupil expander as shown in FIG. 1 and as described above. Corresponding reference numerals are used for corresponding features. The first light guiding means 101A comprises first in-coupling diffractive means 103A configured to in-couple one or more first input beams of light into the first light guiding means 101A from a first light engine, first expanding means 105A configured to expand the one or more first input beams of light from the first light engine to form one or more first expanded beams of light, and first out-coupling diffractive means 107A configured to out-couple the one or more first expanded beams of light from the first light guiding means 101A.

The second light guiding means 101B comprises second in-coupling diffractive means 103B configured to in-couple one or more second input beams of light into the second light guiding means 101B from a second light engine, second expanding means 105B configured to expand the one or more second input beams of light from the second light engine to form one or more second expanded beams of light, and second out-coupling diffractive means 107B configured to out-couple the one or more second expanded beams of light from the second light guiding means 101B.

The first light guiding means 101A is configured to provide a first image, the second light guiding means 101B is configured to provide a second image.

The apparatus 201 is configured so that at least one of the first light guiding means 101A and the second light guiding means 101B can be moved between at least two different positions to change the relative position of the first light guiding means 101A and the second light guiding means 101B.

The apparatus 201 is configured to maintain a combined exit pupil formed from outcoupled beams from the first light guiding means 101A and the second light guiding means 101B as the relative position of the first light guiding means 101A and the second light guiding means 101B is changed.

Within at least a part of the combined exit pupil the image viewed is at least a part of the first image and at least a part of the second image.

In this example, the first out-coupling diffractive means 107A and the second out-coupling diffractive means 107B are positioned to form a combined and continuous out-coupling projected area which is greater in size than either of the individual projected areas of the first out-coupling diffractive means 107A and the second out-coupling diffractive means 107B.

FIG. 2B illustrates the combined continuous out-coupling projected area 203 which is greater in size than the individual projected areas 205, 207 of the first out-coupling diffractive means 107A and the second out-coupling diffractive means 107B respectively.

A projected area is the two-dimensional area measurement of a three-dimensional object by projecting its shape onto an arbitrary plane. The first out-coupling diffractive means 107A and the second out-coupling diffractive means 107B are positioned such that their projected areas are combined and is a continuous total area. In this example the combined area is a continuous out-coupling area as there are no gaps or discontinuities in the area that out-couples light beams.

The first out-coupling diffractive means 107A and the second out-coupling diffractive means 107B of the apparatus 201 are positioned so that an edge 206 of the first out-coupling diffractive means 107A is aligned with an edge 208 of the second out-coupling diffractive means 107B to form the combined and continuous out-coupling projected area 203.

Figure 2C:
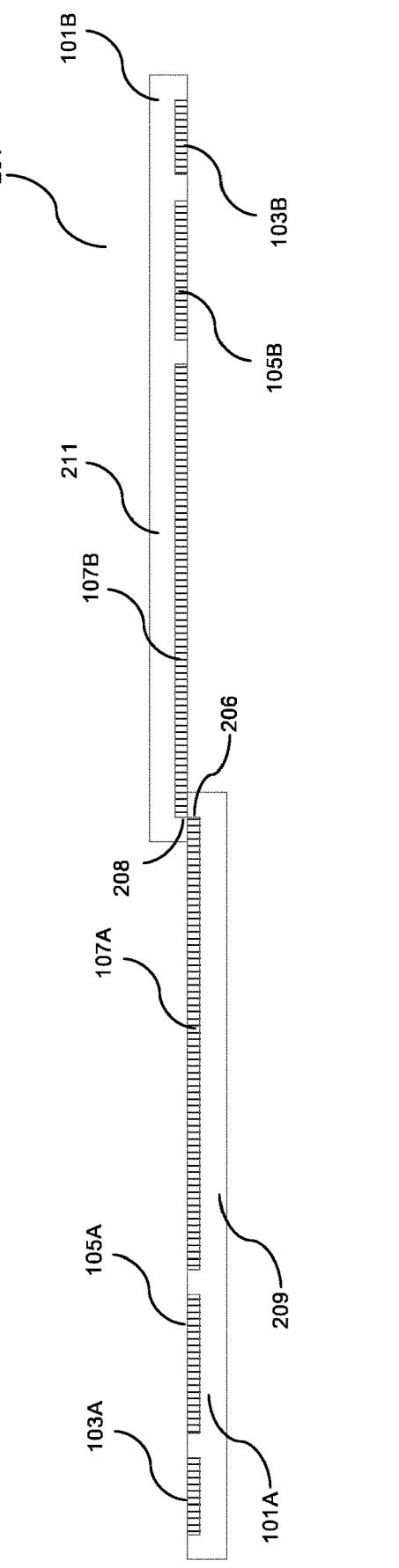

FIG. 2C illustrates the apparatus 201 in a side view. In this example the first light guiding means 101A comprises a first substrate 209. The first substrate 209 comprises the first in-coupling diffractive means 103A, the first expanding means 105A and the first out-coupling diffractive means 107A. The second light guiding means 101B comprises a second substrate 211, wherein the second substrate 211 comprises the second in-coupling diffractive means 103B, the second expanding means 105B and the second out-coupling diffractive means 107B.

The first substrate 209 and the second substrate 211 of the apparatus 201 are stacked. Stacking the first substrate 209 and the second substrate 211 enables the edge 206 and edge 208 to be aligned. Stacking also enables the first light guiding means 101A and the second light guiding means 101B to move translationally as described below.

Figure 2D:
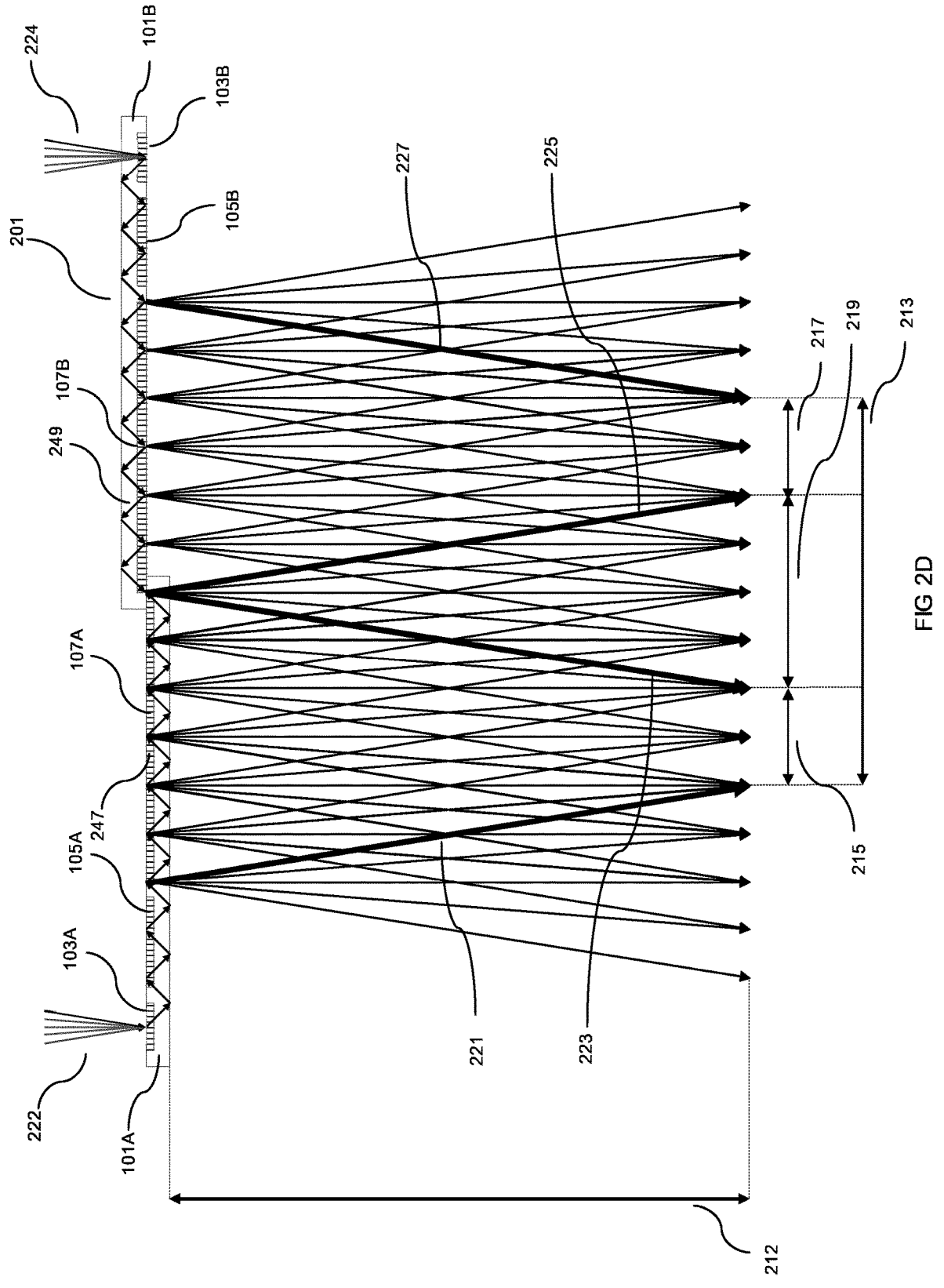

FIG. 2D illustrates the example apparatus 201 with example light paths of the beams of light.

In this example the first light guiding means 101A provides a first image and the second light guiding means 101B provides a second image. In this example the first image and the second image comprise the same image content. The first light guiding means 101A and the second light guiding means 101B form a combined exit pupil, illustrated by arrow 213.

The combined exit pupil illustrated in FIG. 2D is the combined exit pupil formed at the distance from the first light guiding means 101A illustrated by arrow 212. The distance from the first light guiding means 101A to the combined exit pupil can be referred to as the eye relief distance.

Within at least a part of the combined exit pupil the image viewed is at least a part of the first image and at least a part of the second image. In this example, in at least a part of the combined exit pupil the image viewed is a combination of a part of the first image and a part of the second image. The part of the first image and the part of the second image that combine to form the viewed image vary depending on the viewing position. In the example of FIG. 2D, the part of the combined exit pupil in which the image viewed is a combination of a part of the first image and a part of the second image is the third region (illustrated by arrow 219), as described below.

In a first region of the combined exit pupil (illustrated by arrow 215), the image viewed is the first image. In a second region of the combined exit pupil (illustrated by arrow 217), the image viewed is the second image. In a third region of the combined exit pupil (illustrated by arrow 219), the image viewed is a combination of a part of the first image and a part of the second image. The part of the first image and the part of the second image that combine to form the viewed image vary across the third region.

In this example, the first region represents the exit pupil of the first light guiding means 101A, and the second region represents the exit pupil of the second light guiding means 101B.

In FIG. 2D, the lines 221, 223, 225 and 227 illustrate light paths at the boundaries between the different regions of the combined exit pupil and the size of the combined exit pupil.

Light paths 222, 224 represent the input one or more beams of the light from the first light engine and the second light engine respectively. The first image and the second image originate from the first light engine and the second light engine respectively. FIG. 2D also illustrates the internal reflection of light beams within the first light guiding means 101A and the second light guiding means 101B.

At eye relief distances which are further than that shown in FIG. 2D by arrow 212, the size of the third region will increase, and at some eye relief distances, there will be no first region or second region. At these eye relief distances, in the entire combined exit pupil the image viewed is a combination of a part of the first image and a part of the second image. The entire combined exit pupil can be referred to as being formed of the third region at these eye relief distances.

Figure 2E:
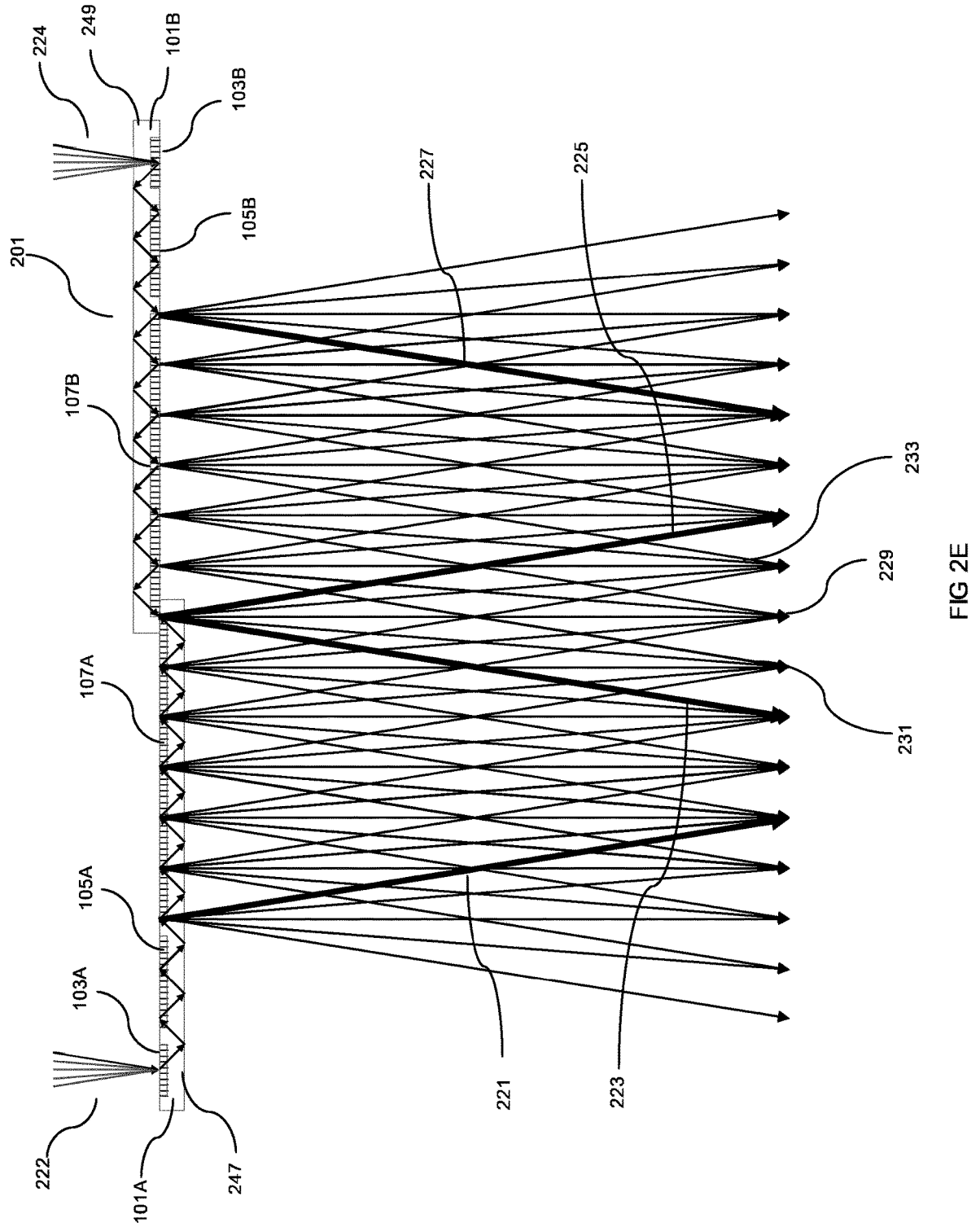

FIG. 2E is the same as FIG. 2D but does not show the arrows 212, 213, 215, 217 and 219 for clarity.

As illustrated in FIG. 2D and FIG. 2E, the light paths that form the third region vary across the third region. For example, the converging light paths at viewing position 229 form a combined image with equal amounts of light paths from the first light guiding means 101A and the second light guiding means 101B. The converging light paths at viewing position 231 are formed of more light paths from the first light guiding means 101A compared to the second light guiding means 101B. The converging light paths at viewing position 233 comprise a greater number of light paths from the second light guiding means 101B compared to light paths from the first light guiding means 101A.

This enables a combined exit pupil to be provided for viewing the image which is larger than the exit pupil of either first light guiding means 101A and the second light guiding means 101B on their own. The apparatus 201 can also be provided instead of another apparatus which has a light guiding means with a larger out-coupling diffractive means which would provide the same size of exit pupil. Light guiding means with larger out-coupling diffractive means can be more difficult to manufacture and more costly.

Figure 2F:
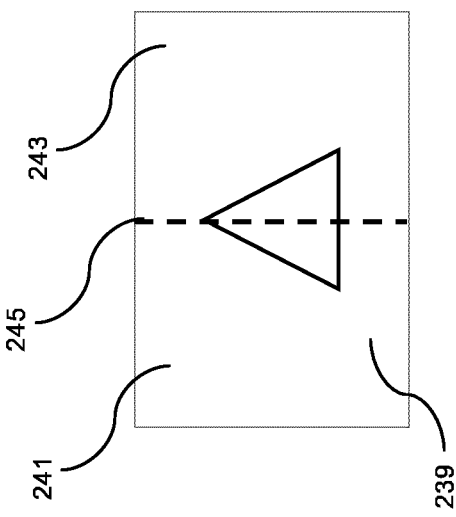
Figure 2F:
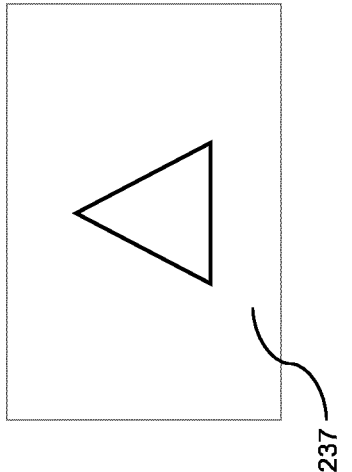
Figure 2F:
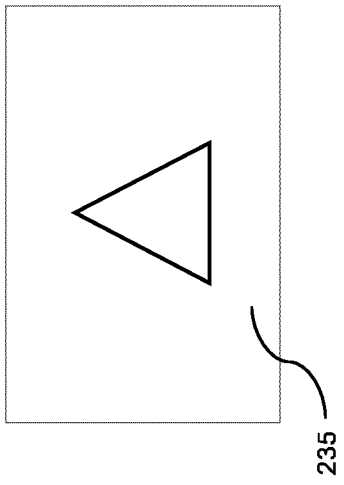

FIG. 2F illustrates an example first image 235, an example second image 237 and an example third image 239. As shown in FIG. 2F, first image 235 and second image 237 comprise the same image content, and are viewed in the first region and the second region of the combined exit pupil respectively. The third image 239 shown in FIG. 2F is an example of the image viewed in at least a part of the combined exit pupil in which the image viewed is a combination of a part of the first image and a part of the second image. This can be viewed in the third region of the combined exit pupil.

Even though the first image 235 and the second image 237 illustrated in FIG. 2F comprise the same image content, there can be a need to have some processing or optimization done to the source images before they are transmitted to the respective first light engine and second light engine. For example, the color uniformity of the source images could be optimized differently in order to produce as similar out-coupled images as possible, i.e. copy images.

In this example the third image 239 is a representation of the image viewed due to the converging light paths at viewing position 229. In this example the part 241 of the first image and the part 243 of the second image are the left half and the right half of the first image and second image respectively. Therefore, the third image viewed will at least approximate or be substantially identical to either of the first image or the second image. There could be minor differences in the third image compared to the first image or the second image around the point at which the first image and second image combine, represented by the dashed line 245 which is not actually present in the image. In some examples, there is no visible difference between the third image and each of the first and second images.

Aligning the edges 206, 208 can provide a third image which is substantially identical to the first image and the second image. Aligning the first out-coupling diffractive means 107A and the second out-coupling diffractive means 107B avoids aligning the first light guiding means 101A and the second light guiding means 101B using the edges of the first substrate 209 and second substrate 211, which may lead to misalignment of the first out-coupling diffractive means 107A and the second out-coupling diffractive means 107B due to variation in manufacture of the first substrate 209 and the second substrate 211.

In FIG. 2D and FIG. 2E, the first light guiding means 101A is in first position 247 and the second light guiding means 101B is in a first position 249.

The apparatus 201 is configured so that at least one of the first light guiding means 101A and the second light guiding means 101B can be moved between at least two different positions to change the relative position of the first light guiding means 101A and the second light guiding means 101B.

Figure 2G:
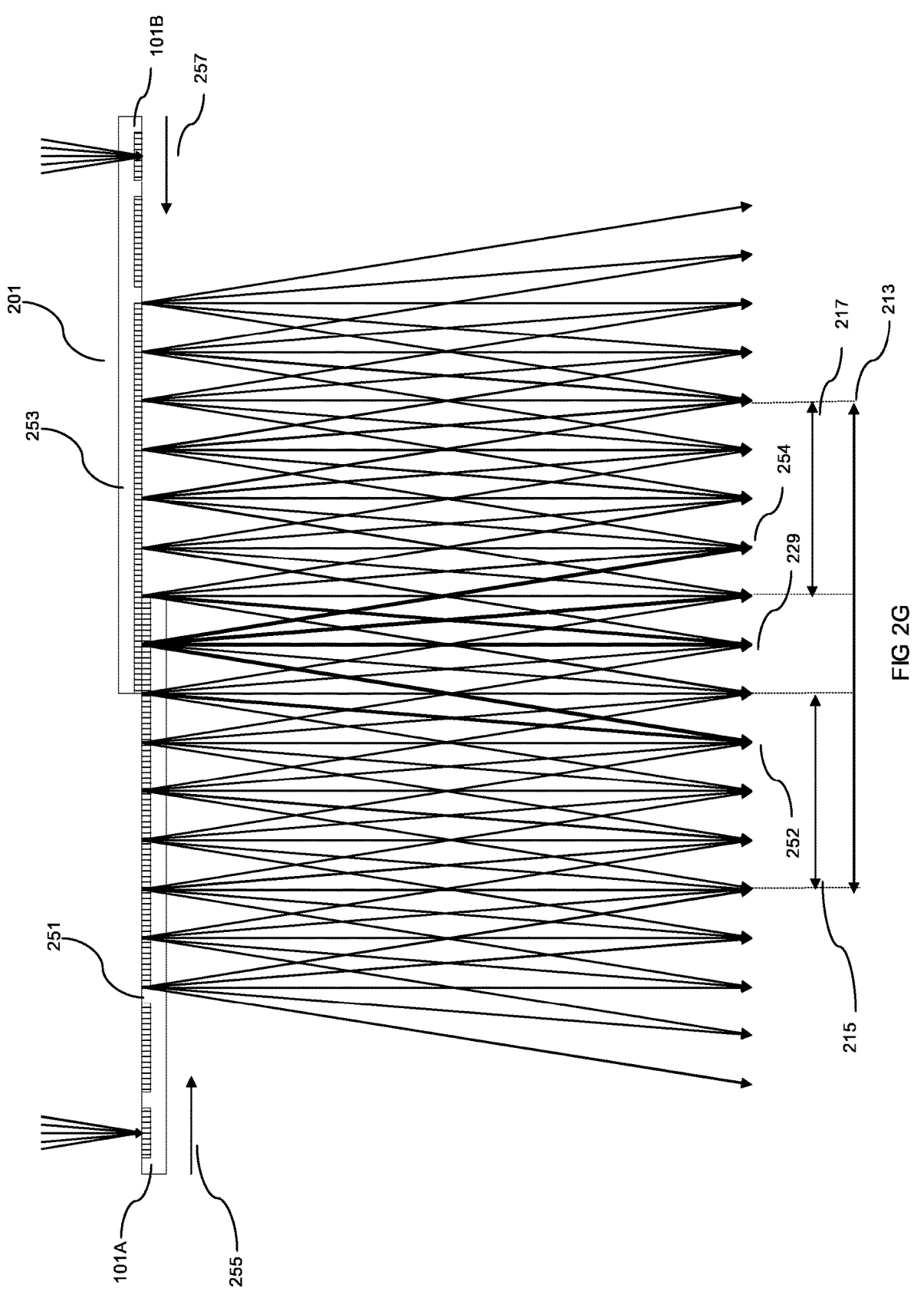

FIG. 2G illustrates the example apparatus 201 after the first light guiding means 101A has moved from first position 247 to a second position 251 and the second light guiding means 101B has moved from first position 249 to a second position 253. The movement of the first light guiding means 101A from the first position 247 to the second position 251 is represented by arrow 255 and the movement of the second light guiding means 101B from first position 249 to second position 253 is represented by arrow 257.

As illustrated in FIG. 2G, the apparatus 201 is configured to maintain the combined exit pupil, illustrated by arrow 213, formed from out-coupled beams from the first light guiding means 101A and the second light guiding means 101B as the relative position of the first light guiding means 101A and the second light guiding means 101B has been changed. In the example of FIG. 2G, as the first image and the second image comprise the same image content, in at least a part of the combined exit pupil the image viewed is a combination of a part of the first image and a part of the second image. The part of the first image and the part of the second image that combine to form the viewed image vary depending on the viewing position.

In this example, the movement of the first light guiding means 101A and the second light guiding means 101B between the first positions 247, 249 to second positions 251, 253 comprises translational movement.

The translational movement of the first light guiding means 101A and the second light guiding means 101B from first positions 247, 249 to second positions 251, 253 has changed the size of the combined exit pupil. In this example the size of the combined exit pupil has reduced.

Part of the first out-coupling diffractive means 107A and part of the second out-coupling diffractive means 107B are overlapping. Due to this partial overlap, some of the out-coupled beams of light from the first light guiding means 101A and the second light guiding means 101B constructively combine. This results in at least some of the images viewed within the combined exit pupil having a part of the image which is brighter than the rest of the image.

Figure 2H:
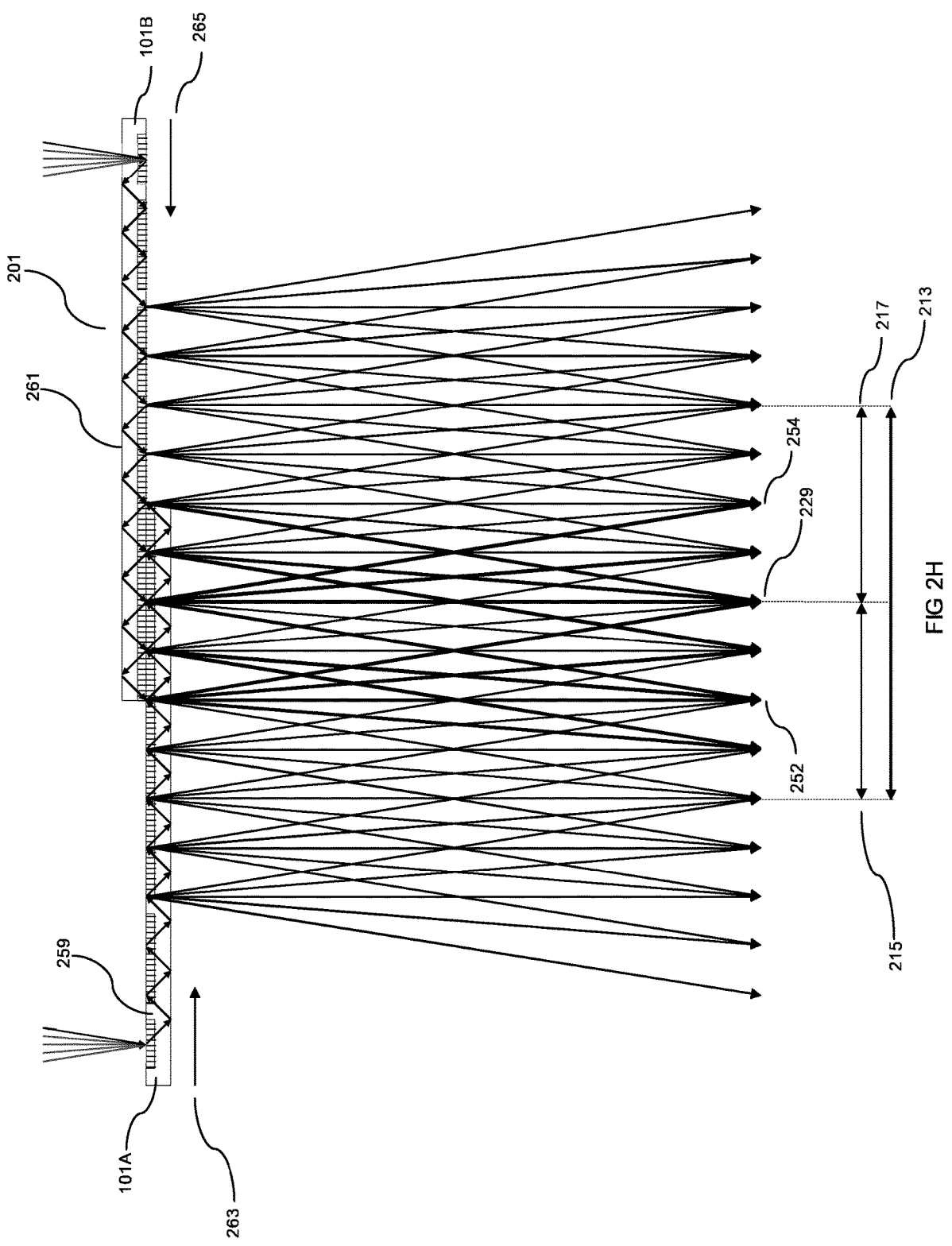

FIG. 2H illustrates translational movement of the first light guiding means 101A and the second light guiding means 101B to third positions 259, 261, with the movement from the second positions 251, 253 represented by arrows 263, 265 respectively.

Figure 2I:
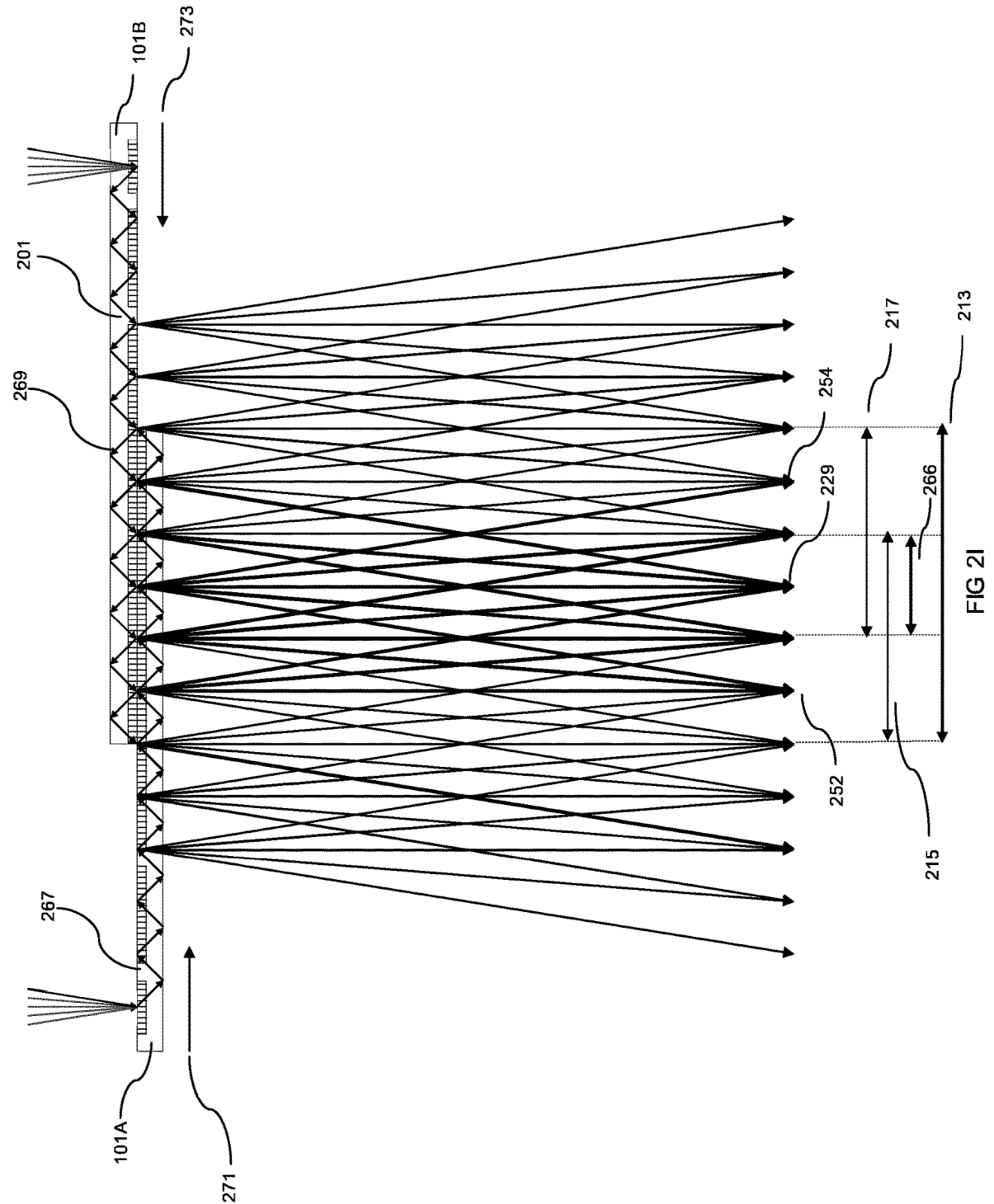

FIG. 2I illustrates translational movement of the first light guiding means 101A and the second light guiding means 101B to fourth positions 267, 269, with the movement from the third positions 259, 261 represented by arrows 271, 273 respectively.

Figure 2J:
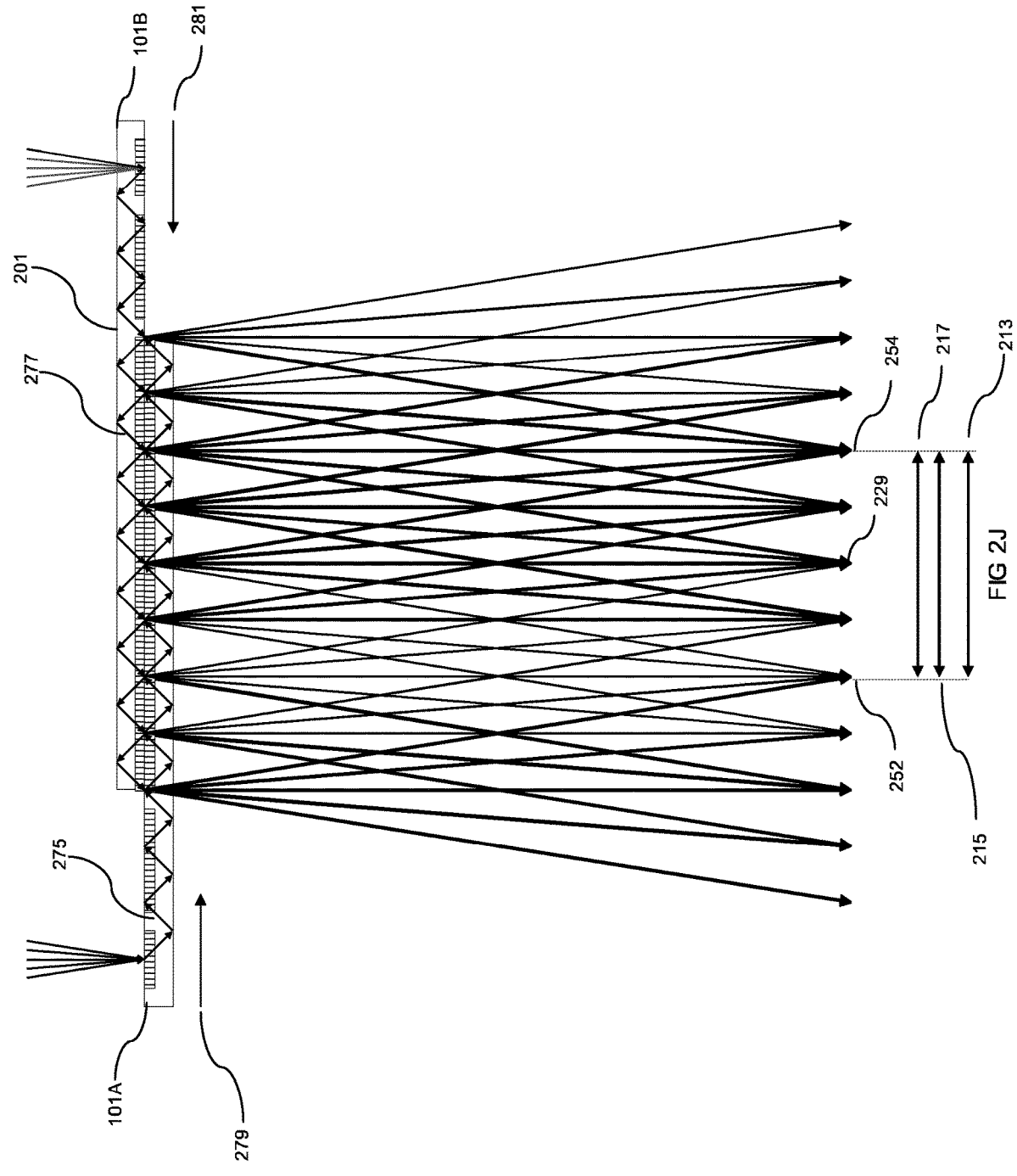

FIG. 2J illustrates translational movement of the first light guiding means 101A and the second light guiding means 101B to fifth positions 275, 277, with the movement from the fourth positions 267, 269 represented by arrows 279, 281 respectively.

The translational movement of the first light guiding means 101A and the second light guiding means 101B in FIGS. 2G, 2H, 2I, 2J illustrate the combined exit pupil reducing in size. The translational movement of the first light guiding means 101A and the second light guiding means 101B between each of FIGS. 2D, 2G, 2H, 2I, 2J changes the brightness of part of the image viewed in at least some of the viewing positions within the combined exit pupil. For the translational movement from FIG. 2D to FIG. 2G to FIG. 2H, the change in brightness is only viewed in the images that are at the viewing positions closer to the center of the combined exit pupil. For the translational movement from FIG. 2H to FIG. 2I to FIG. 2J, images at viewing positions at the edges of the combined exit pupil have parts of their image change in brightness.

For the translational movement from FIG. 2H to FIG. 2I to FIG. 2J, some of the images, for example the image viewed at viewing position 229, do not change in brightness because they are already at increased brightness across the entire image. The reduction in size of the combined exit pupil also affects the proportion of images which have increased brightness within the combined exit pupil as there are less viewing positions within the combined exit pupil as the combined exit pupil reduces in size.

Figure 2K:
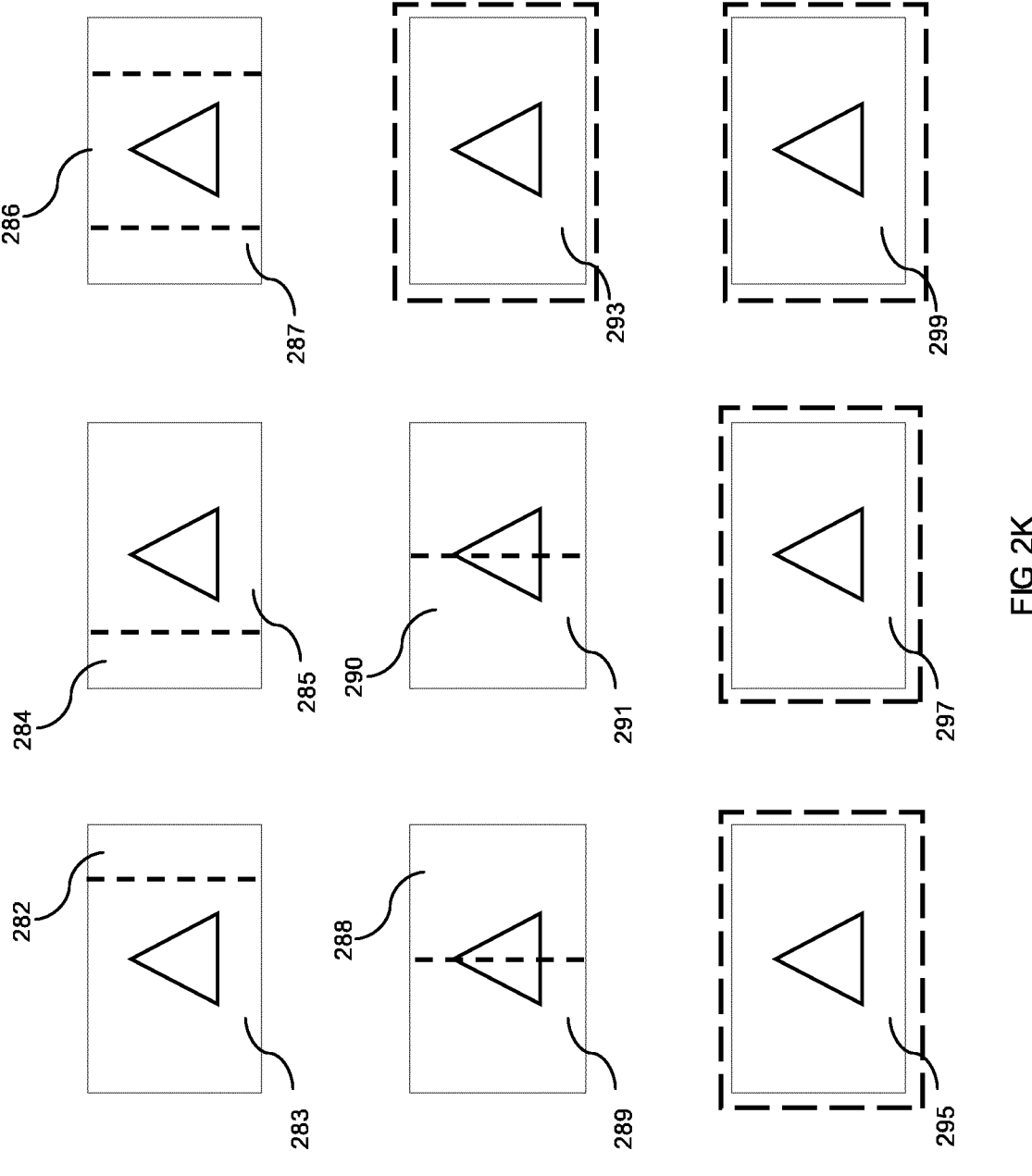

FIG. 2K illustrates example images which are viewed at viewing positions 252, 229, 254. The viewing positions 252, 229, 254 do not change position between the different FIGS.

Images 283, 285, 287 represent images which are viewable in FIG. 2G. image 283 is the image viewed at viewing position 252. Image 285 is the image viewed at viewing position 254. Image 287 is the image viewed at viewing position 229.

Image 283 has a portion 282 of increased brightness, on the righthand side of the image 283. The dotted line illustrates the boundary between the portion 282 with increased brightness and the rest of the image 283 with normal brightness.

Image 285 has a portion 284 of increased brightness on the left hand side of the image. Image 287 has a portion 286 of increased brightness located centrally in the image.

Images 289, 291, 293 illustrate example images viewable at viewing positions 252, 254, 229 in FIG. 2H. Image 289 at viewing position 252 has a portion 288 of increased brightness which takes up half the image. Image 291, at viewing position 254, has a portion 290 of increased brightness, which takes up half the image. Image 293 at viewing position 229 has increased brightness across the entire image as illustrated by the dashed rectangle.

Images 295, 297, 299 are the images at viewing positions 252, 254, 229 in FIG. 2J. Images 295, 297, 299 have increased brightness across the entire image.

In FIGS. 2H, 2I, 2J an increased brightness region exists within the combined exit pupil where the images viewed at the viewing positions within the increased brightness region have increased brightness across the entire image. In the example of FIG. 2H the image 293 viewed at viewing position 229 is the only image viewable which has increased brightness across the entire image. In FIG. 2I the region of increased brightness is represented by arrow 266. In FIG. 2J, the region of increased brightness exists across the entire combined exit pupil.

Example apparatus 201 provides the technical advantage that it can adjust between having a larger combined exit pupil or providing a smaller combined exit pupil with at least some images that have increased brightness in at least part of the image.

Providing a large combined exit pupil in a head-up display device provides flexibility of viewing position for the user.

In a head-up display device it can be useful to increase the brightness of the images provided to the user, which may be by user preference or may be automated. It can also be beneficial in a head-up display to increase the brightness of only portions of the image displayed. For example, a high priority piece of information may be provided with increased brightness in part of the image viewed. The apparatus 201 could also be controlled to increase the brightness of a portion of the image at a particular viewing position to highlight that portion of the image to the user. These advantages apply to other examples in the disclosure which change the brightness of images within the combined exit pupil.

It is also possible to optimize the efficiency instead of increasing the brightness of a portion of the displayed image or of the entire image as explained above. For example, by reducing the brightness of the source images from portions where increased brightness is available, light energy can be saved while maintaining the original brightness. The source images are the images provided by the first light engine and the second light engine.

Figure 3A:
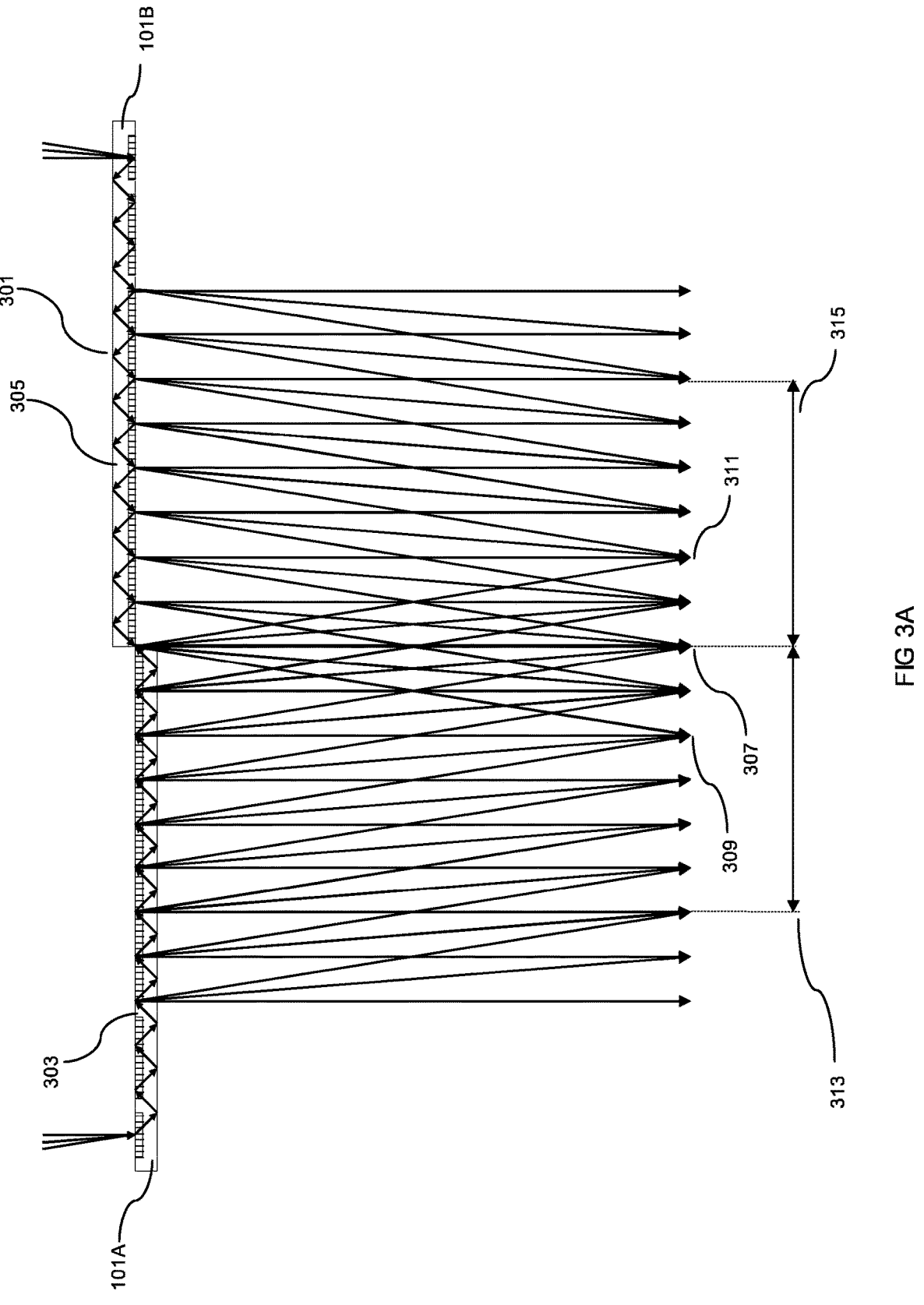
FIGS. 3A-3F show another example apparatus of the subject matter described herein.

FIG. 3A illustrates an example apparatus 301. Apparatus 301 comprises a first light guiding means 101A and a second light guiding means 101B, with components as described previously. The first light guiding means 101A is configured to provide a first image and a second light guiding means 101B is configured to provide a second image.

The apparatus 301 is configured so that at least one of the first light guiding means 101A and the second light guiding means 101B can be moved between at least two different positions to change the relative position of the first light guiding means 101A and the second light guiding means 101B.

The example apparatus 301 is configured to maintain a combined exit pupil formed from out-coupled beams from the first light guiding means 101A and the second light guiding means 101B as the relative position of the first light guiding means 101A and the second light guiding means 101B is changed.

Within at least a part of the combined exit pupil the image viewed is at least a part of the first image and at least a part of the second image.

In this example the combined exit pupil is a combined field-of-view exit pupil. In the combined field-of-view exit pupil, the image viewed is a third image, which is a combination of the first image and the second image. The third image has a larger field-of-view than the field-of-view of the first image or the field-of-view of the second image. The translational movement of the first light guiding means 101A and the second light guiding means 101B changes the size of the combined field-of-view exit pupil.

In this example, the movement of at least one of the first light guiding means 101A and the second light guiding means 101B is translational movement. FIGS. 3B, 3C, 3D, 3E illustrate the example apparatus 301 as the first light guiding means 101A and the second light guiding means 101B move translationally.

In FIG. 3A, the first light guiding means 101A is at a first position 303. The second light guiding means 101B is at a second position 305.

In FIG. 3A the combined field-of-view exit pupil exists at a single viewing position, illustrated at viewing position 307.

The exit pupil of the first light guiding means 101A is illustrated by arrow 313. The exit pupil of the second light guiding means 101B is illustrated by arrow 315.

Figure 3B:
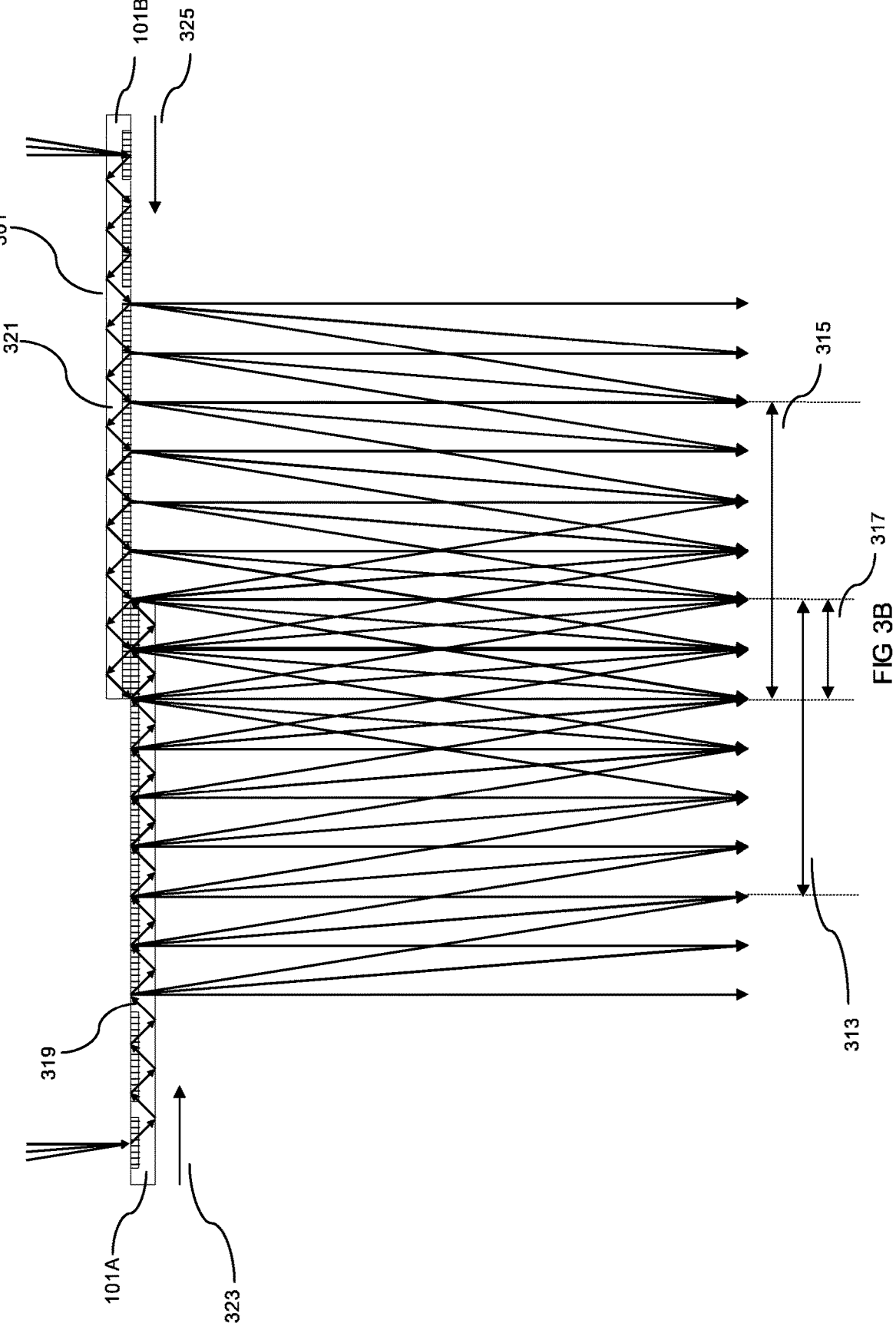

FIG. 3B illustrates translational movement of the first light guiding means 101A and the second light guiding means 101B to second positions 319, 321, with movement from the first positions 303, 305, represented by arrows 323, 325 respectively.

In FIG. 3B, the combined field-of-view exit pupil is illustrated by arrow 317.

Figure 3C:
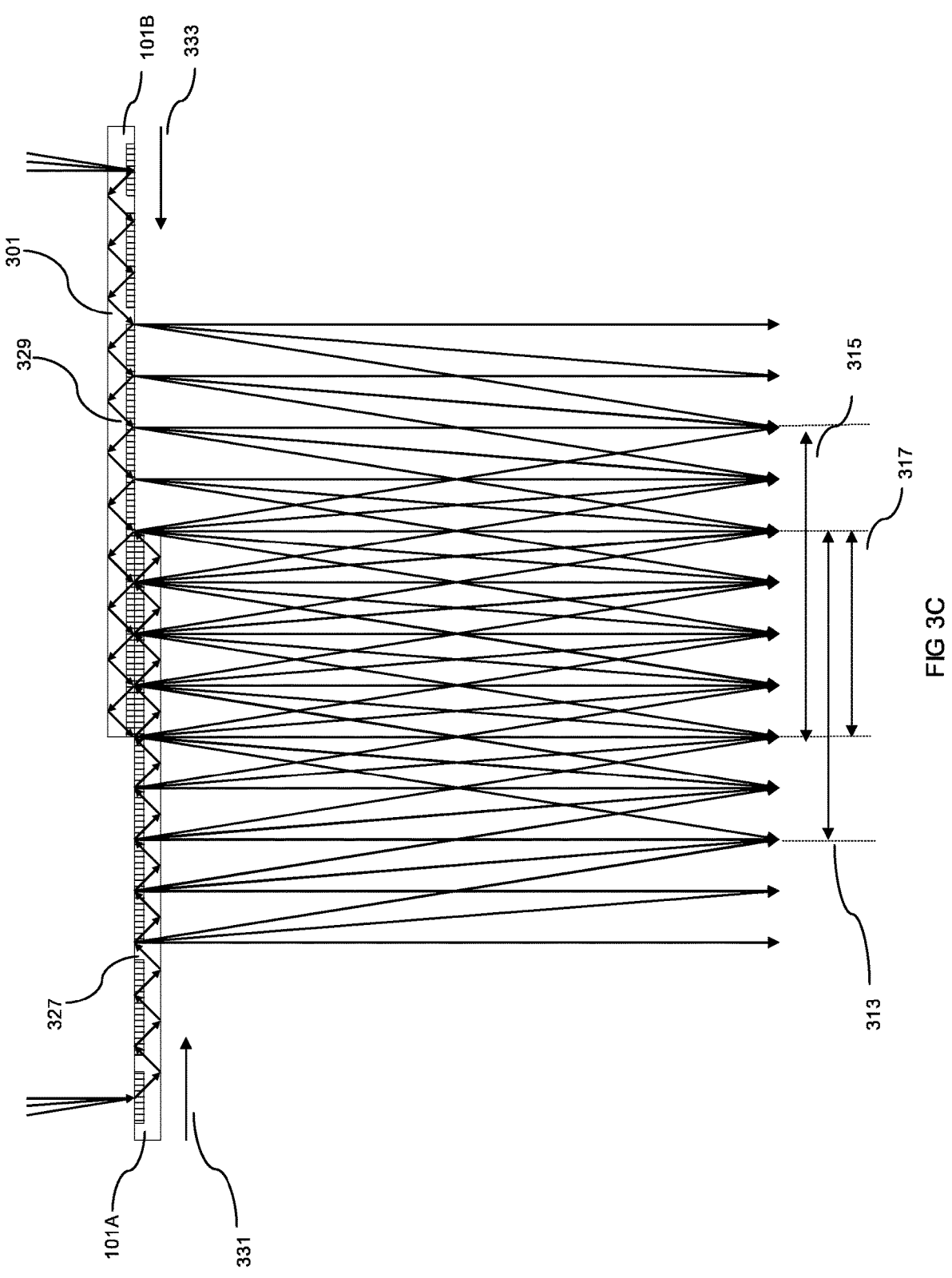

FIG. 3C illustrates translational movement of the first light guiding means 101A and the second light guiding means 101B to third positions 327, 329, with movement from the second positions 319, 321, represented by arrows 331, 333 respectively.

In FIG. 3C the size of the combined field-of-view exit pupil has increased from the size of the combined field-of-view exit pupil in FIG. 3B.

Figure 3D:
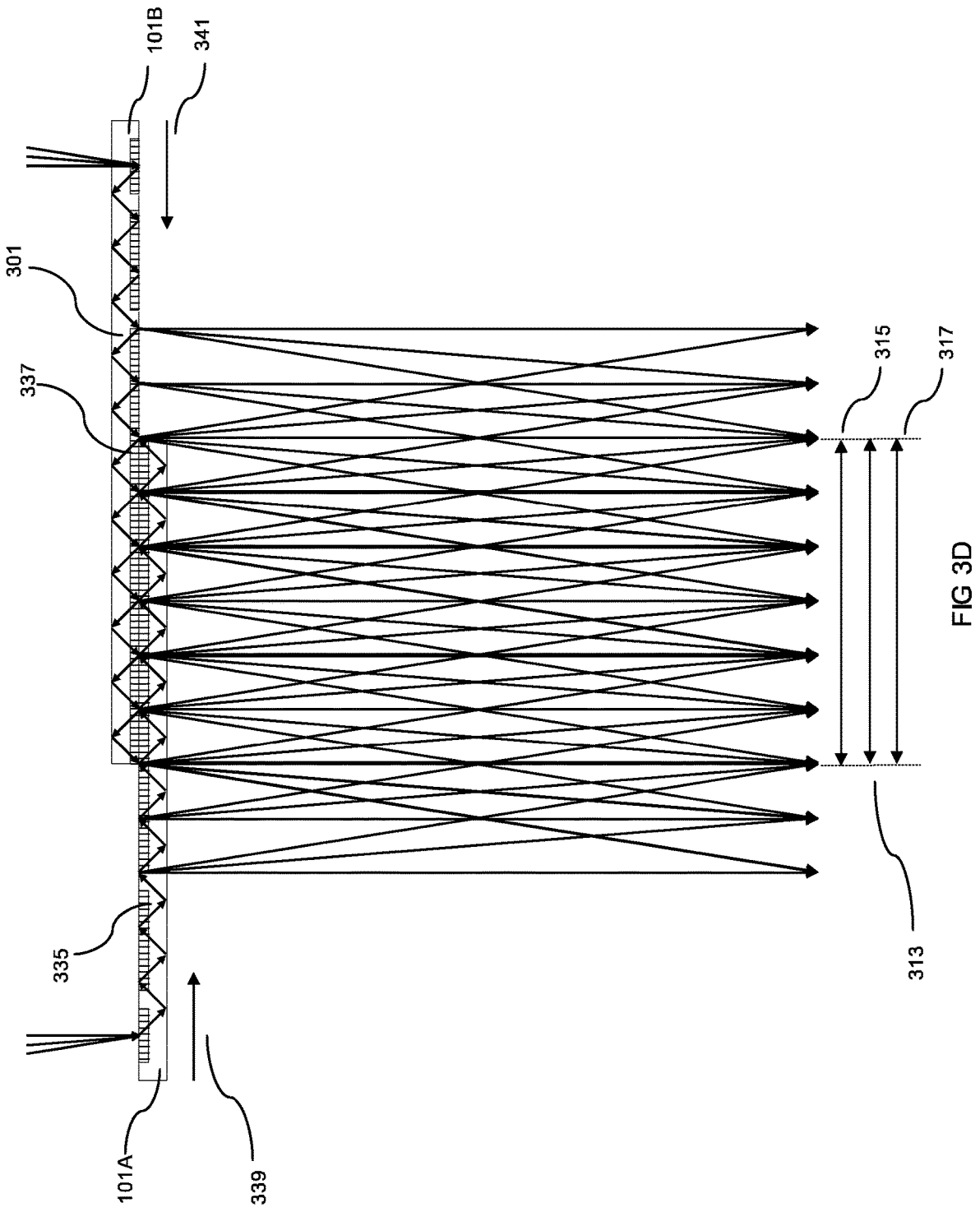

FIG. 3D illustrates translational movement of the first light guiding means 101A and the second light guiding means 101B to fourth positions 335, 337, with the movement from the third positions 327, 329 represented by arrows 339, 341 respectively.

In this relative position of the first light guiding means 101A and the second light guiding means 101B, the overlap of the first out-coupling diffractive means 107A and the second out-coupling diffractive means 107B is equal to the size of the combined field-of-view exit pupil, which is equal to the size of each of the exit pupils of the first light guiding means 101A and the second light guiding means 101B. At this position the size of the combined field-of-view exit pupil is maximized.

Figure 3E:
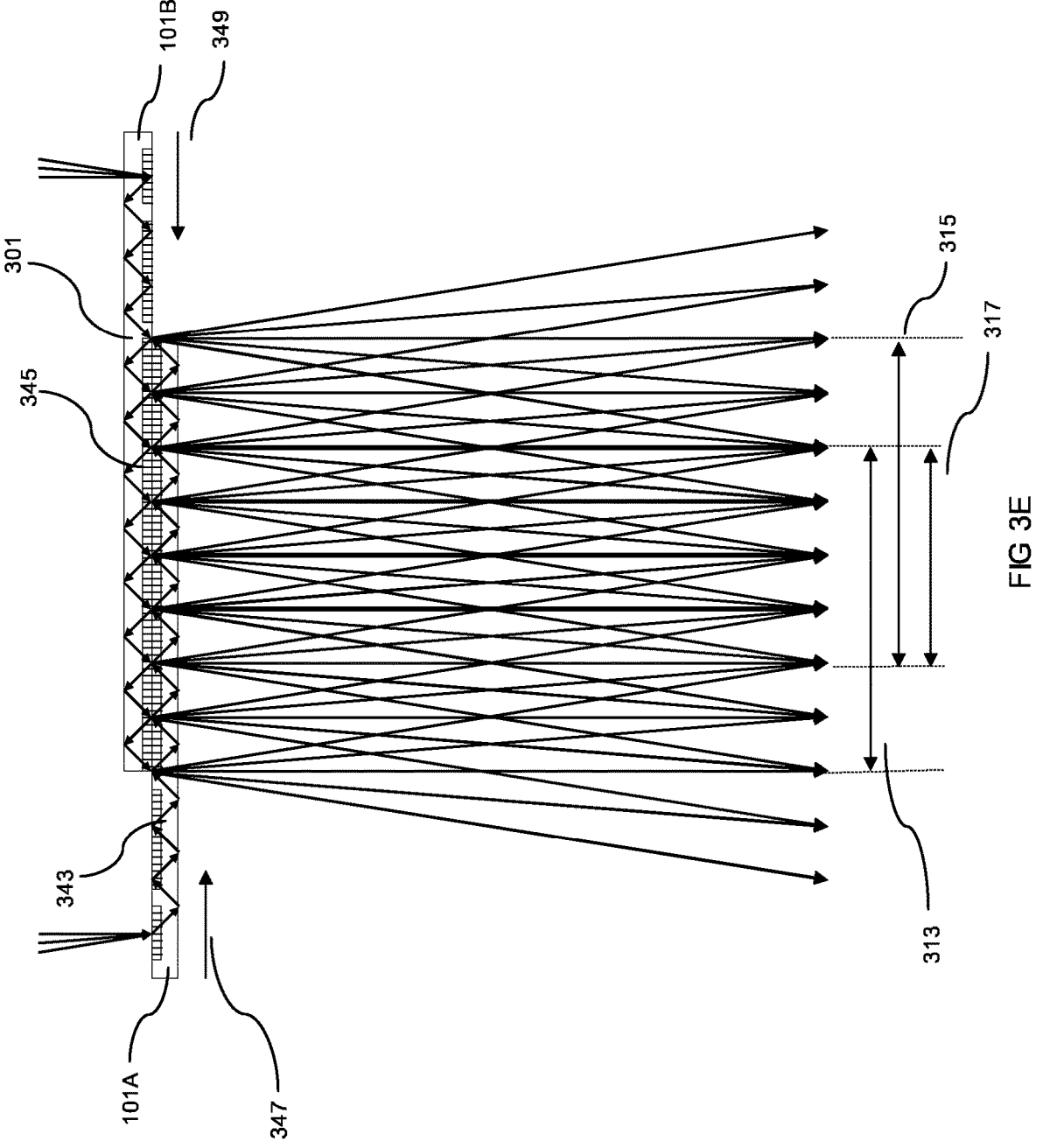

FIG. 3E illustrates translational movement of the first light guiding means 101A and the second light guiding means 101B to fifth positions 343, 345, with movement from the fourth positions 335, 337 represented by arrows 347, 349 respectively.

FIG. 3E illustrates the first out-coupling diffractive means 107A and the second out-coupling diffractive means 107B fully overlapped.

In FIG. 3E, the size of the combined field-of-view exit pupil has reduced compared to the size of the combined field-of-view exit pupil in FIG. 3D.

In the example apparatus 301, the center of the field-of-view of the exit pupil of the first light guiding means 101A is not perpendicular to the first out-coupling diffractive means 107A and the center of the field-of-view of the exit pupil of the second light guiding means 101B is not perpendicular to the second out-coupling diffractive means 107B. The center of a field-of-view of an exit pupil not being perpendicular to the out-coupling diffractive means is hereafter referred to as a tilted field-of-view.

The tilted field-of-view of each image is controlled by the angle of tilt of the field-of-view of light from the light engine entering the in-coupling diffractive means. The geometric properties of the expanding means and the out-coupling means are designed to match the field-of-view and tilt angle of the in-coupled light so that the out-coupled light has the same angle of tilt in its field-of-view as the in-coupled light.

In this example the field-of-view of the exit pupil of the first light guiding means 101A and the field-of-view of the exit pupil of the second light guiding means 101B are tilted by equal and opposite amounts so that the center of the field-of-view of the combined field-of-view exit pupil is perpendicular to the first out-coupling diffractive means 107A and the second out-coupling diffractive means 107B.

Figure 3F:
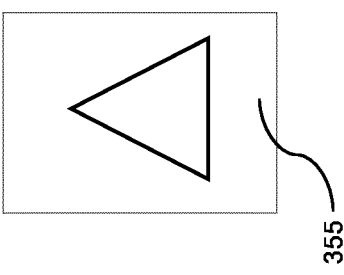
Figure 3F:
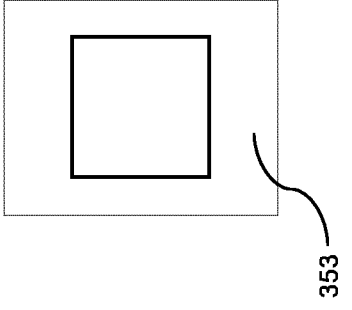
Figure 3F:
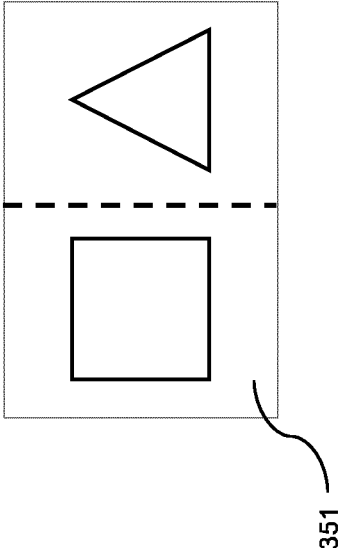

FIG. 3F illustrates an example third image 351, and an example first image 353 and an example second image 355. The example third image 351 is an example image that is viewed within the combined field-of-view exit pupil. All the third images that are viewable within the combined field-of-view exit pupil are approximately the same or substantially identical. As illustrated in FIG. 3F, the third image 351 is a combination of the first image 353 and the second image 355. The first image 353 is viewable, for example, at the viewing position 309 in FIG. 3A and the second image 355 is viewable, for example, at the viewing position 311 in FIG. 3A. In this example, the first image 353 and the second image 355 are different images, in that they have different image content. The dotted line in the third image 351 is used for illustration purposes and does not appear in the third image 351.

Figure 4A:
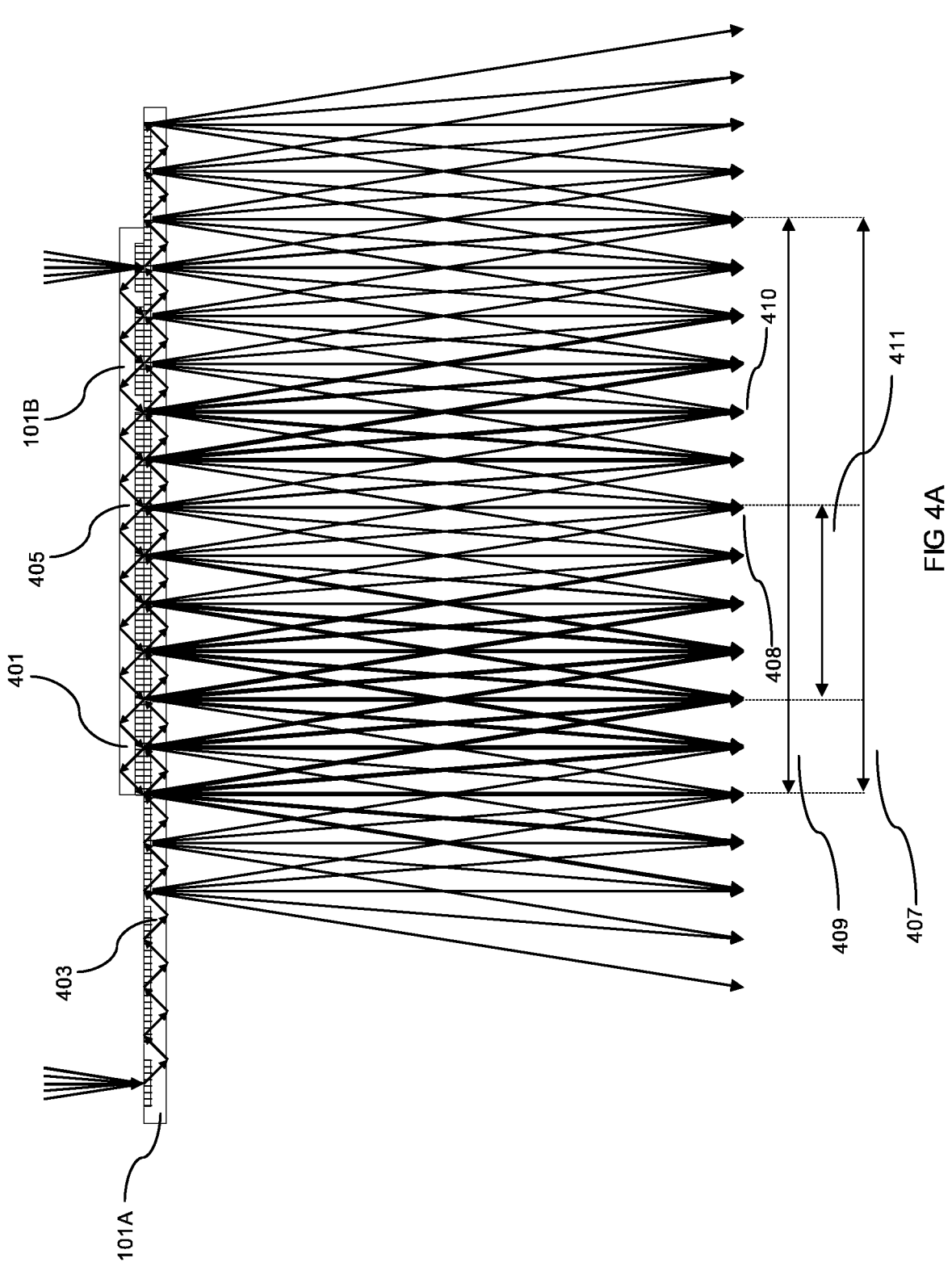
FIGS. 4A-4C show another example apparatus of the subject matter described herein.

FIG. 4A illustrates an example apparatus 401. The apparatus 401 comprises a first light guiding means 101A and a second light guiding means 101B, with components as previously described.

The first light guiding means 101A is configured to provide a first image, the second light guiding means 101B is configured to provide a second image. The apparatus 401 is configured so that at least one of the first light guiding means 101A and the second light guiding means 101B can be moved between at last two different positions to change the relative position of the first light guiding means 101A and the second light guiding means 101B.

The apparatus 401 is configured to maintain a combined exit pupil formed from out-coupled beams from the first light guiding means 101A and the second light guiding means 101B as the relative position of the first and second light guiding means is changed. In at least a part of the combined exit pupil the image viewed is at least a part of the first image and at least a part of the second image.

Figure 4B:
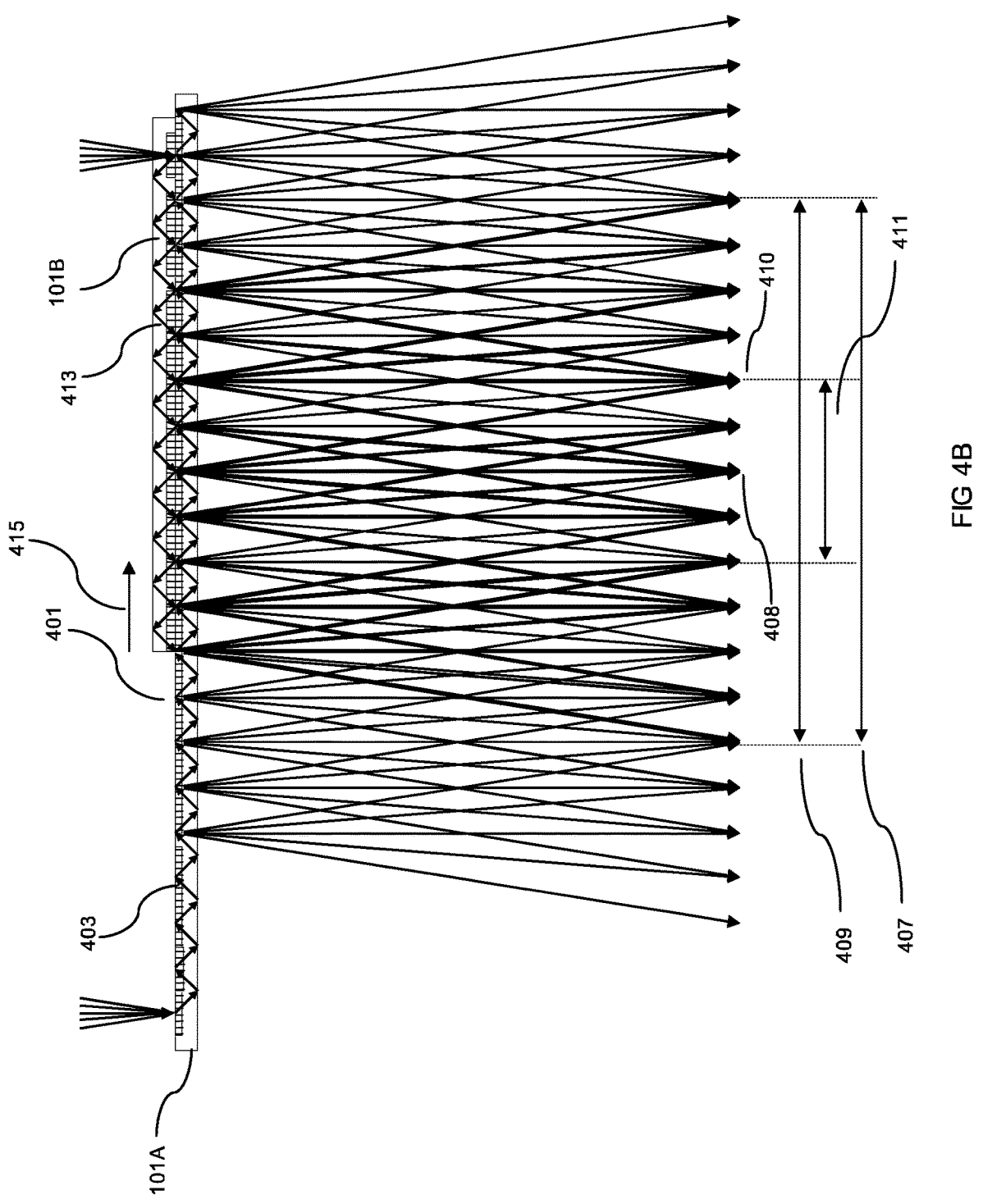

In this example, the movement of at least one of the first light guiding means 101A and the second light guiding means 101B is translational movement of the first light guiding means 101A. FIG. 4B illustrates the example apparatus 401 as the second light guiding means 101B moves translationally.

In this example, the first image and second image comprise the same image content. In a part of the combined exit pupil the image viewed is a combination of the first image and at least a part of the second image. The part of the second image that combines to form the viewed image varies depending on the viewing position. The translational movement from a first relative position of the first light guiding means 101A and the second light guiding means 101B to a second relative position changes the brightness of part of the image viewed in some of the viewing positions within the combined exit pupil.

The second light guiding means 101B is stacked on top of the first light guiding means 101A in the example apparatus 401. The second light guiding means 101B has a smaller exit pupil compared to the first light guiding means 101A but provides an image with the same image content and the same field-of-view. In another example, the field-of-view of the second light guiding means 101B can be smaller and the resulting exit pupil thus larger.

As the second light guiding means 101B overlaps the first light guiding means 101A, some of the out-coupled beams of light from the first light guiding means 101A and the second light guiding means 101B constructively combine to increase the brightness of at least part of some of the images viewed within the combined exit pupil.

In FIG. 4A, the first light guiding means 101A is at a first position 403, and the second light guiding means 101B is at a first position 405.

The combined exit pupil is illustrated by arrow 407. The exit pupil of the first light guiding means 101A is illustrated by arrow 409. The exit pupil of the second light guiding means 101B is illustrated by arrow 411.

FIG. 4B illustrates the example apparatus 401 after the second light guiding means has moved to second position 413, with the movement from the first position 405 illustrated by arrow 415. The translational movement from the first relative position of the first light guiding means 101A and the second light guiding means 101B to a second relative position changes the brightness of part of the image viewed in some of the viewing positions within the combined exit pupil.

Figure 4C:
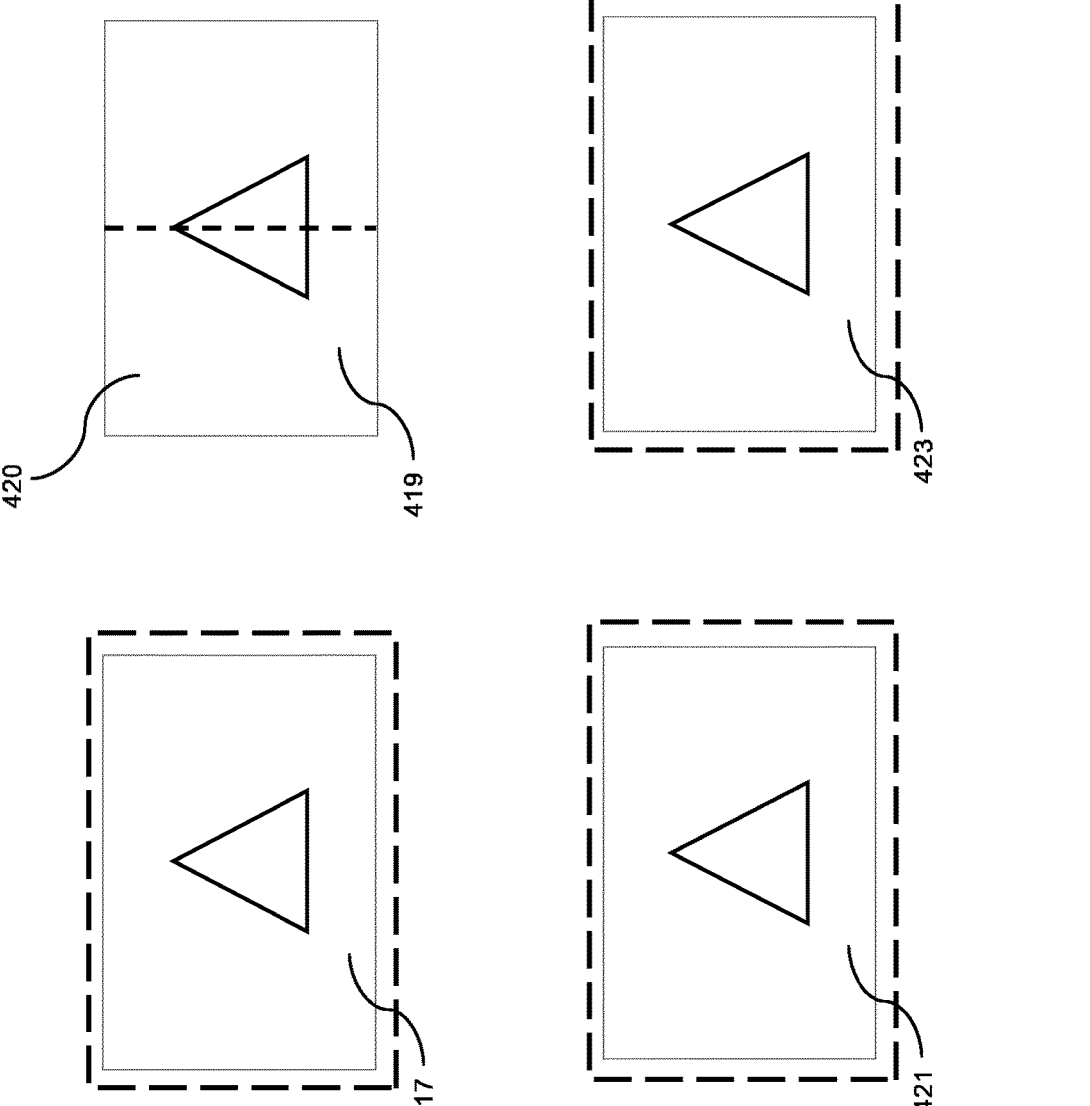

FIG. 4C illustrates example images viewed in FIG. 4A and FIG. 4B.

Image 417 is the image seen at viewing position 408 in FIG. 4A. Image 419 is the image viewed at position 410 in FIG. 4A. Image 419 has a portion 420 of increased brightness. The dotted line illustrates the boundary between the portion of increased brightness and the rest of the image with normal brightness. The entire image 417 is at increased brightness as illustrated by the dashed rectangle.

Image 421 is the image viewed in FIG. 4B at position 408 and image 423 is the image viewed at position 410 in FIG. 4B. Both of these images are at increased brightness across the entire image. Therefore, as seen from these images, the image viewed at position 408 has not changed between the first relative position of the first light guiding means 101A and the second light guiding means 101B to the second relative position, whereas the image viewed at position 410 has changed in brightness in part of the image.

Figure 5A:
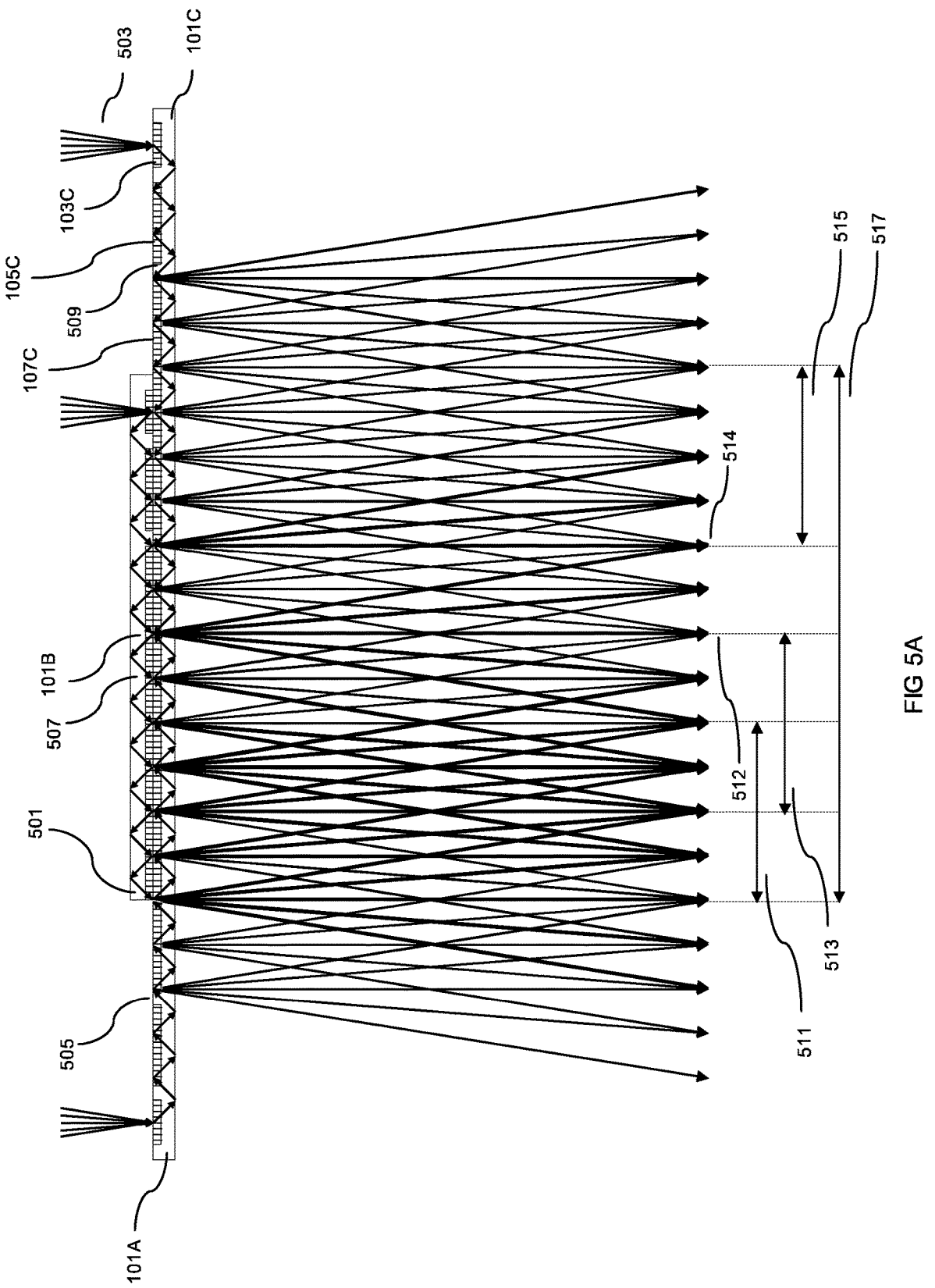
FIGS. 5A-5C show another example apparatus of the subject matter described herein.

FIG. 5A illustrates an example apparatus 501. Apparatus 501 comprises a first light guiding means 101A and a second light guiding means 101B, with components as previously described. The first light guiding means 101A is configured to provide a first image, the second light guiding means 101B is configured to provide a second image. The apparatus 501 is configured so that at least one of the first light guiding means 101A and the second light guiding means 101B can be moved between at least two different positions to change the relative position of the first light guiding means 101A and the second light guiding means 101B. the apparatus 501 is configured to maintain a combined exit pupil formed from out-coupled beams from the first light guiding means 101A and the second light guiding means 101B as the relative position of the first and second light guiding means is changed. In at least a part of the combined exit pupil the image viewed is at least part of the first image and at least part of the second image.

In this example the apparatus 501 comprises a third light guiding means 101C comprising at least: third in-coupling diffractive means 103C configured to in-couple one or more third input beams of light (represented by arrow 503) into the third light guiding means 101C from a third light engine, third expanding means 105C configured to expand the one or more third input beams of light from the third light engine to form one or more third expanded beams of light, third out-coupling diffractive means 107C configured to out-couple the one or more third expanded beams of light from the third light guiding means 101C. The third light guiding means 101C is configured to provide a third image.

In this example the first image, the second image and the third image comprise the same image content.

The out-coupled beams of light from the first light guiding means 101A and the third light guiding means 101C provide a second combined exit pupil, illustrated by arrow 517. The image viewed is a combination of a part of the first image and a part of the third image. The part of the first image and the part of the third image that combine to form the viewed image vary depending on the viewing position within the second combined exit pupil. The exit pupil of the first light guiding means 101A is illustrated by arrow 511. The exit pupil of the second light guiding means 101B is illustrated by arrow 513. The exit pupil of the third light guiding means 101C is illustrated by arrow 515.

The apparatus 501 is configured so that the second light guiding means 101B can move translationally relative to the first light guiding means 101A and the third light guiding means 101C. The translational movement of the second light guiding means 101B from a first position 507 to a second position 519 changes the brightness of part of the image viewed at some viewing positions within the second combined exit pupil.

Figure 5B:
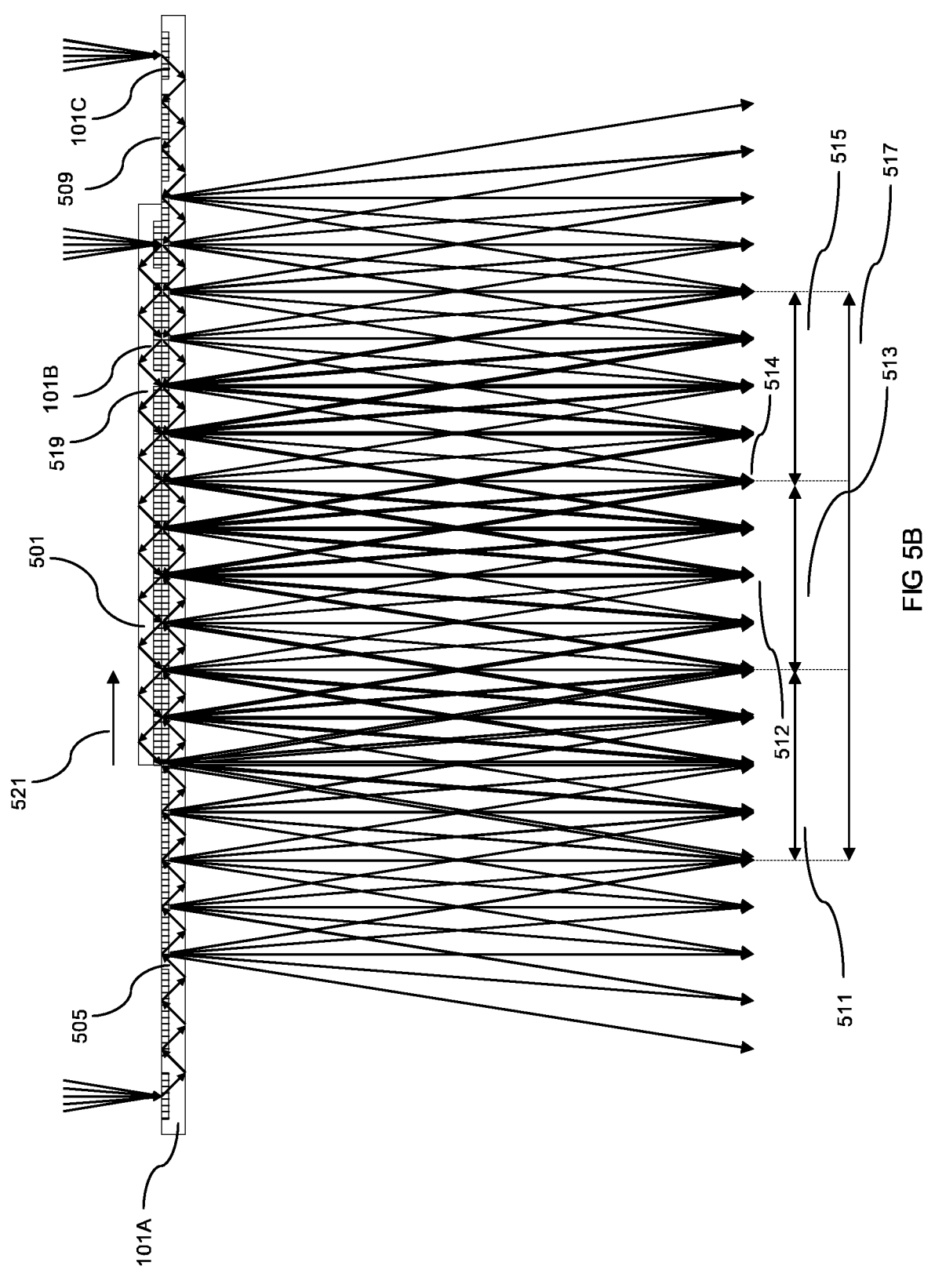

FIG. 5B illustrates the apparatus 501 after the second light guiding means 101B has moved to a second position 519 where the movement from the first position 507 is illustrated by arrow 521. The first light guiding means 101A and the third light guiding means 101C remain in their first positions 505, 509 respectively. Similar to FIG. 4C, the image viewed at viewing position 512 has increased brightness across the entire image in both FIG. 5A and FIG. 5B. The image viewed at position 514 changes from FIG. 5A to FIG. 5B, where in FIG. 5A a portion of the image viewed has a portion of increased brightness and in FIG. 5B the image viewed at position 514 has increased brightness across the entire image.

Figure 5C:
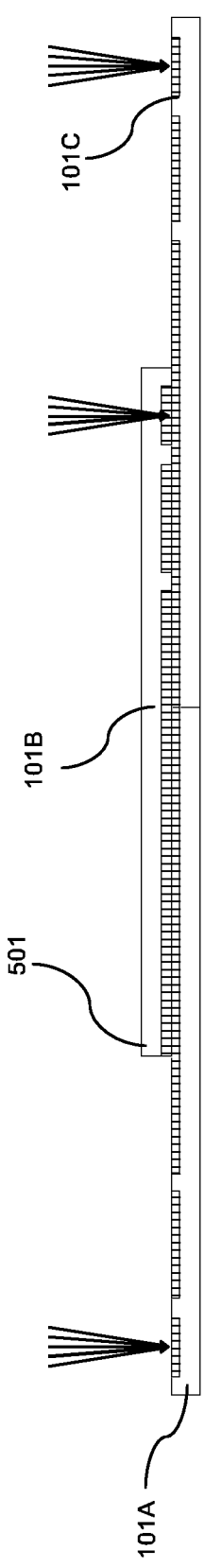

FIG. 5C illustrates the example apparatus 501 without the light paths. The joint between the first light guiding means 101A and the third light guiding means 101C is illustrated. The first light guiding means 101A and the third light guiding means 101C are joined by an abutment joint. The second light guiding means 101B overlies and is stacked on the first light guiding means 101A and the third light guiding means 101C.

Figure 6A:
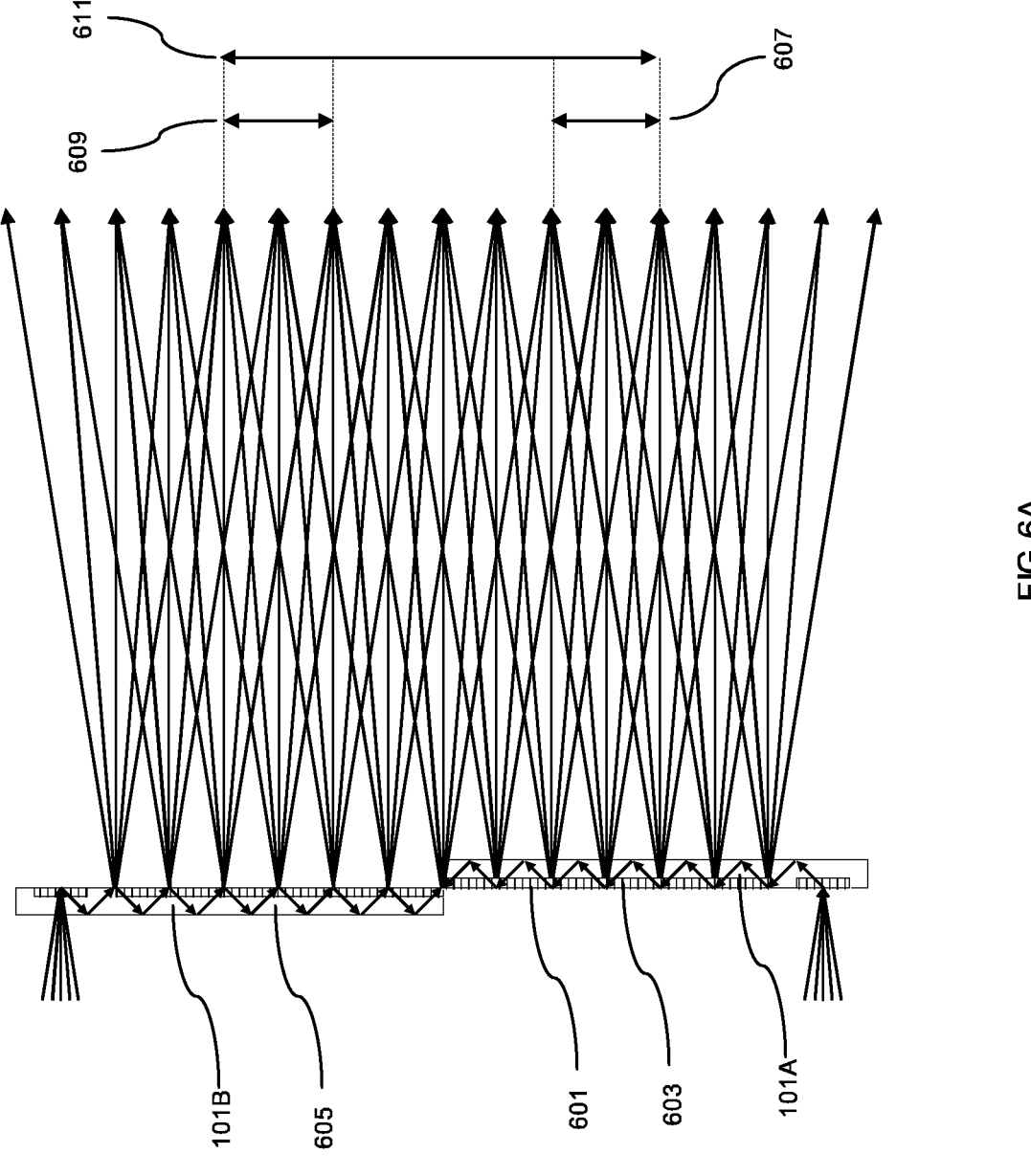
FIGS. 6A-6B show another example apparatus of the subject matter described herein.

FIG. 6A illustrates an example apparatus 601. The apparatus 601 comprises a first light guiding means 101A and a second light guiding means 101B, with components as previous described. The first light guiding means 101A is configured to provide a first image, the second light guiding means 101B is configured to provide a second image. The apparatus 601 is configured so that at least one of the first light guiding means 101A and the second light guiding means 101B can be moved between at least two different positions to change the relative position of the first light guiding means 101A and the second light guiding means 101B. The apparatus 601 is configured to maintain a combined exit pupil formed from out-coupled beams from the first light guiding means 101A and the second light guiding means 101B as the relative position of the first light guiding means 101A and the second light guiding means 101B is changed. In at least a part of the combined exit pupil the image viewed is a combination of at least a part of the first image and at least a part of the second image.

In this example the first light guiding means 101A provides a first image and the second light guiding means 101B provides a second image. In this example the first image and the second image comprise the same image content. In at least part of the combined exit pupil the image viewed is a combination of a part of the first image and a part of the second image. The part of the first image and the part of the second image that combine to form the viewed image vary depending on the viewing position.

In the example apparatus 601, the apparatus is configured to move at least one of the first light guiding means 101A and the second light guiding means 101B between at least two different positions by translational movement. The translational movement changes the size of the combined exit pupil and changes the brightness of part of the image viewed in at least some of the viewing positions within the combined exit pupil. The example apparatus 601 will change the combined exit pupil and the brightness of the images in a manner that corresponds with example apparatus 201. The difference between apparatus 601 and apparatus 201 is that the apparatus 601 is in a vertical configuration.

Figure 6B:
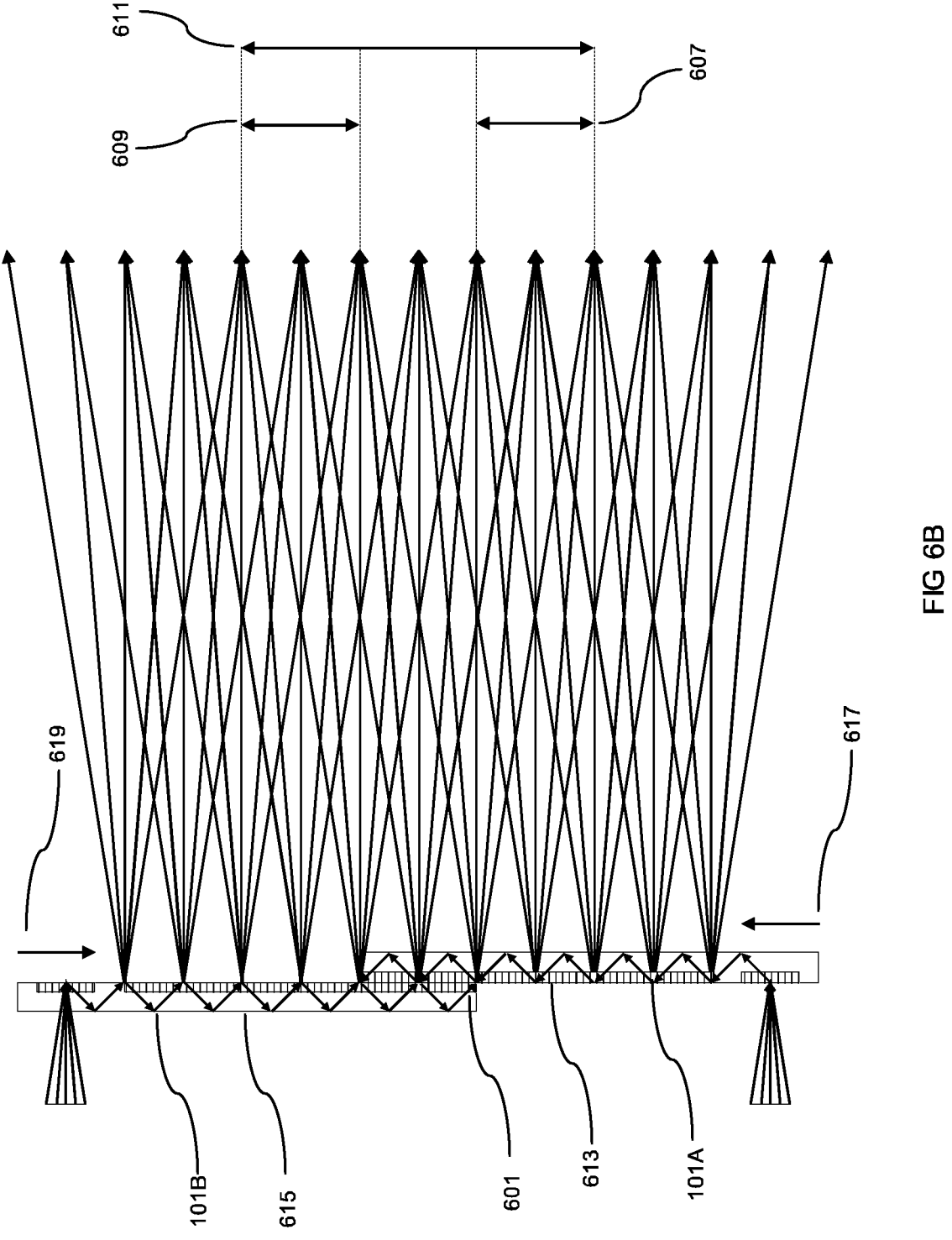

FIG. 6B illustrates translational movement of the first light guiding means 101A and the second light guiding means 101B from first positions 603, 605 respectively to second positions 613, 615 respectively, with the translational movement from the first positions 603, 605 represented by arrows 617, 619. FIG. 6B also illustrates the corresponding change in the position of the first exit pupil, represented by arrow 607, the change in position of the second exit pupil, represented by arrow 609, and the change in size of the combined exit pupil, illustrated by arrow 611. In this example, the combined exit pupil reduces in size from FIG. 6A to FIG. 6B.

Figure 7A:
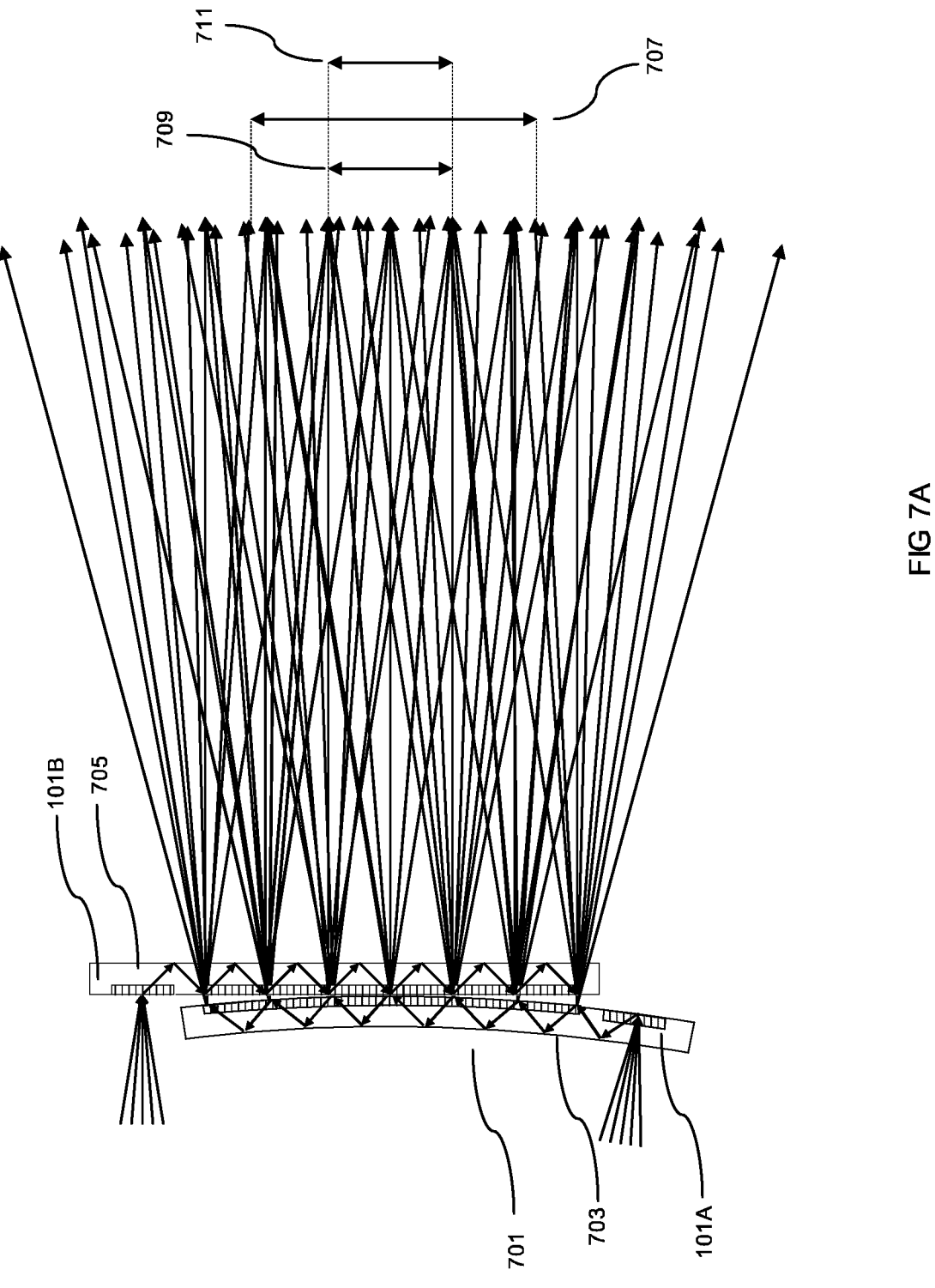
FIGS. 7A-7C show another example apparatus of the subject matter described herein.

FIG. 7A illustrates an example apparatus 701. The apparatus 701 comprises a first light guiding means 101A and a second light guiding means 101B, with components as previously described. The first light guiding means 101A is configured to provide a first image, the second light guiding means 101B is configured to provide a second image. The apparatus 701 is configured so that the second light guiding means 101B can be moved between at least two different positions to change the relative position of the first light guiding means 101A and the second light guiding means 101B.

The apparatus 701 is configured to maintain a combined exit pupil formed from out-coupled beams from the first light guiding means 101A and the second light guiding means 101B as the relative position of the first light guiding means 101A and the second light guiding means 101B is changed.

In this example the image viewed within the combined exit pupil is a combination of the first image and the second image.

In this example the first light guiding means 101A is a spherical exit pupil expander which provides near focus, a small image or field-of-view, and a large exit pupil. The second light guiding means 101B has infinite distance focus and provides a large image size or field-of-view, and a small exit pupil.

For the first light guiding means 101A, the image focus is located at the center of curvature of the exit pupil expander plate, and thus the focus distance is controlled by the set radius or curvature of the exit pupil expander. The first light engine has a finite focus distance set to match the curvature of the exit pupil expander of the first light guiding means 101A. In the combined exit pupil, the image viewed is a multi-focus image.

Figure 7B:
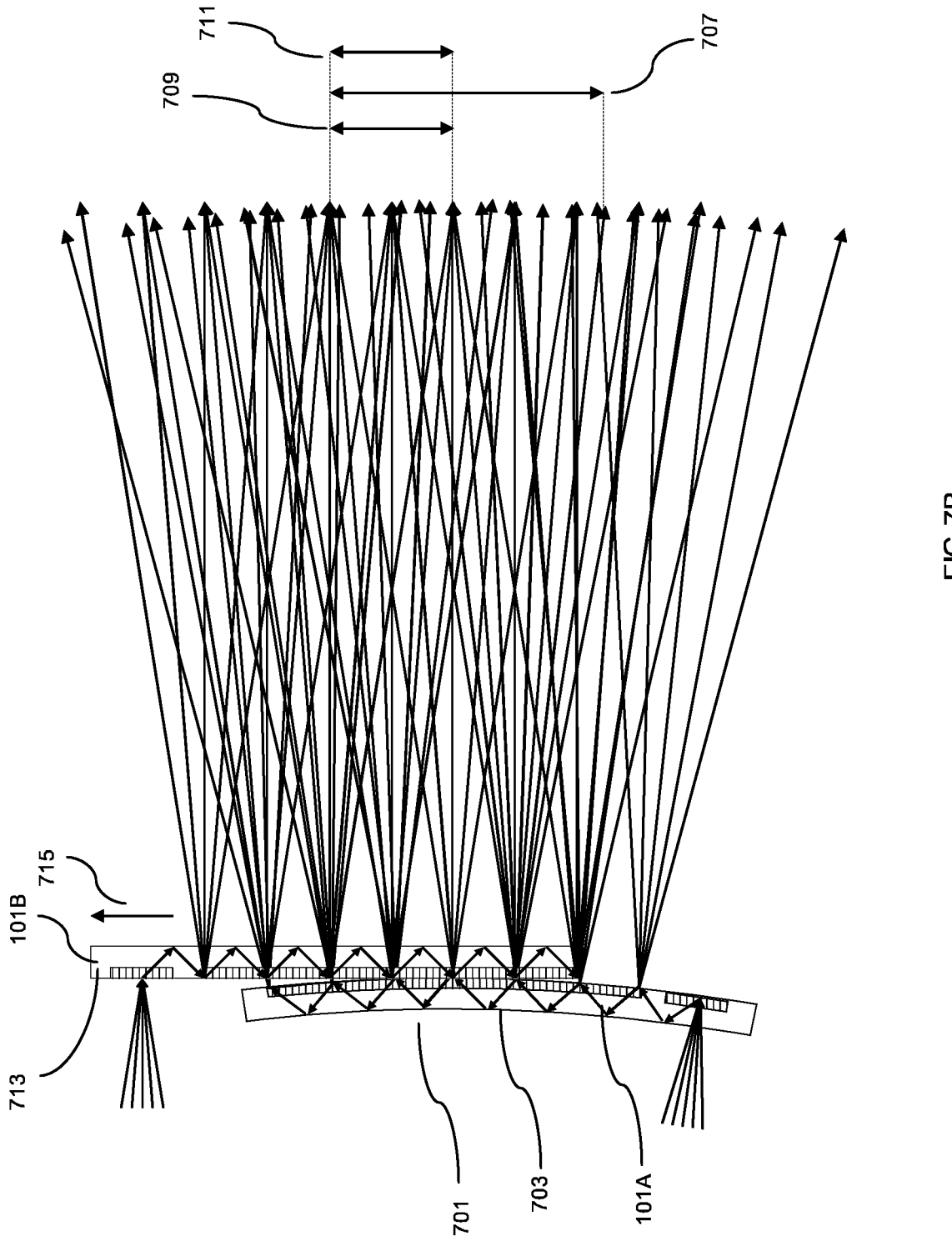

FIG. 7B illustrates example apparatus 701 after the second light guiding means 101B has been moved to second position 713 from a first position 705, with the translational movement from the first position 705 illustrated by arrow 715. The first light guiding means 101A remains in its first position 703. As illustrated in FIG. 7B the position of the combined exit pupil, illustrated by arrow 711 has changed. The size of the combined exit pupil has remained the same. The exit pupil of the first light guiding means is represented by arrow 707, and the exit pupil of the second light guiding means 101B is represented by arrow 709.

In this example the out-coupling diffractive means 107A and the second out-coupling diffractive means 107B are the same size and fully overlapping, but the exit pupil sizes are different. The first light guiding means 101A has a larger exit pupil.

In an alternative example of the example apparatus 701, the field-of-views or image sizes provided by the first light guiding means 101A and the second light guiding means 101B could substantially match. In another alternative example of the example apparatus 701, the second light guiding means 101B could also provide near focus but with a different focus distance compared to the first light guiding means 101A. In yet another alternative example of the example apparatus 701, the curvature of the light guiding means would not be spherical, but an aspheric 2D curved shape designed to compensate for distortions created by other optical components in a head-up display system.

Figure 7C:
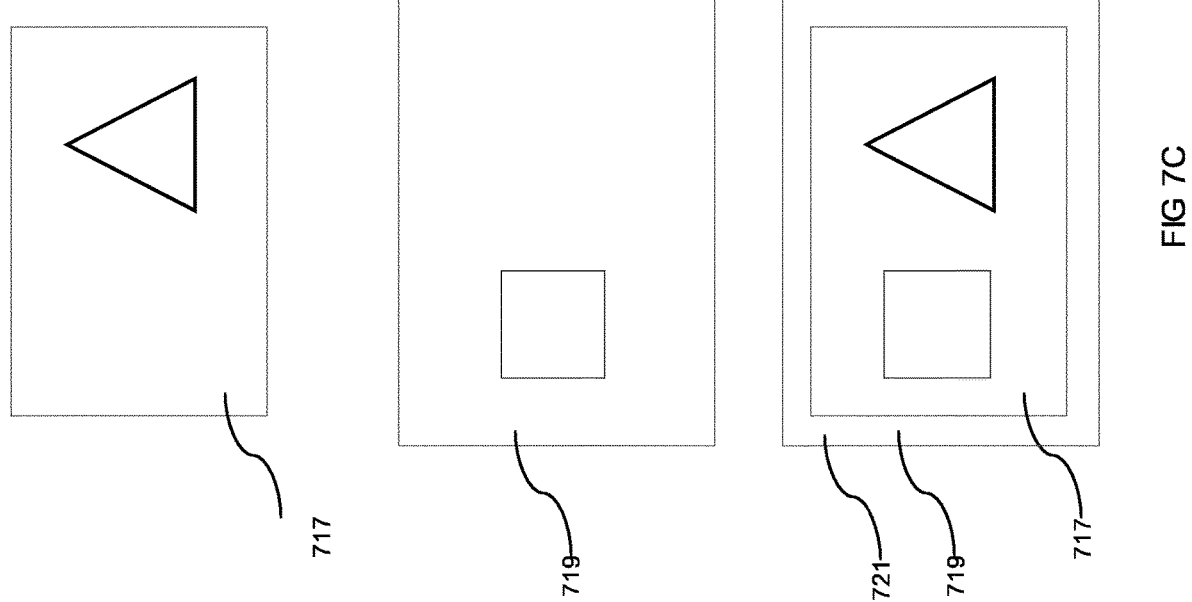

FIG. 7C illustrates an example first image 717, an example second image 719 and example combined image 721 viewed within the combined exit pupil of apparatus 701. First image 717 is smaller than second image 719 and is at nearer focus. The illustration of this combined multi-focus image 721 could be considered to be taken through a pinhole lens, as all the objects appear to be in perfect focus. In this example the first image and the second image comprise different image content.

Figure 8A:
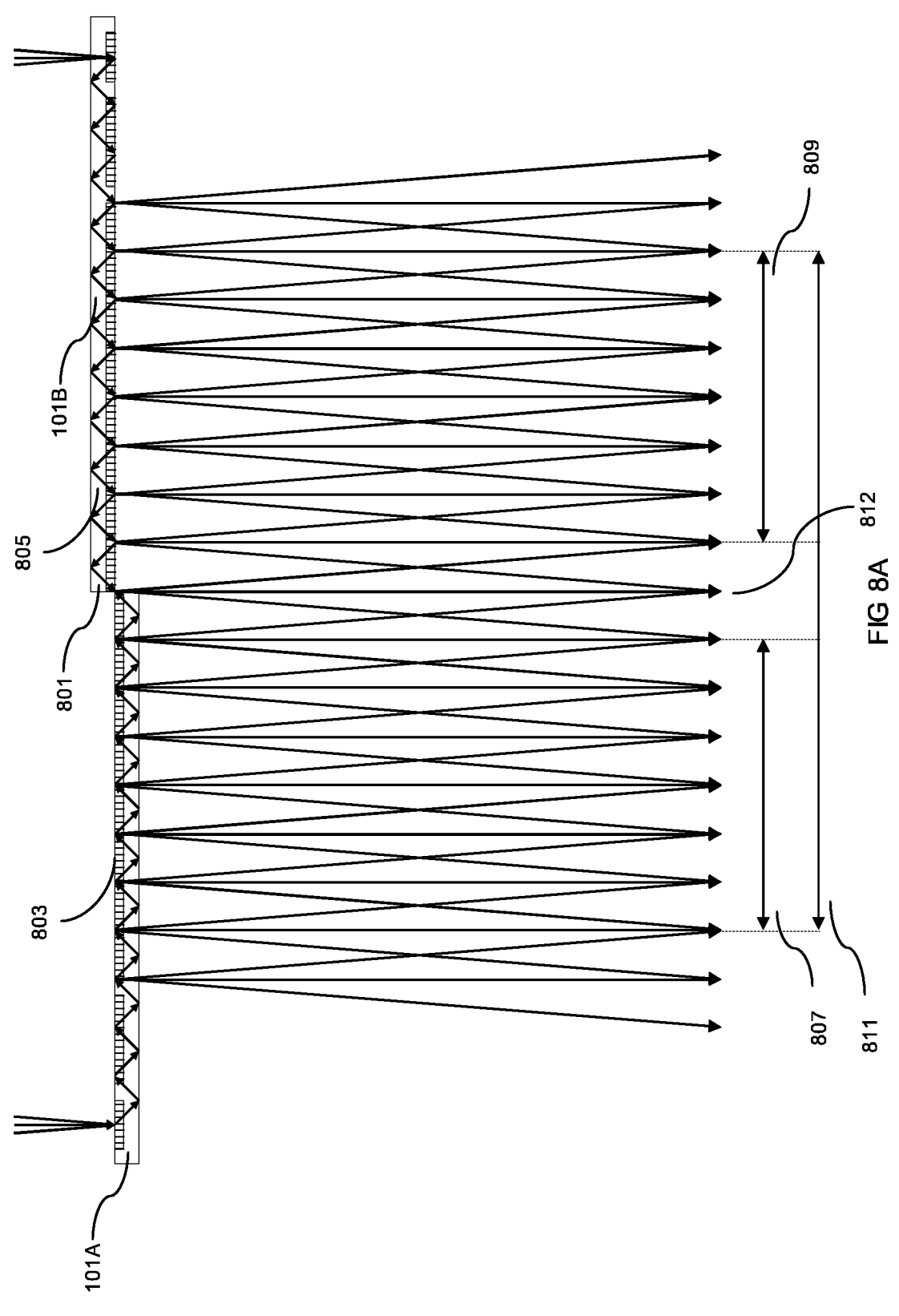
FIGS. 8A-8C show another example apparatus of the subject matter described herein.

FIG. 8A illustrates an example apparatus 801. Example apparatus 801 comprises a first light guiding means 101A and a second light guiding means 101B with components as previously described. The first light guiding means 101A is configured to provide a first image, the second light guiding means is configured to provide a second image. The apparatus 801 is configured so that at least one of the first light guiding means 101A and the second light guiding means 101B can be moved between at least two different positions to change the relative position of the first light guiding means and the second light guiding means.

The apparatus is configured to maintain a combined exit pupil formed from out-coupled beams from the first light guiding means 101A and the second light guiding means 101B as the relative position of the first and second light guiding means is changed. In at least a part of the combined exit pupil the image viewed is at least a part of the first image and at least a part of the second image.

In example apparatus 801, the movement of at least one of the first light guiding means 101A and the second light guiding means 101B between at least two different positions comprises rotational movement of the first light guiding means 101A and the second light guiding means 101B.

Figure 8B:
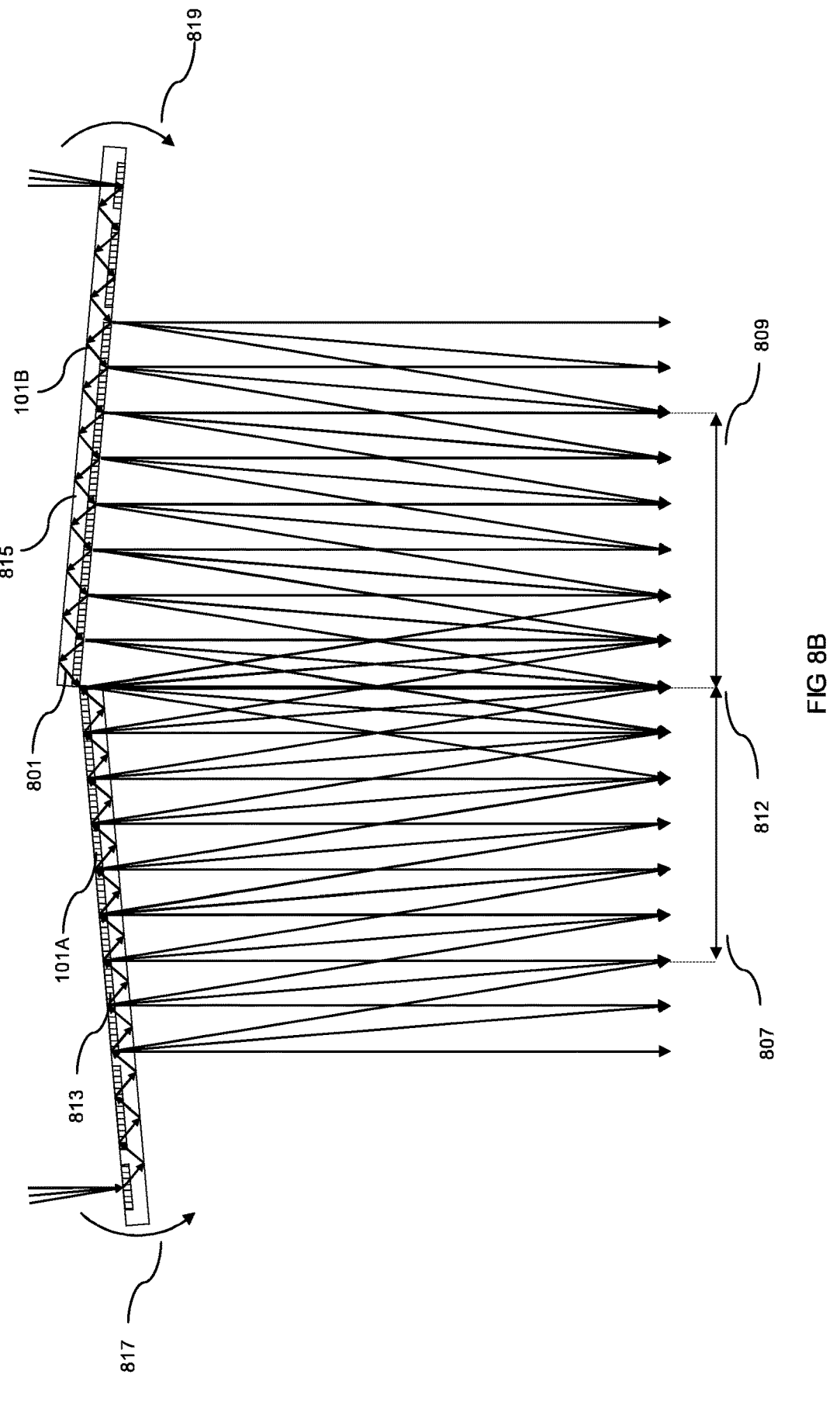

FIG. 8B illustrates the apparatus 801 after the first light guiding means 101A has been rotated to second position 813 from first position 803. The rotational movement is illustrated by arrow 817. The second light guiding means 101B has rotated to second position 815, from first position 805 as illustrated by arrow 819.

In the first relative position of the first light guiding means 101A and the second light guiding means 101B as illustrated in FIG. 8A, in at least a part of the combined exit pupil the image viewed is a combination of a part of the first image and a part of the second image. The part of the first image and the part of second image that combine to form the viewed image vary depending on the viewing position. In the first relative position of the first light guiding means 101A and the second light guiding means 101B, the first image and the second image comprise the same image content. The combined exit pupil in FIG. 8A is illustrated by arrow 811. In FIG. 8A and FIG. 8B, the exit pupil of the first light guiding means 101A is illustrated by arrow 807, and the exit pupil of the second light guiding means 101B is illustrated by arrow 809.

In the second relative position of the first light guiding means 101A and the second light guiding means 101B as illustrated in FIG. 8B, the combined exit pupil is a combined field-of-view exit pupil. The combined field-of-view exit pupil exists at the point where the exit pupil of the first light guiding means and the exit pupil of the second light guiding means meet, illustrated by position 812. In this example, the first image and the second image comprise different image content in the second relative position. In the combined field-of-view exit pupil, the image viewed is a third image. The third image is a combination of the first image and the second image. The third image has a larger field-of-view than the field-of-view of the first image of the field-of-view of the second image. In the example of FIG. 8B, the relative tilting amount of the first light guiding means 101A and the second light guiding means 101B is equal to the horizontal field-of-view. For example, the horizontal field-of-view can be 10° and the first light guiding means 101A and the second light guiding means 101B have been both rotated by 5° by an equal and opposite amount.

By providing a combined field-of-view exit pupil in the second relative position, this enables a third image with a larger field-of-view that the first image or the second image to be provided. In some examples, the image content of one or both of the first image and the second image can be changed when the first light guiding means 101A and the second light guiding means 101B is in the second relative position. The image content of the first image and the second image can be changed for the second relative position so that the combined third image shown has different image content in the first portion of the third image, formed from the first image, compared to the second portion of the third image, formed from the second image.

In some examples, the first image and/or the second image remains the same when moving from the first relative position to the second relative position, and the other of the first image and/or second image changes when moving to the second relative position. In these examples, the image content of the first image and the second image in the first relative position is a portion of the image content of the third image in the second relative position.

In some examples, some objects shown in the third image can span across the first image and the second image. For example part of an object can be shown in the first image and the other part of the object can be shown in the second image, so that the entire object is viewed in the third image.

Figure 8C:
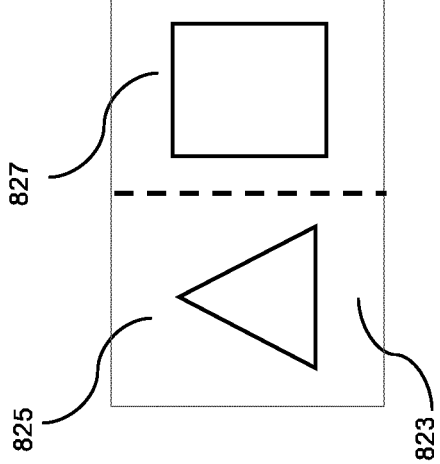
Figure 8C:
Figure 8C:
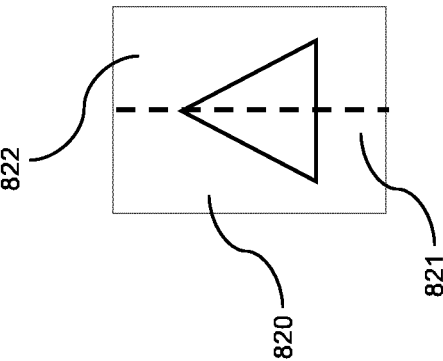

FIG. 8C illustrates an example image 821 viewed at position 812 in FIG. 8A and an example third image 823 viewable at position 812 in FIG. 8B. In this example the first image and the second image comprise the same image content in example image 821.

In image 821, portion 820 is from the first image and portion 822 is from the second image, with the dotted line illustrating the boundary between the different image portions and is not viewable in the image.

Third image 823 has a wider field-of-view than the first image and the second image. In this example image portions 825, 827 are the first image and the second image respectively. In the example third image 823, the image content of the first image has remained the same and the image content of the second image has changed. In example third image 823, the image content of the first image and the second image in the first relative position is a portion of the image content of the third image in the second relative position.

In this example the field-of-view of the combined field-of-view exit pupil has been maximized so that it is double the field-of-view of the first image or the second image. In other examples the angle of tilting of the first light guiding means 101A and the second light guiding means 101B can be less than that illustrated in FIG. 8B, and this causes partial overlap of the field-of-views of the first image and the second image. When changing the angle of tilting of the first light guiding means 101A and the second light guiding means 101B, the image content of the first image and the second image can be changed to provide a desired third image, for example, to ensure objects which span across both the first image and the second image are shown correctly.

Figure 9A:
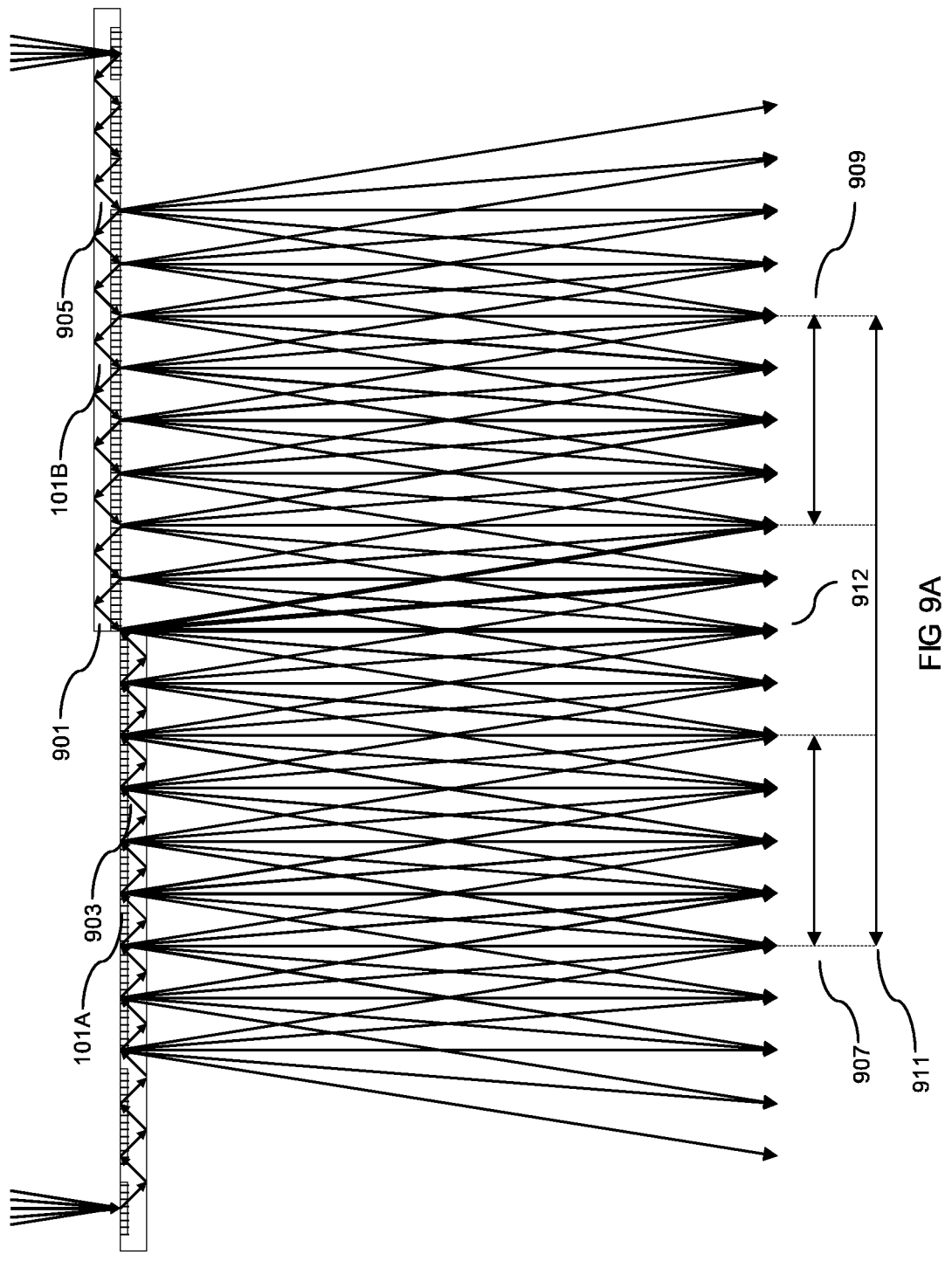
FIGS. 9A-9C show another example apparatus of the subject matter described herein.

FIG. 9A illustrates an example apparatus 901. Example apparatus 901 comprises a first light guiding means 101A and a second light guiding means 101B with components as previously described. The first light guiding means 101A is configured to provide a first image, the second light guiding means 101B is configured to provide a second image. The apparatus 901 is configured so that at least one of the first light guiding means 101A and the second light guiding means 101B can be moved between at least two different positions to change the relative position of the first light guiding means 101A and the second light guiding means 101B.

The apparatus 901 is configured to maintain a combined exit pupil formed from out-coupled beams from the first light guiding means 101A and the second light guiding means 101B as the relative position of the first and second light guiding means is changed. In at least a part of the combined exit pupil the image viewed is at least a part of the first image and at least a part of the second image.

Figure 9B:
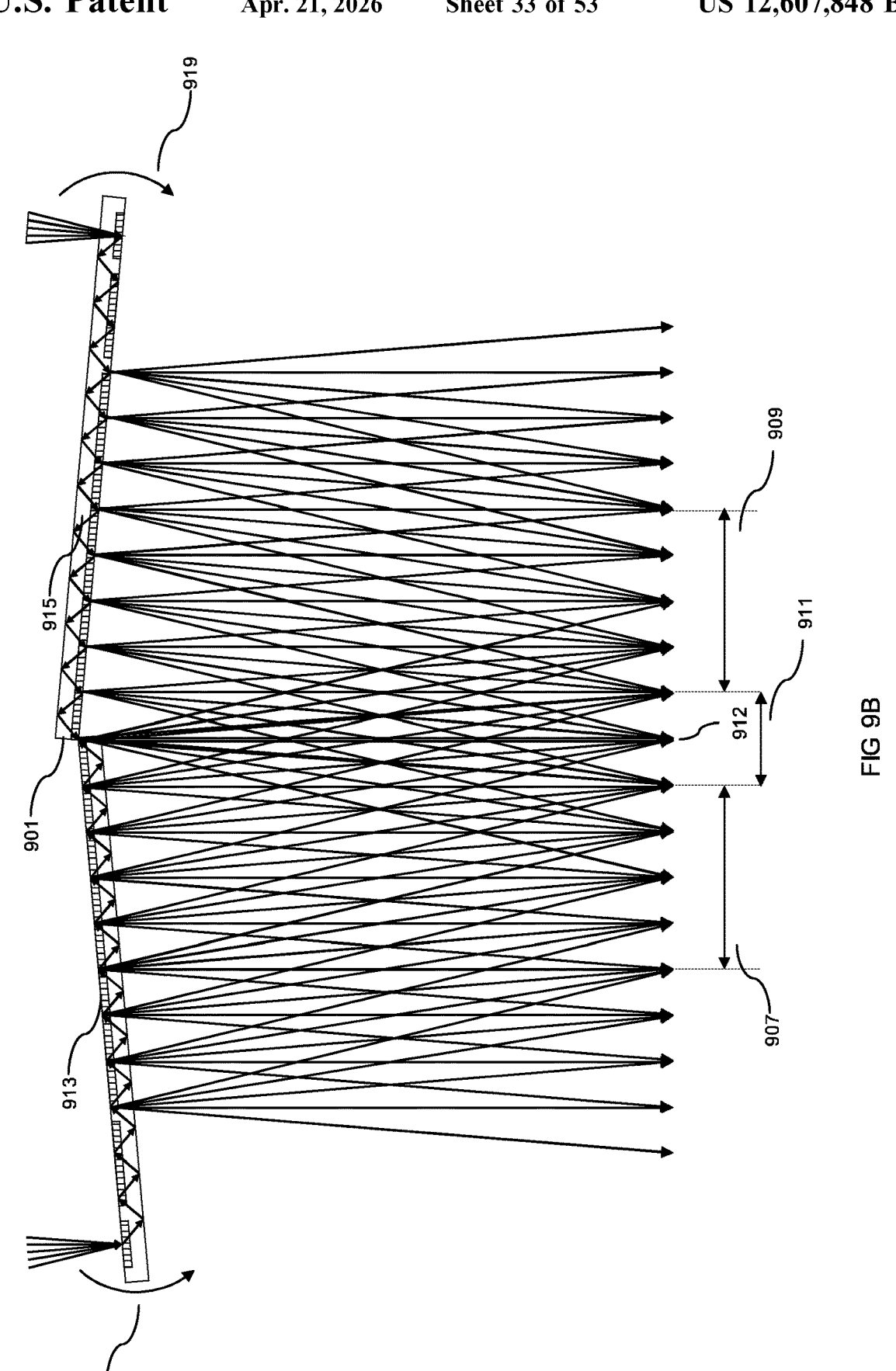

In the first relative position of the first light guiding means 101A and the second light guiding means 101B as illustrated in FIG. 9A, in at least a part of the combined exit pupil the image viewed is a combination of a part of the first image and a part of the second image. The part of the first image and the part of second image that combine to form the viewed image vary depending on the viewing position. In the first relative position of the first light guiding means 101A and the second light guiding means 101B, the first image and the second image comprise the same image content. The combined exit pupil in FIG. 9A is illustrated by arrow 911. In FIG. 9A and FIG. 9B, the exit pupil of the first light guiding means 101A is illustrated by arrow 907, and the exit pupil of the second light guiding means 101B is illustrated by arrow 909.

In example apparatus 901, the movement of at least one of the first light guiding means 101A and the second light guiding means 101B between at least two different positions comprises rotational movement of the first light guiding means 101A and the second light guiding means 101B.

FIG. 9B illustrates the apparatus 901 after the first light guiding means 101A has been rotated to second position 913 from first position 903. The rotational movement is illustrated by arrow 917. The second light guiding means 101B has rotated to second position 915, from first position 905 as illustrated by arrow 919.

In the second relative position of the first light guiding means 101A and the second light guiding means 101B as illustrated in FIG. 9B, the combined exit pupil is a combined field-of-view exit pupil. The combined field-of-view exit pupil exists in the region represented by arrow 911 in FIG. 9B. In this example, the first image and the second image comprise image content which is partially different. In the combined field-of-view exit pupil, the image viewed is a third image. The third image is a combination of the first image and the second image. The third image has a larger field-of-view than the field-of-view of the first image and the field-of-view of the second image. In the example of FIG. 9B, the relative tilting amount of the first light guiding means 101A and the second light guiding means 101B is such that the field-of-view of the first image and the field-of-view of the second image partially overlap and align. In this example, the first image and the second image comprise image content which is partially the same, which enables alignment of the image content that is the same in the first image and the second image. In this example, the portions of the first image and the second image which overlap and align, and are the same image content, have reduced brightness in the source images from the first light engine and the second light engine, so that when they overlap and align, the resulting third image can have uniform brightness across the entire image. This means that light energy can be saved while maintaining the original brightness.

Figure 9C:
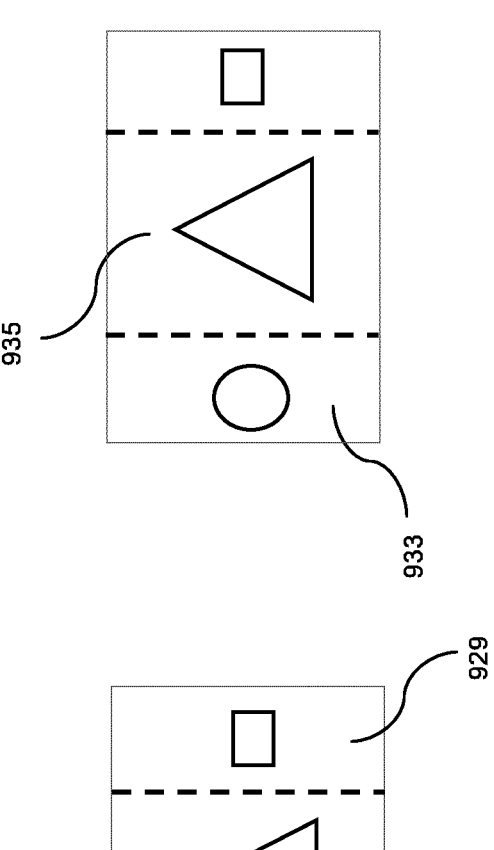
Figure 9C:
Figure 9C:
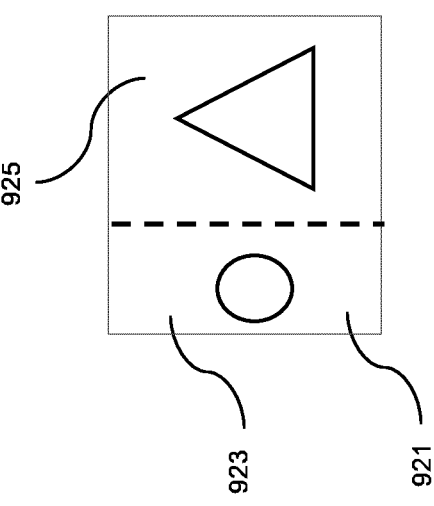

FIG. 9C illustrates an example first image 921, an example second image 927 and an example third image 933 for the apparatus 901 when the first light guiding means 101A and the second light guiding means 101B are in the second relative position.

First image 921 comprises a first portion 923 and a second portion 925. Second image 927 comprises a first portion 929 and a second portion 931. The first portions 923, 929, comprise different image content. Second portions 925, 931 comprise the same image content.

The third image 933 is a combination of the first image 921 and the second image 927 and has a larger field-of-view than the first image 921 or the second image 927. The field-of-views of the first image 921 and the second image 927 overlap partially such that the second image portions 925, 931, overlap and are aligned, creating the first portion 935 of the third image 933.

Figure 10A:
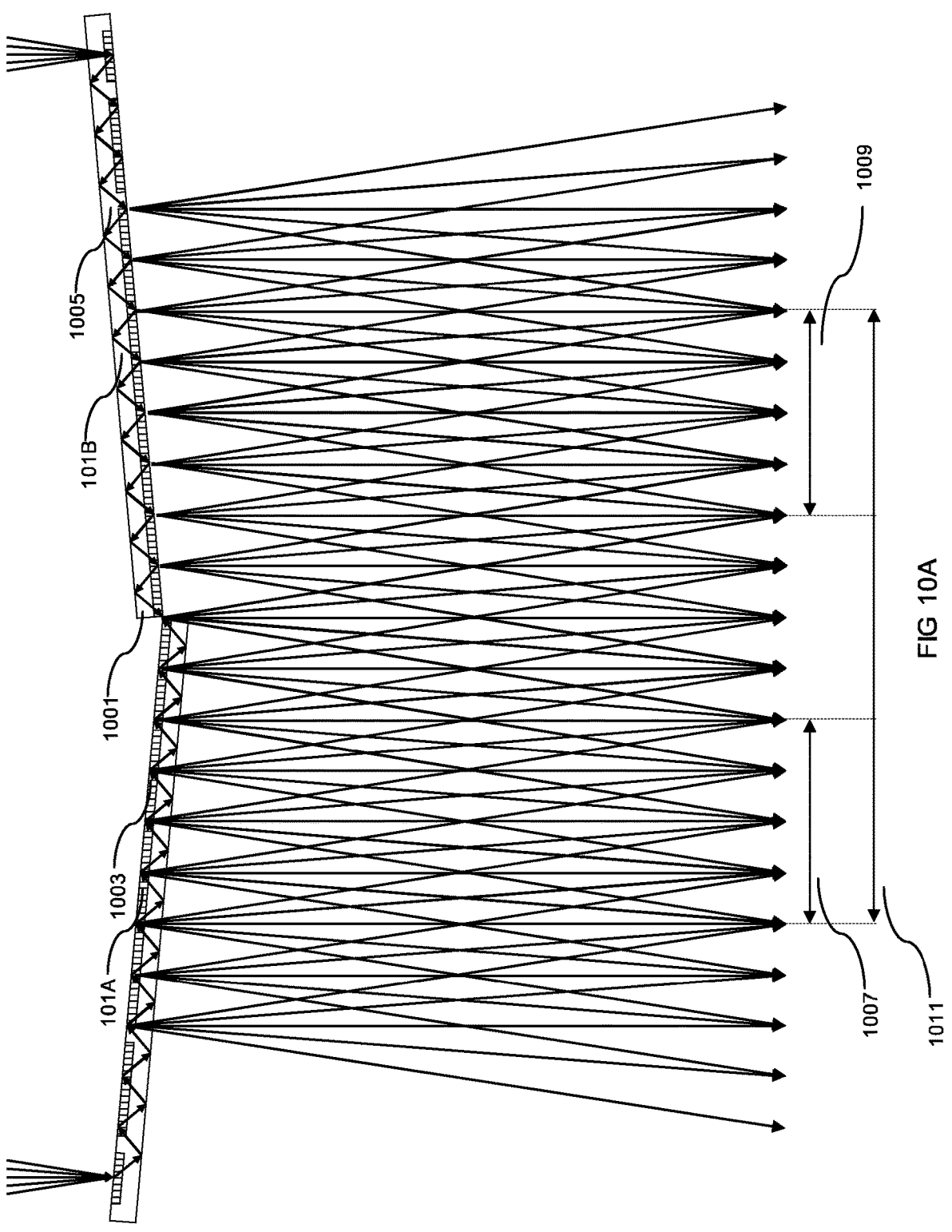
FIGS. 10A-10F show another example apparatus of the subject matter described herein.

FIG. 10A illustrates an example apparatus 1001. The apparatus 1001 comprises a first light guiding means 101A and a second light guiding means 10B with components as previously described. The first light guiding means 101A is configured to provide a first image, the second light guiding means 101B is configured to provide a second image. The apparatus is configured so that at least one of the first light guiding means 101A and the second light guiding means 101B can be moved between at least two different positions to change the relative position of the first light guiding means 101A and the second light guiding means 101B.

The apparatus 1001 is configured to maintain a combined exit pupil formed from out-coupled beams from the first light guiding means 101A and the second light guiding means 101B as the relative position of the first light guiding means 101A and the second light guiding means 101B is changed. In at least a part of the combined exit pupil the image viewed is at least a part of the first image and at least a part of the second image.

In the example apparatus 1001, the apparatus is configured so that the first light guiding means 101A and the second light guiding means 101B can move rotationally to change their relative positions.

In a first relative position of the first light guiding means 101A and the second light guiding means 101B, as illustrated in FIG. 10A, the first light guiding means 101A is in a first position 1003 and the second light guiding means 101B is in a first position 1005. In the first relative position, the first image and the second image comprise the same image content. In the first relative position, in at least part of the combined exit pupil the image viewed is a combination of part of the first image and part of the second image. The part of the first image and the part of the second image that combine to form the viewed image vary depending on the viewing position.

In this example, in the first relative position the first light guiding means 101A and the second light guiding means 101B are tilted by equal and opposite amounts to each other. In the example apparatus 1001, the images viewed can be identical to the images viewed, for example in apparatus 201 in FIG. 2A. This is done by tilting the field-of-view of the first light guiding means 101A and the second light guiding means 101B of the one or more input beams of light to counteract the tilt of the first light guiding means 101A and the second light guiding means 101B, so that the field-of-view of the out-coupled beams is not tilted.

In FIG. 10A, the exit pupil of the first light guiding means 101A is represented by arrow 1007, the exit pupil of the second light guiding means 101B is represented by arrow 1009 and the combined exit pupil is represented by arrow 1011.

Figure 10B:
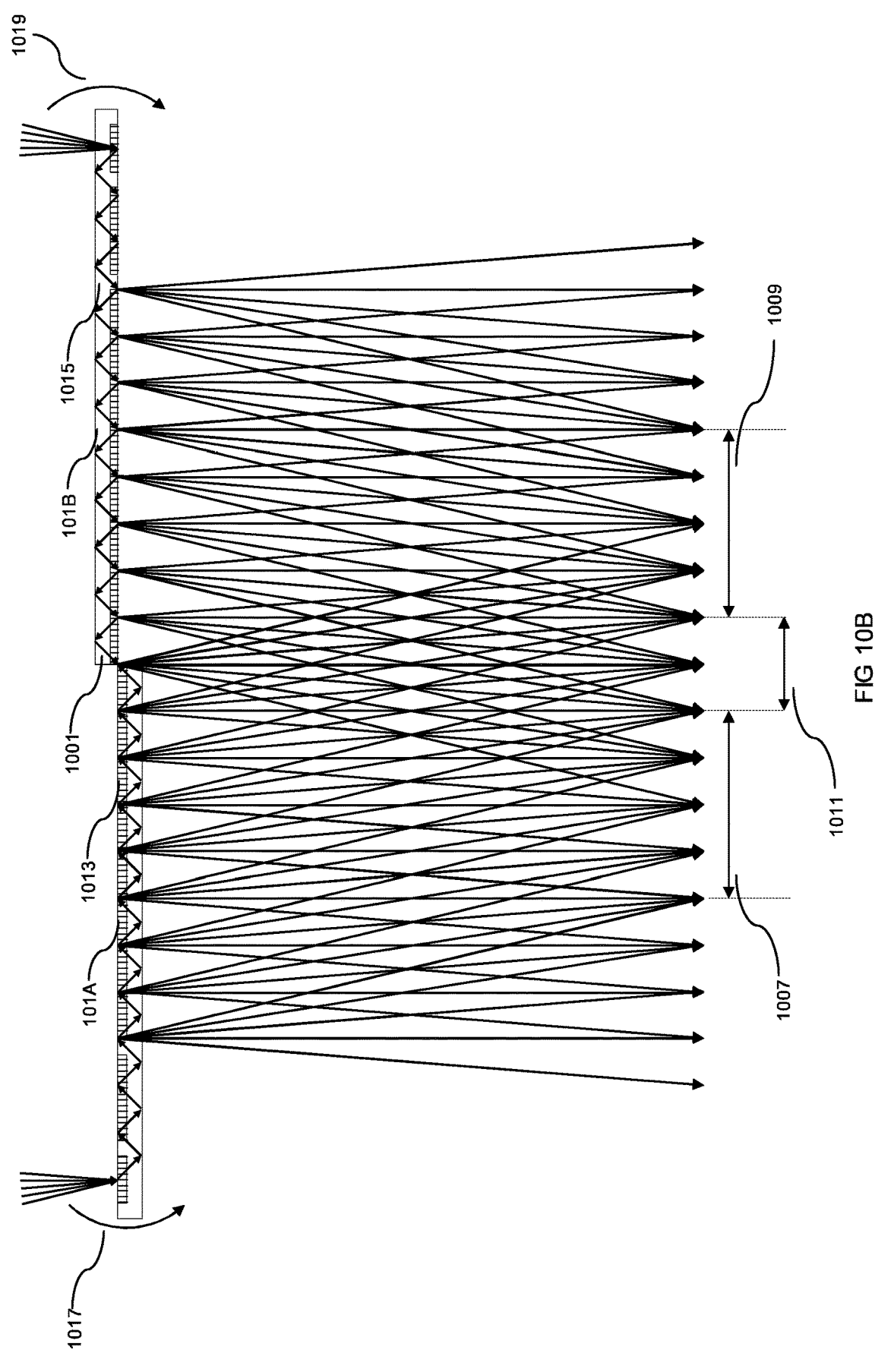

FIG. 10B illustrates the example apparatus 1001 where the first light guiding means 101A has been rotated to a second position 1013, with the rotational movement illustrated by arrow 1017. The second light guiding means 101B has been rotated to second position 1015, with the rotation movement illustrated by arrow 1019. This puts the first light guiding means 101A and the second light guiding means 101B into a second relative position.

In the second relative position of the first light guiding means 101A and the second light guiding means 101B as illustrated in FIG. 10B, the combined exit pupil is a combined field-of-view exit pupil. The combined field-of-view exit pupil exists in the region represented by arrow 1011 in FIG. 9B. In this example, the first image and the second image comprise image content which is partially different. In the combined field-of-view exit pupil, the image viewed is a third image. The third image is a combination of the first image and the second image. The third image has a larger field-of-view than the field-of-view of the first image of the field-of-view of the second image. In the example of FIG. 10B, the field-of-view of the first image and the field-of-view of the second image partially overlap and align. In this example, the first image and the second image comprise image content which is partially the same, which enables alignment of the image content that is the same in the first image and the second image. In this example, the portions of the first image and the second image which overlap and align, and are the same image content, have reduced brightness in the source images from the first light engine and the second light engine, so that when they overlap and align, the resulting third image can have uniform brightness across the entire image. This means that light energy can be saved while maintaining the original brightness.

The example first image 921, example second image 927 and example third image 933 illustrated in FIG. 9C are also example images for the first image, the second image and the third image in FIG. 10B.

Apparatus 1001 is configured so that when the first light guiding means 101A and the second light guiding means 101B are in the second relative position, at least one of the first light guiding means 101A and the second light guiding means 101B can move translationally, so that the first light guiding means 101A and second light guiding means 101B can move translationally between being in the second relative position to at least one other relative position.

The image content of the first image and the second image do not change between the second relative position and the at least one other relative position. Within the second relative position and the at least one other relative position the first light guiding means 101A and the second light guiding means 101B are arranged so that in the combined field-of-view exit pupil a portion of the first image and a portion of the second image overlap and align. For example, portions which correspond to second portion 925 and second portion 931 in FIG. 9C overlap and align.

Translationally moving from the second relative position to the at least one other relative position changes the size of the combined field-of-view exit pupil.

Figure 10C:
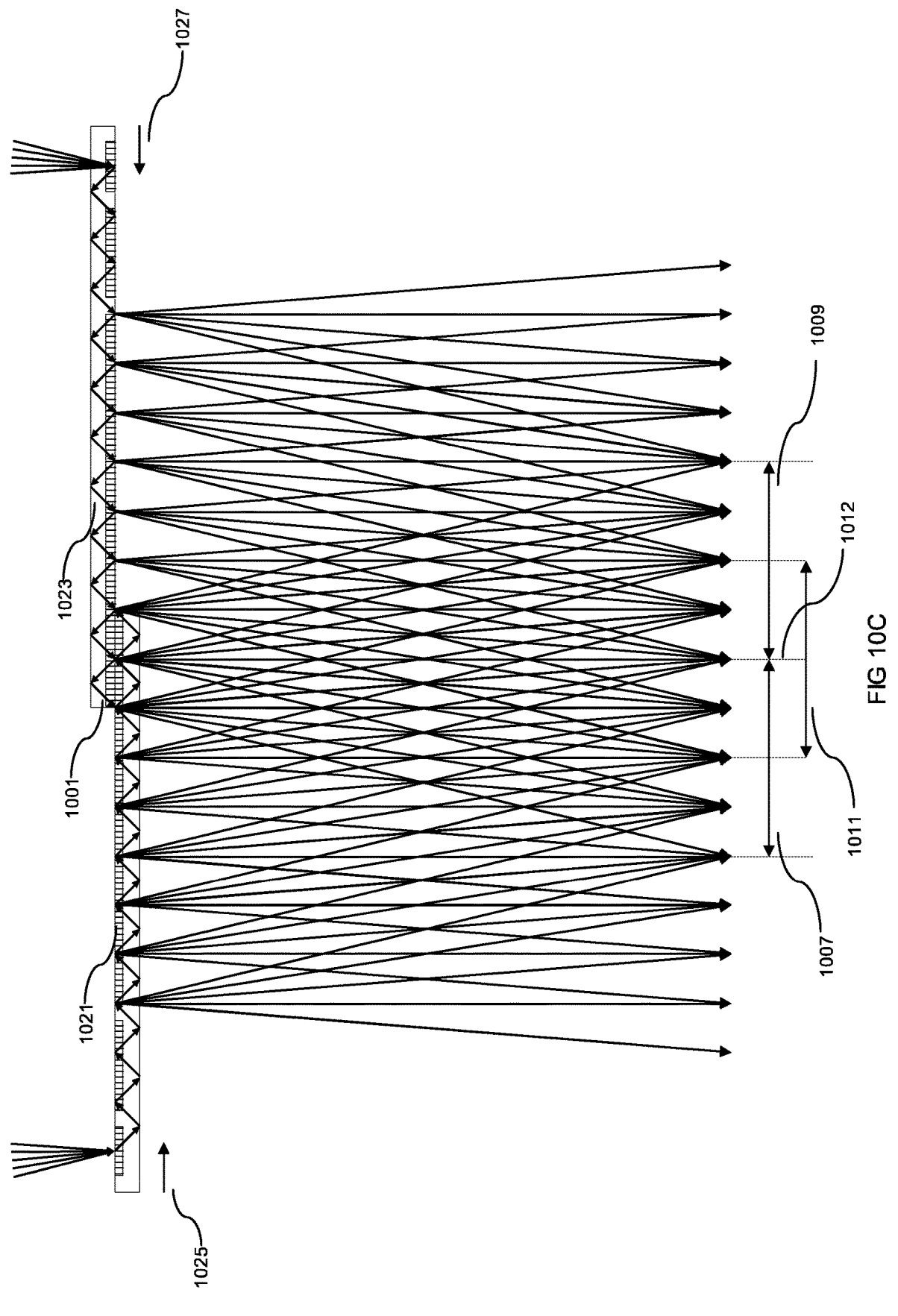

FIG. 10C illustrates the example apparatus 1001 where the first light guiding means 101A and the second light guiding means 101B have been moved to a third relative position, which is an example other relative position. The first light guiding means 101A has been moved to a third position 1021, with the translational movement from the second position 1013 illustrated by arrow 1025 and the second light guiding means 101B has been moved to a third position 1023 with the translational movement from the second position 1015 illustrated by arrow 1027. In FIG. 10C, the combined field-of-view exit pupil, illustrated by arrow 1011, has increased in size from its size illustrated at the second relative position in FIG. 10B.

Figure 10D:
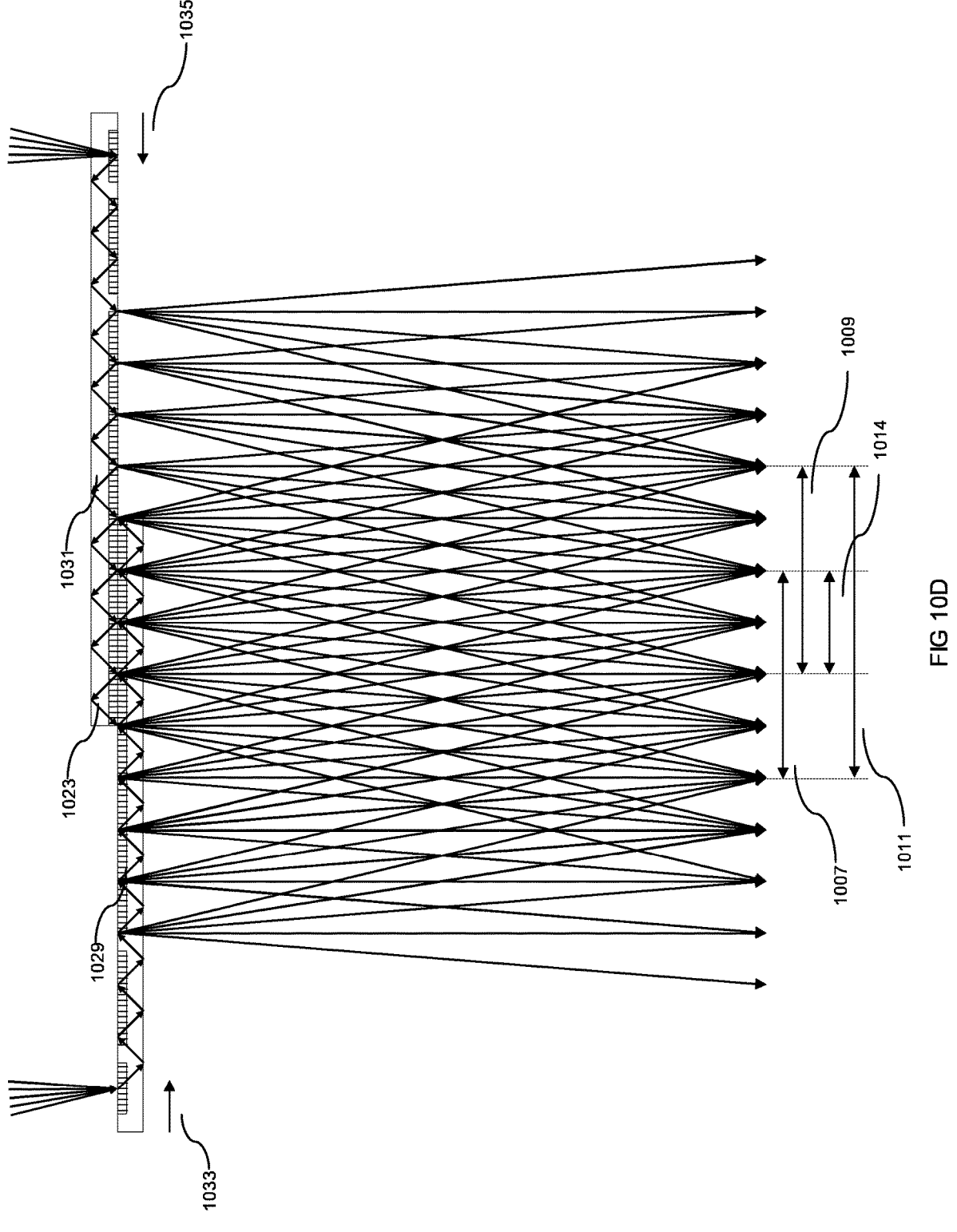

FIG. 10D illustrates the apparatus 1001 after it has moved to a fourth relative position of the first light guiding means 101A and the second light guiding means 101B. the fourth relative position is an example other relative position. The first light guiding means 101A has been moved to a fourth position 1029, with the translational movement from the third position 1021 illustrated by arrow 1033. The second light guiding means 101B has been moved to a fourth position 1031. The translational movement from the third position 1023 has been illustrated by arrow 1035. In this example the size of the combined field-of-view exit pupil has been maximized, this is because the overlap of the first out-coupling diffractive means 107A and the second out-coupling diffractive means 107B is the same size as each of the exit pupils of the first light guiding means 101A and the exit pupil of the second light guiding means 101B.

Figure 10E:
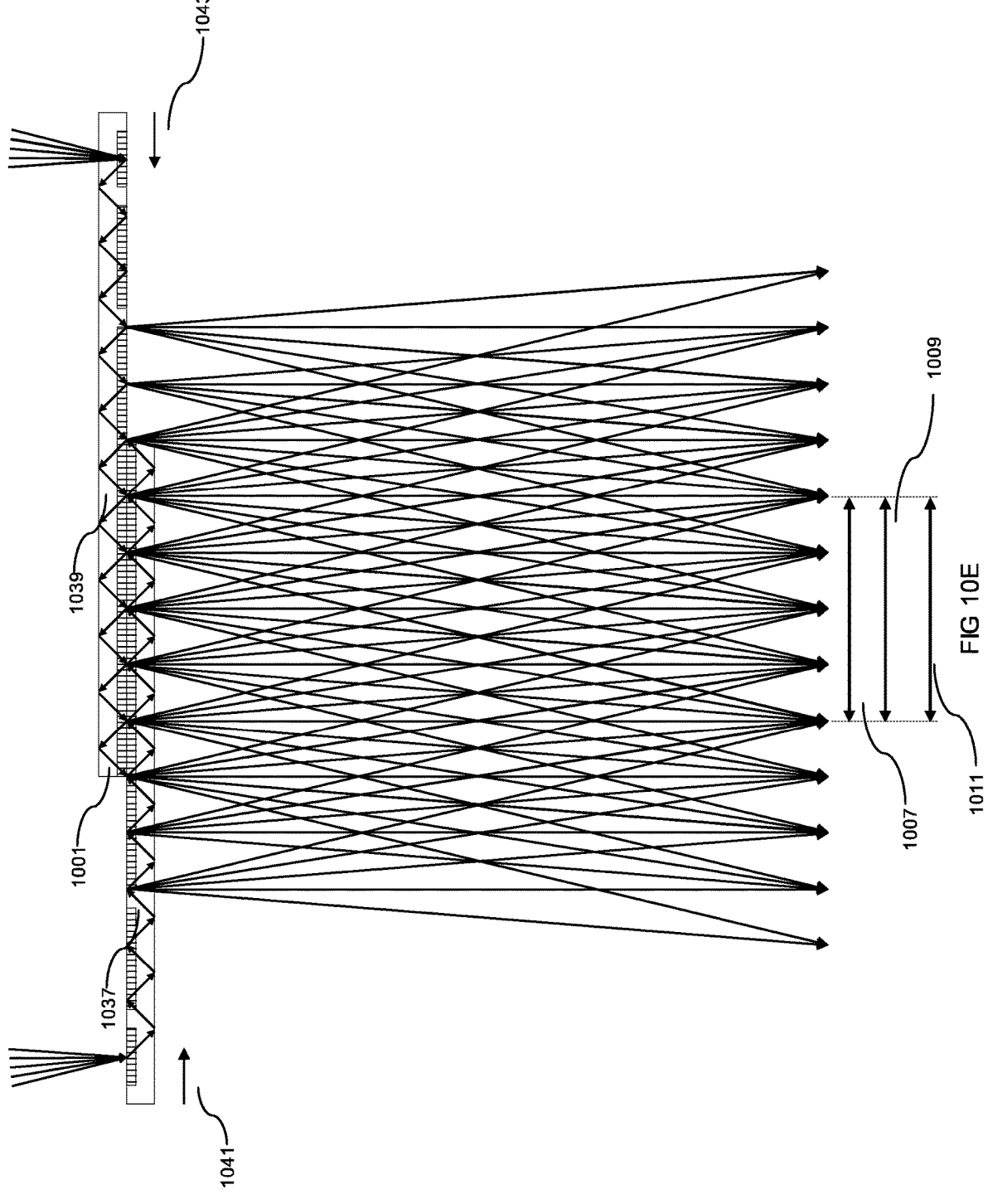

FIG. 10E illustrates the example apparatus 1001 when it is in a fifth relative position of the first light guiding means 101A and the second light guiding means 101B. The fifth relative position is an example other relative position. The first light guiding means 101A is in a fifth position 1037, with the translational movement from the fourth position 1029 illustrated by arrow 1041. The second light guiding means 101B is in a fifth position 1043, with the translational movement from the fourth position 1031 illustrated by arrow 1043.

In FIG. 10E, the size of the combined field-of-view exit pupil has reduced from the size of the combined field-of-view exit pupil in FIG. 10D.

Figure 10F:
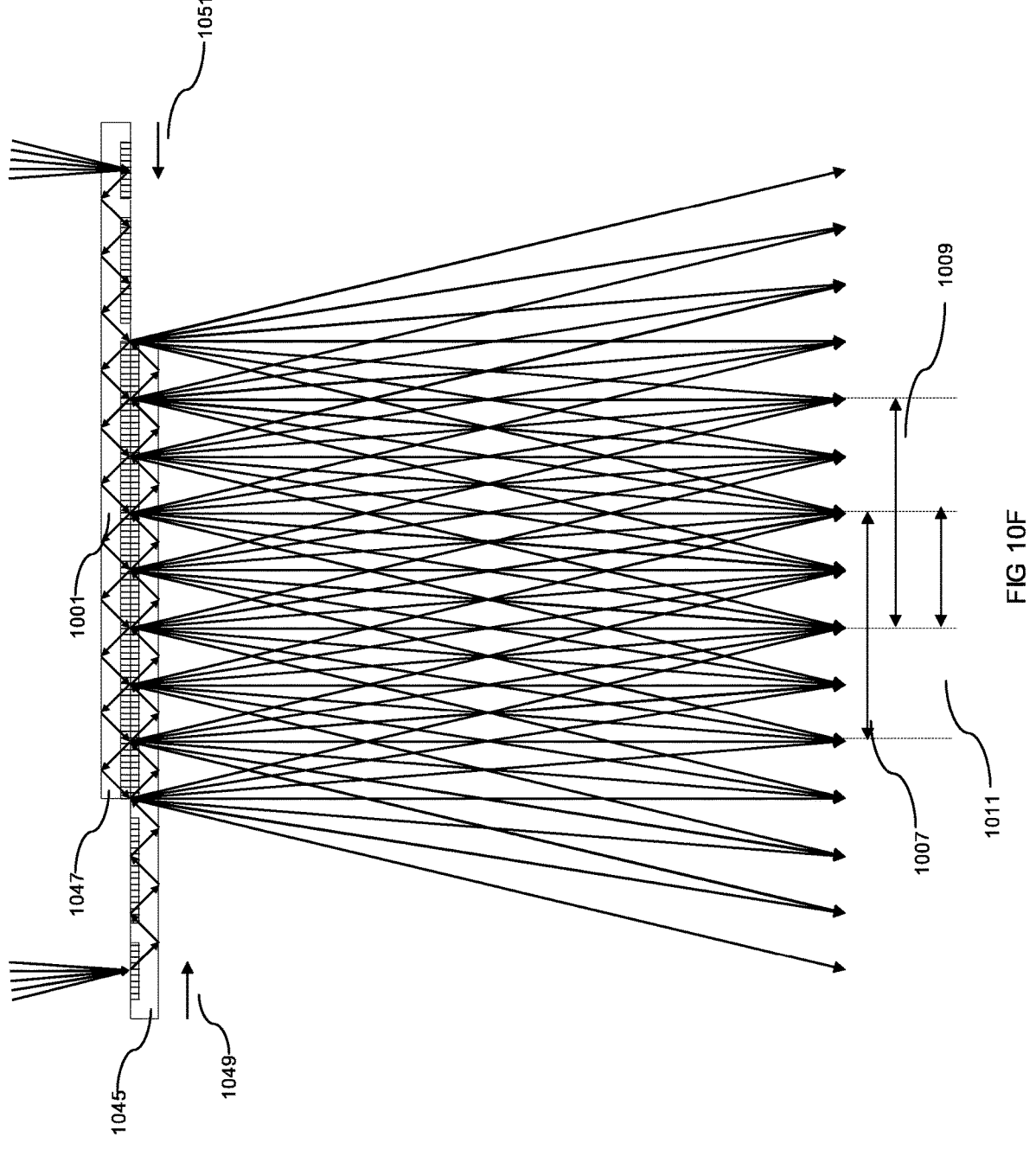

FIG. 10F illustrates the example apparatus 1001 when it is in a sixth relative position of the first light guiding means 101A and the second light guiding means 101B. The sixth relative position is an example other relative position. The first light guiding means 101A is in a sixth position 1045, with the translational movement from the fifth position 1037 illustrated by arrow 1049. The second light guiding means 101B is in a sixth position 1047, with the translational movement from the fifth position 1039 illustrated by arrow 1051.

In this example the first out-coupling diffractive means 107A and the second out-coupling diffractive means 107B are fully overlapping. In FIG. 10F, the size of the combined field-of-view exit pupil has reduced from the size of the combined field-of-view exit pupil in FIG. 10E.

Translationally moving from the second relative position to the at least one other relative position changes the brightness of part of the third image viewed at some viewing positions within the combined field-of-view exit pupil.

In this example, in the third relative position, the fourth relative position, the fifth relative position and the sixth relative position, the first portion 935 of the third image 933 is at increased brightness relative to the rest of the third image in one or more positions within the combined field-of-view exit pupil. The increase in brightness occurs due to the overlap of the first out-coupling diffractive means 107A and the second out-coupling diffractive means 107B.

In FIG. 10C, the first portion 935 is at increased brightness at location 1012. In FIG. 10D, the arrow 1014 illustrates the region of the combined field-of-view exit pupil where the first portion 935 is at increased brightness. In FIG. 10E and FIG. 10F, the first portion 935 is at increased brightness across the entire combined field-of-view exit pupil.

The first light guiding means 101A and the second light guiding means 101B can be moved translationally between any of the second to sixth relative positions.

Figure 11:
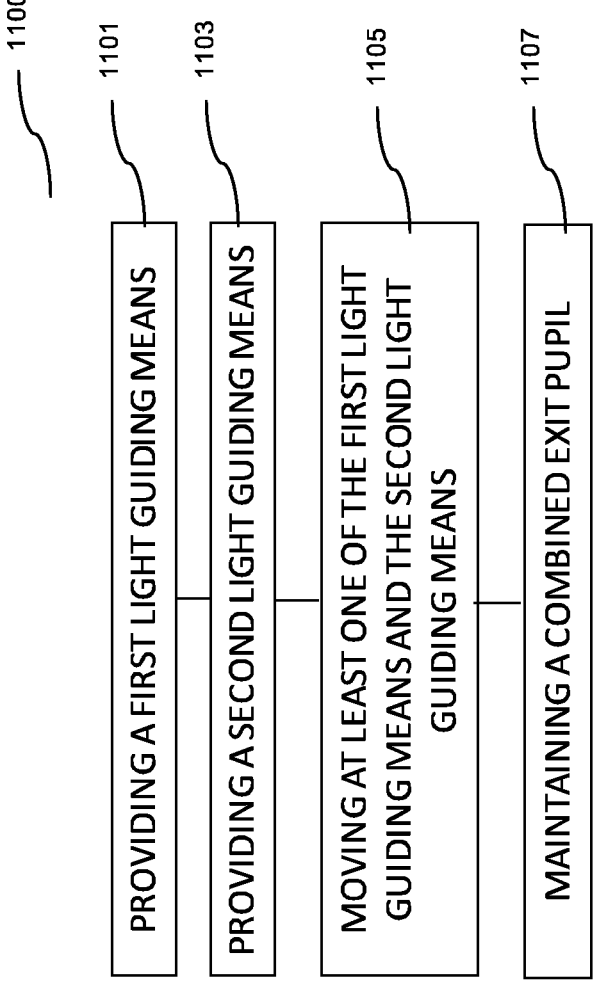
FIG. 11 shows an example method of the subject matter described herein.

FIG. 11 illustrates an example method 1100.

The method comprises: in a first block 1101, providing first light guiding means 101A comprising at least: first in-coupling diffractive means 103A configured to in-couple one or more first input beams of light into the first light guiding means 101A from a first light engine, first expanding means 105A, the first expanding means 105A configured to expand the one or more first input beams of light from the first light engine to form one or more first expanded beams of light, first out-coupling diffractive means 107A configured to out-couple the one or more first expanded beams of light from the first light guiding means 101A.

The method also comprises: in a second block 1103, providing second light guiding means 101B comprising at least: second in-coupling diffractive means 103B configured to in-couple one or more second input beams of light into the second light guiding means 101B from a second light engine, second expanding means 105B configured to expand the one or more second input beams of light from the second light engine to form one or more second expanded beams of light, second out-coupling diffractive means 107B configured to out-couple the one or more second expanded beams of light from the second light guiding means 101B.

The first light guiding means 101A is configured to provide a first image, the second light guiding means is configured to provide a second image 101B.

The method comprises: in a third block 1105: moving at least one of the first light guiding means 101A or second light guiding means 101B between at least two different positions to change the relative position of the first light guiding means 101A and the second light guiding means 101B.

The method also comprises: in a fourth block 1107, maintaining a combined exit pupil formed from out-coupled beams from the first light guiding means 101A and the second light guiding means 101B as the relative position of the first and second light guiding means is changed. In at least a part of the combined exit pupil the image viewed is at least a part of the first image and at least a part of the second image.

FIG. 12A illustrates an example method 1200. The method 1200 corresponds to method 1100 and comprises additional blocks.

Method 1200 comprises block 1201 which corresponds to block 1101 of method 1100.

Method 1200 comprises block 1203 which corresponds to block 1103 of method 1100.

The method 1200 additionally comprises in block 1205: providing the combined exit pupil at a first eye relief distance with a first size, with the first light guiding means 101A and the second light guiding means 101B in a first relative position.

The method 1200 also additionally comprises in block 1207: providing the combined exit pupil at a second eye relief distance with a second size with the first light guiding means 101A and the second light guiding means 101B in the first relative position.

In method 1200, the method comprises block 1209, which corresponds to block 1105 of method 1100. In block 1209, moving at least one of the first or second light guiding means between at least two different positions to change the relative position of the first light guiding means 101A and the second light guiding means 101B comprises: moving at least one of the first light guiding means 101A and the second light guiding means 101B translationally to provide the combined exit pupil at the second eye relief distance at a third size, different to the second size.

In this example the first image and the second image comprise the same image content. In at least a part of the combined exit pupil the image viewed is a combination of a part of the first image and a part of the second image. The part of the first image and the part of the second image that combine to form the viewed image vary depending on the viewing position. The translational movement changes the size of the combined exit pupil and changes the brightness of part of the image viewed in at least some of the viewing positions within the combined exit pupil.

In method 1200, the method comprises block 1211, which corresponds to block 1107 of method 1100. In block 1211, maintaining the combined exit pupil comprises providing the combined exit pupil at the second eye relief distance at the third size.

Figure 12B:
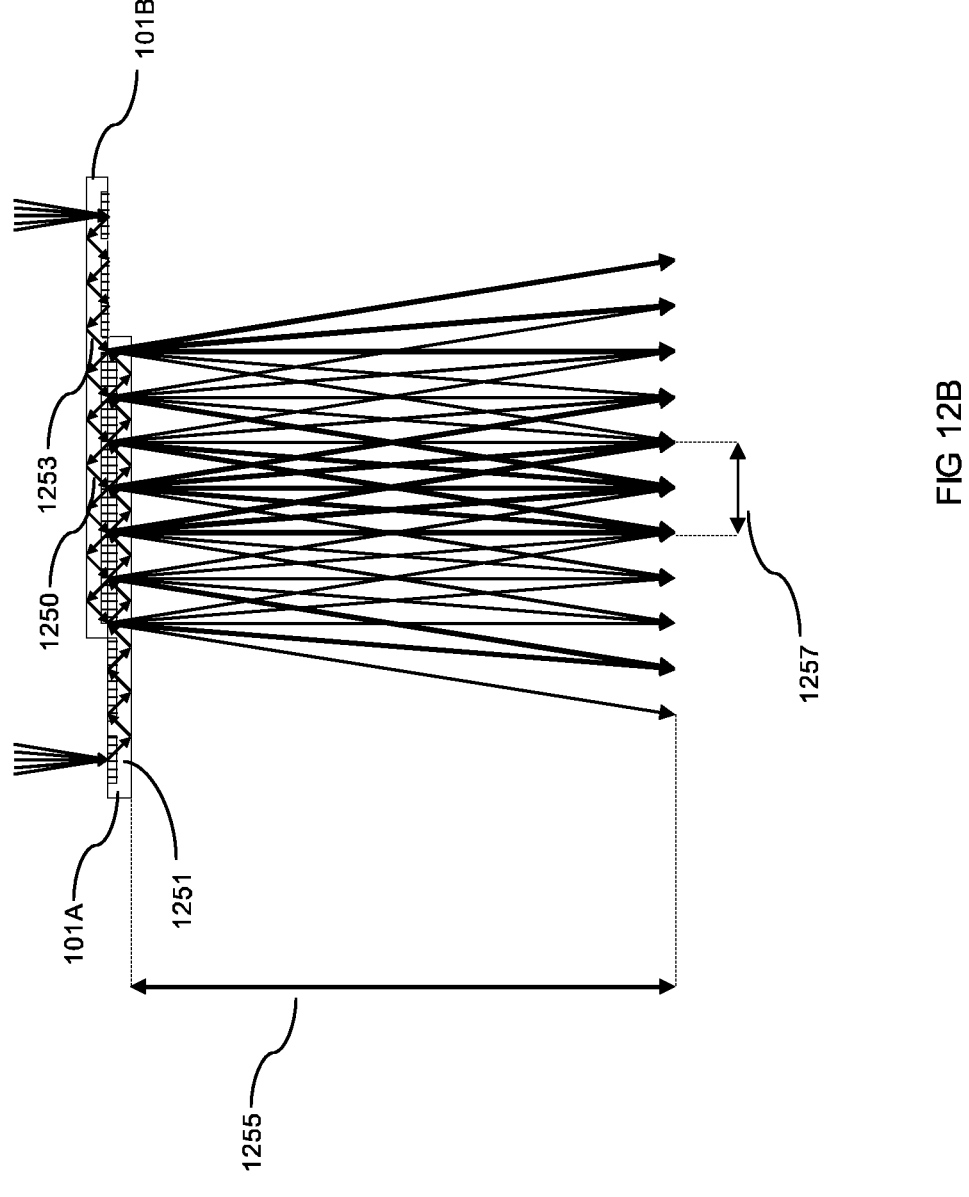
FIGS. 12B-12C show another example apparatus of the subject matter described herein.
Figure 12C:
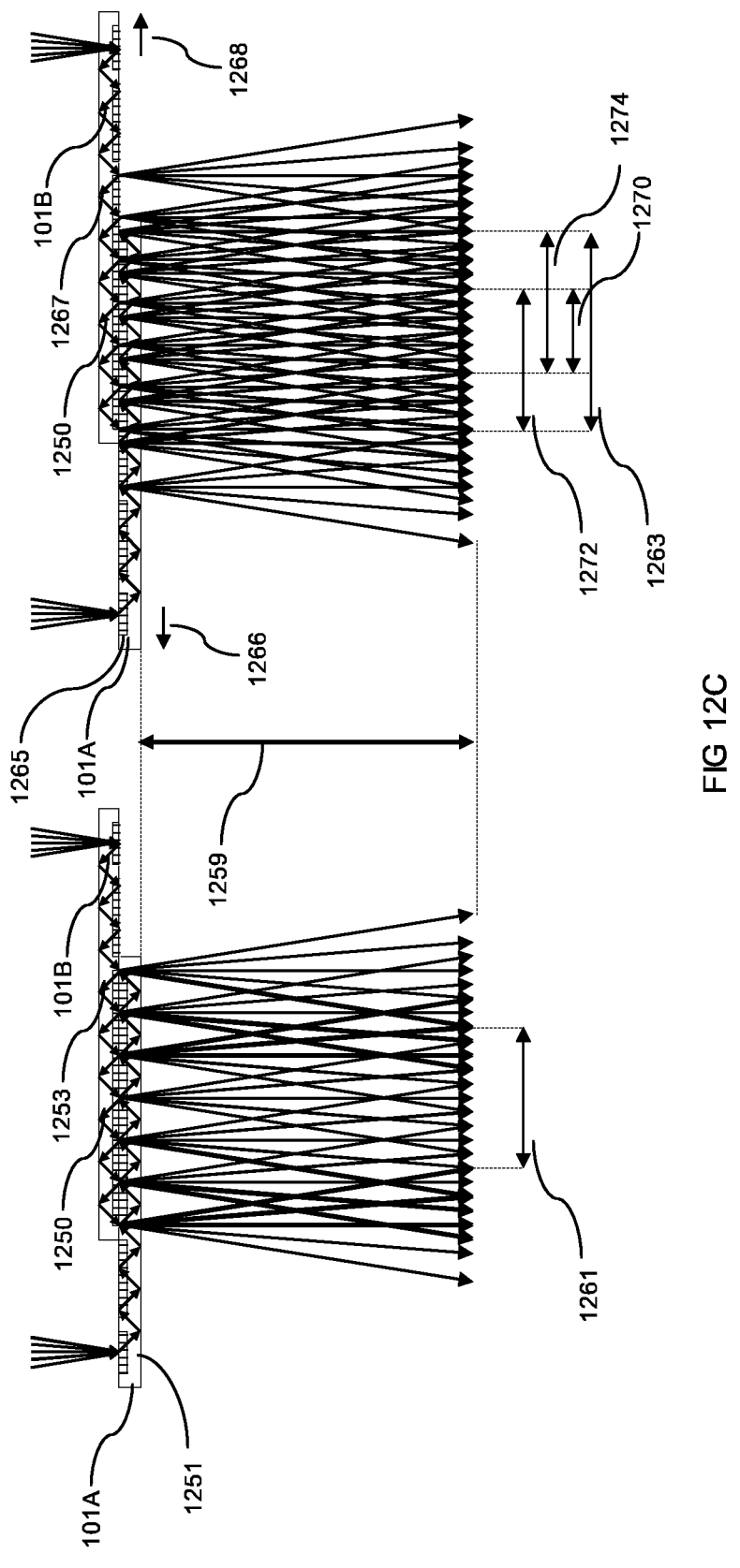

FIGS. 12B and 12C illustrate an example apparatus 1250 that performs the method 1200. In FIG. 12B a combined exit pupil is provided at a first eye relief distance 1255 with a first size, represented by arrow 1257. The first light guiding means 101A and the second light guiding means 101B are in a first relative position, at first positions 1251, 1253 respectively. In FIG. 12B, the images have increased brightness across the whole image for all viewing positions within the combined exit pupil, because of the first out-coupling diffractive means 107A and the second out-coupling diffractive means 107B being fully overlapped.

FIG. 12C illustrates the example apparatus 1250, where it provides the combined exit pupil at a second eye relief distance 1259. On the left of FIG. 12C, the combined exit pupil is provided with a second size, represented by arrow 1261 at the second eye relief distance 1259. The first light guiding means 101A and the second light guiding means 101B are in the first relative position, with the first light guiding means at first position 1251 and the second light guiding means 101B at the first position 1253.

FIG. 12C illustrates changing the relative position of the first light guiding means 101A and the second light guiding means 101B to a second relative position by moving at least one of the first light guiding means 101A and a second light guiding means 101B translationally to provide the combined exit pupil at the second eye relief distance 1259 at a third size 1263. As illustrated on the right of FIG. 12C, the first light guiding means 101A has moved to second position 1265 and the second light guiding means 101B has moved to second position 1267. Translational movement from the first positions 1251, 1253 is illustrated by arrows 1266, 1268 respectively. The third size 1263 is different to the second size 1261. In this example the third size 1263 is larger than the second size 1261. This provides the advantage that if a user changes their eye relief distance, the apparatus 1250 can optimize the size of the combined exit pupil for the change in eye relief distance.

With the first light guiding means 101A and the second light guiding means 101B in the second relative position, within an increased brightness region of the combined exit pupil, illustrated by arrow 1270, the images have increased brightness across the whole image for all viewing positions within the increased brightness region.

The exit pupil of the first light guiding means 101A is illustrated by arrow 1272, and the exit pupil of the second light guiding means 101B is illustrated by arrow 1274.

Figure 13A:
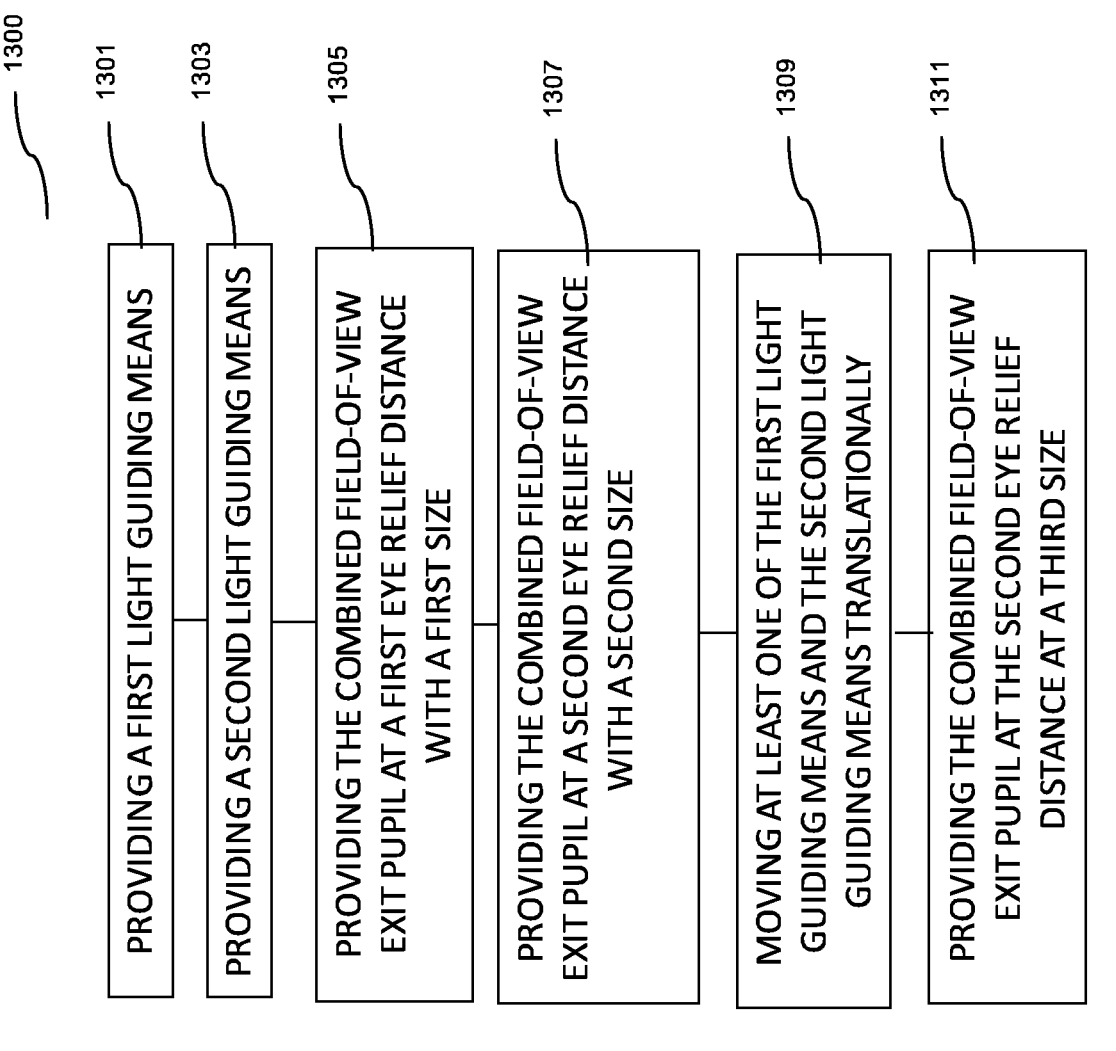
FIG. 13A shows an example method of the subject matter described herein.

FIG. 13A illustrates an example method 1300.

In method 1300, the combined exit pupil is a combined field-of-view exit pupil. The first image and the second image comprise image content which is at least partially different. In the combined field-of-view exit pupil, the image viewed is a third image. The third image is a combination of the first image and the second image. The third image has a larger field-of-view than the field-of-view of first image or the field-of-view of the second image.

Method 1300 comprises block 1301 which corresponds to block 1101 of method 1100.

Method 1300 comprises block 1303 which corresponds to block 1103 of method 1100.

The method 1300 additionally comprises in block 1305: providing the combined field-of-view exit pupil at a first eye relief distance with the first size, with the first light guiding means and the second light guiding means in a first relative position.

The method 1300 also additionally comprises in block 1307: providing the combined field-of-view exit pupil at a second eye relief distance with a second size with the first light guiding means 101A and the second light guiding means 101B in the first relative position.

In method 1300, the method comprises block 1309, which corresponds to block 1105 of method 1100. In block 1309, moving at least one of the first or second light guiding means between at least two different positions to change the relative position of the first light guiding means and the second light guiding means comprises: moving at least one of the first light guiding means 101A and the second light guiding means 101B translationally to provide the combined field-of-view exit pupil at the second eye relief distance at a third size, different to the second size.

In method 1300, the method comprises block 1311, which corresponds to block 1107 of method 1100. In block 1311, maintaining the combined exit pupil comprises providing the combined field-of-view exit pupil at the second eye relief distance at the third size.

Figure 13B:
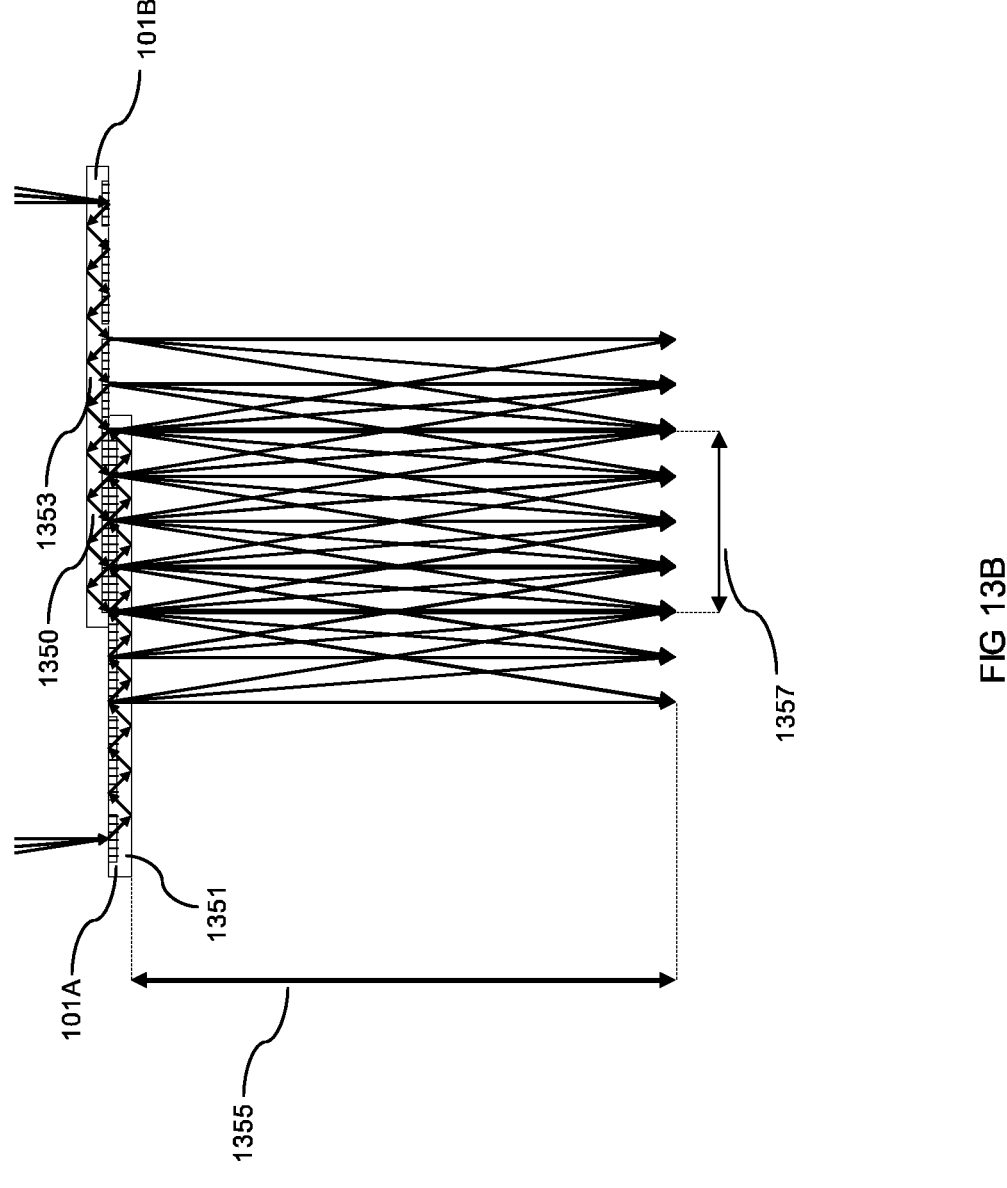
FIGS. 13B-13C show another example apparatus of the subject matter described herein.
Figure 13C:
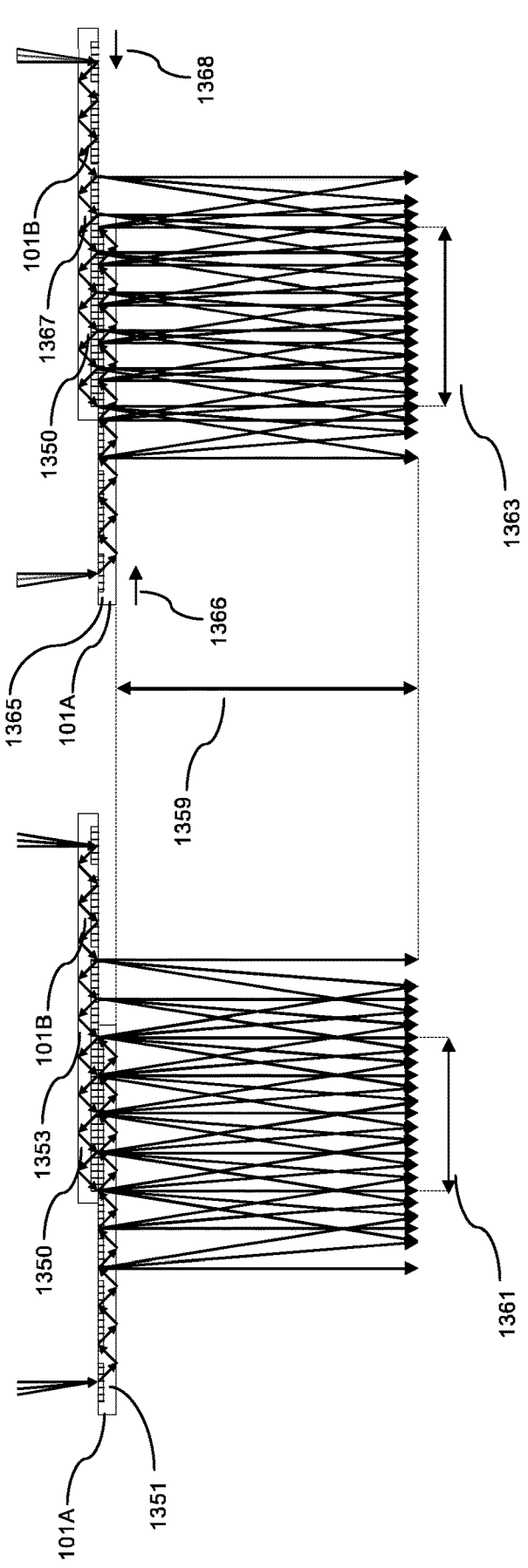

FIGS. 13B and 13C illustrate an example apparatus 1350 that performs the method 1300. In FIG. 13B a combined field-of-view exit pupil is provided at a first eye relief distance 1355 with a first size, represented by arrow 1357. The first light guiding means 101A and the second light guiding means 101B are in a first relative position, at first positions 1351, 1353 respectively.

FIG. 13C illustrates the example apparatus 1350, where it provides the combined exit pupil at a second eye relief distance 1359. On the left of FIG. 13C, the combined field-of-view exit pupil is provided with a second size, represented by arrow 1361 at the second eye relief distance 1359. The first light guiding means 101A and the second light guiding means 101B are in the first relative position, with the first light guiding means at first position 1351 and the second light guiding means 101B at the first position 1353.

FIG. 13C illustrates changing the relative position of the first light guiding means 101A and the second light guiding means 101B to a second relative position by moving at least one of the first light guiding means 101A and a second light guiding means 101B translationally to provide the combined field-of-view exit pupil at the second eye relief distance 1359 at a third size 1363. As illustrated on the right of FIG. 13C, the first light guiding means 101A has moved to second position 1365 and the second light guiding means 101B has moved to second position 1367. Translational movement from the first positions 1351, 1353 is illustrated by arrows 1366, 1368 respectively. The third size 1363 is different to the second size 1361. In this example the third size 1363 is larger than the second size 1361. This provides the advantage that if a user changes their eye relief distance, the apparatus 1350 can optimize the size of the combined field-of-view exit pupil for the change in eye relief distance.

Figure 14A:
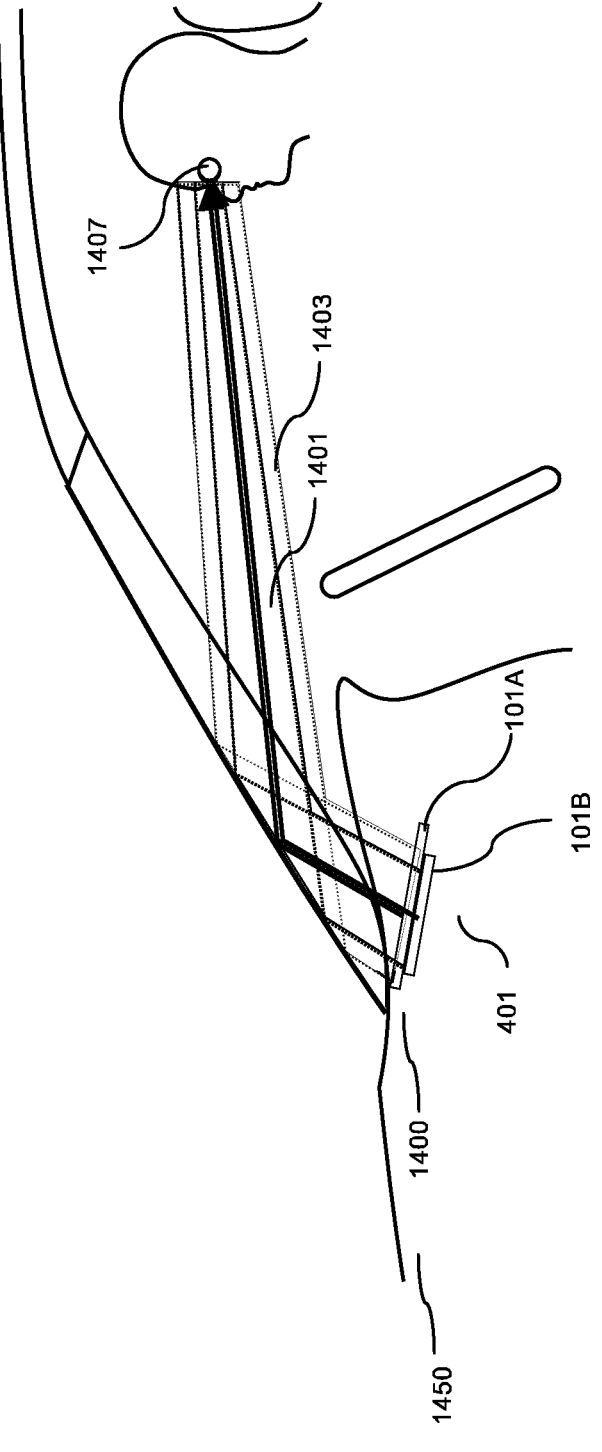
FIGS. 14A-14B show an example device of the subject matter described herein.

FIG. 14A illustrates an example head-up display device 1400 comprising the apparatus 401. In this example, a vehicle 1450 comprises the head-up display device 1400. The images viewable from the device 1400 are reflected off the windscreen of the vehicle.

In this example the user's eye 1407 is situated within the combined exit pupil. In this example, the user's eye 1407 is within the exit pupil of the first light guiding means 101A, which is represented by region 1403, and is also within the exit pupil of the second light guiding means 101B, which is represented by region 1401. In this example, the user's eye 1407 is located centrally within the exit pupil of the second light guiding means 101B, and so the user sees an image which has increased brightness across the whole image. The arrows in FIG. 14A represent example light beams that the user observes.

Figure 14B:
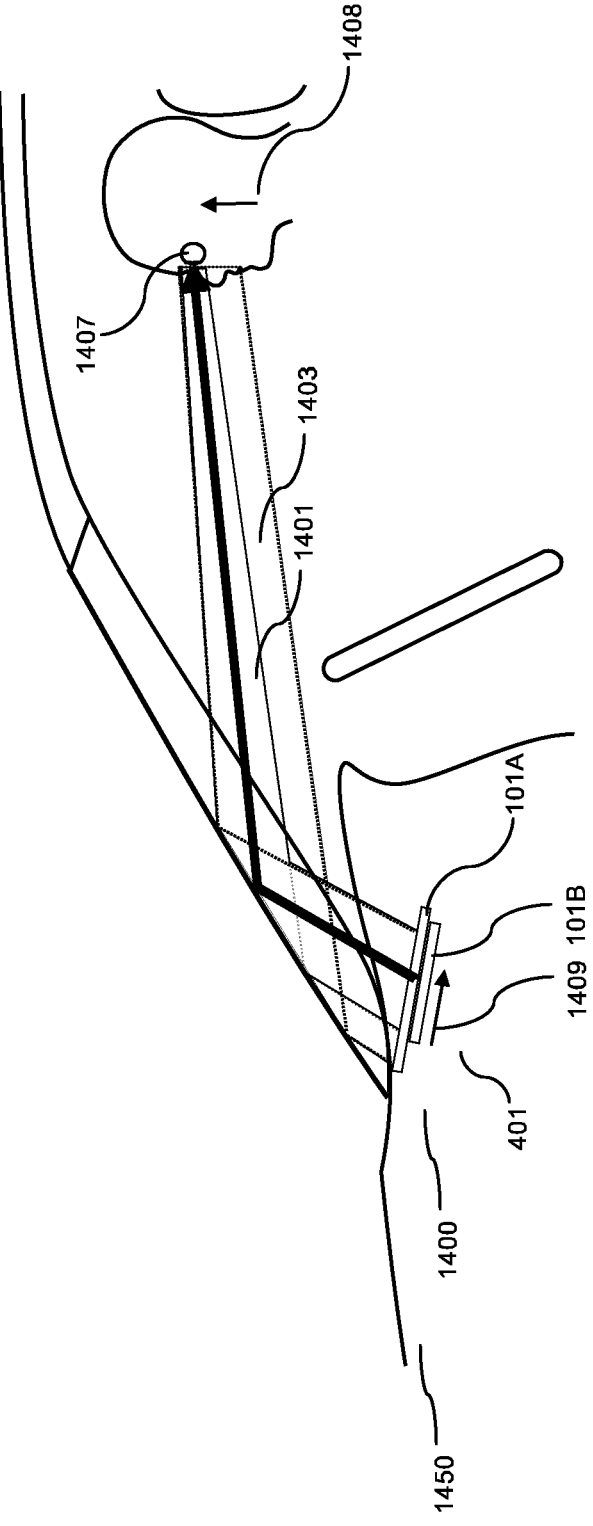

FIG. 14B illustrates the example head-up display 1400 after the user's eye 1407 has moved upwards as illustrated by arrow 1408. As illustrated in FIG. 14B, the second light guiding means 101B has been moved translationally, as illustrated by arrow 1409 to adjust the position of the exit pupil of the second light guiding means 101B. In FIG. 14B, the user's eye 1407 is located within the combined exit pupil and is also located centrally within the exit pupil of the second light guiding means 101B. Therefore although the user has moved upwards, the device 1400 has adjusted so that the user sees the same image with increased brightness across the entire image.

Figure 15A:
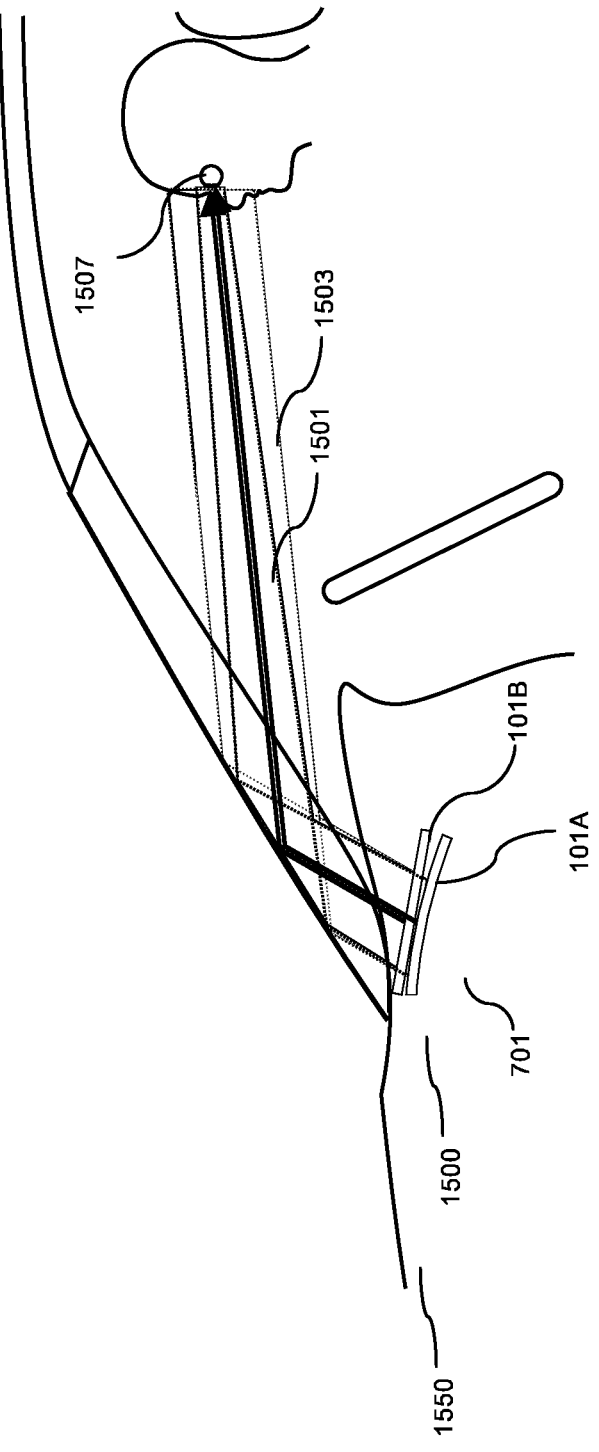
FIGS. 15A-15B show an example device of the subject matter described herein.

FIG. 15A illustrates an example head-up display device 1500 which comprises the apparatus 701. In this example, a vehicle 1550 comprises the head-up display device 1500. The images viewable from the device 1500 are reflected off the windscreen of the vehicle.

The user's eye 1507 is situated within the combined exit pupil so that the user can see a combined image which is a combination of the entire first image and entire second image. The exit pupil of the first light guiding means 101A is illustrated by region 1503. The exit pupil of the second light guiding means 101B is illustrated by region 1501.

Figure 15B:
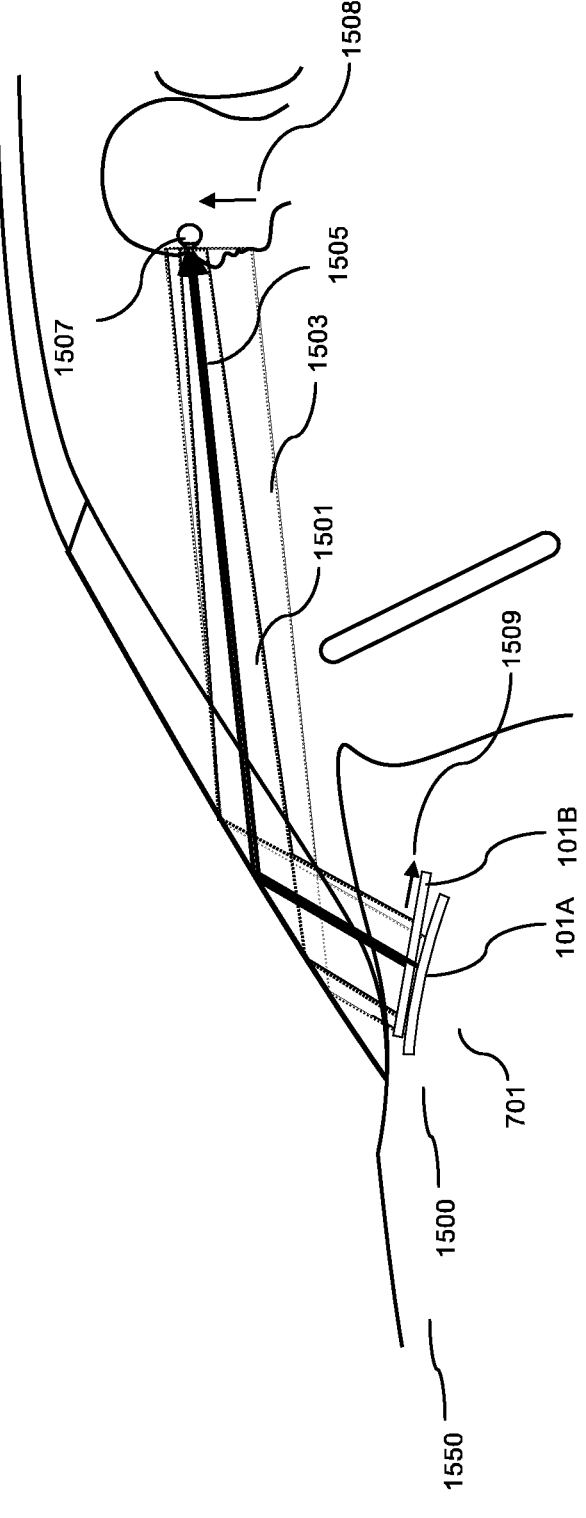

FIG. 15B illustrates the head-up display device 1500. In FIG. 15B the user's eye 1507 has moved upwards as illustrated by arrow 1508. The second light guiding means 101B has been moved translationally, as illustrated by arrow 1509 to move the position of the combined exit pupil. This enables the combined exit pupil to be placed at the position of the user's eye 1507 in FIG. 15B so that the user can still see a combined image which is a combination of the entire first image and entire second image.

Figure 16A:
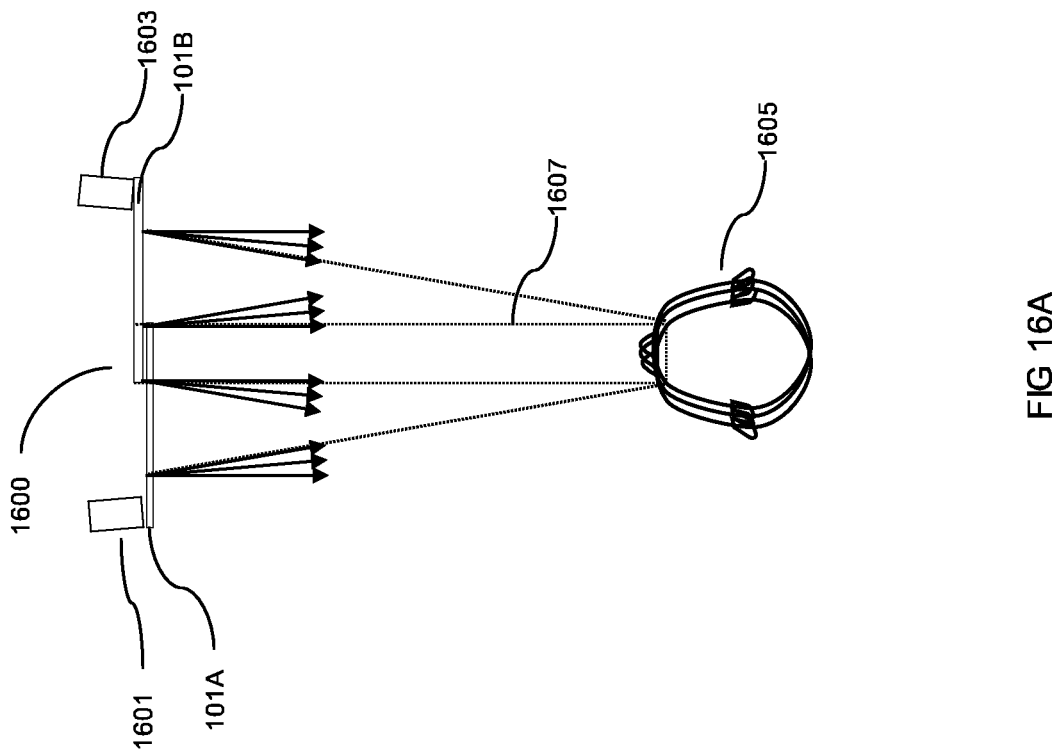
FIGS. 16A-16B show an example device of the subject matter described herein.

FIG. 16A illustrates an example head-up display device 1600 which comprises the apparatus 1350. In this example, the head-up display device 1600 comprises the first light engine 1601 and the second light engine 1603. In FIG. 16A, the user 1605 is situated so that they can view the third image viewed within the combined field-of-view exit pupil, which is represented by region 1607.

The head-up display device 1600 can perform the method 1300. Therefore, as the user moves from a first eye relief distance to a second eye relief distance, the combined field-of-view exit pupil at the second eye relief distance has the second size. The user's movement to the second eye relief distance is represented by arrow 1608 in FIG. 16B.

Figure 16B:
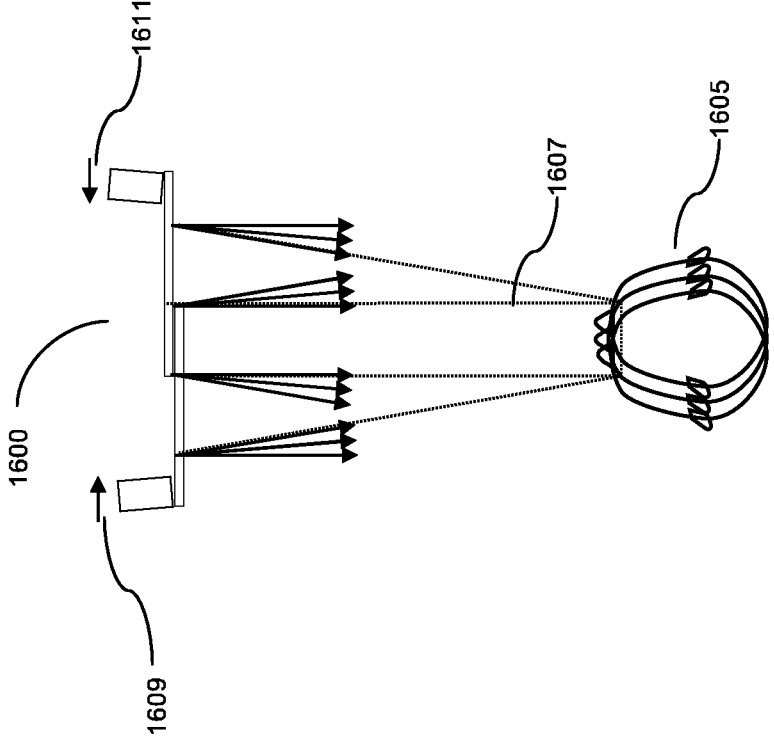
Figure 16B:
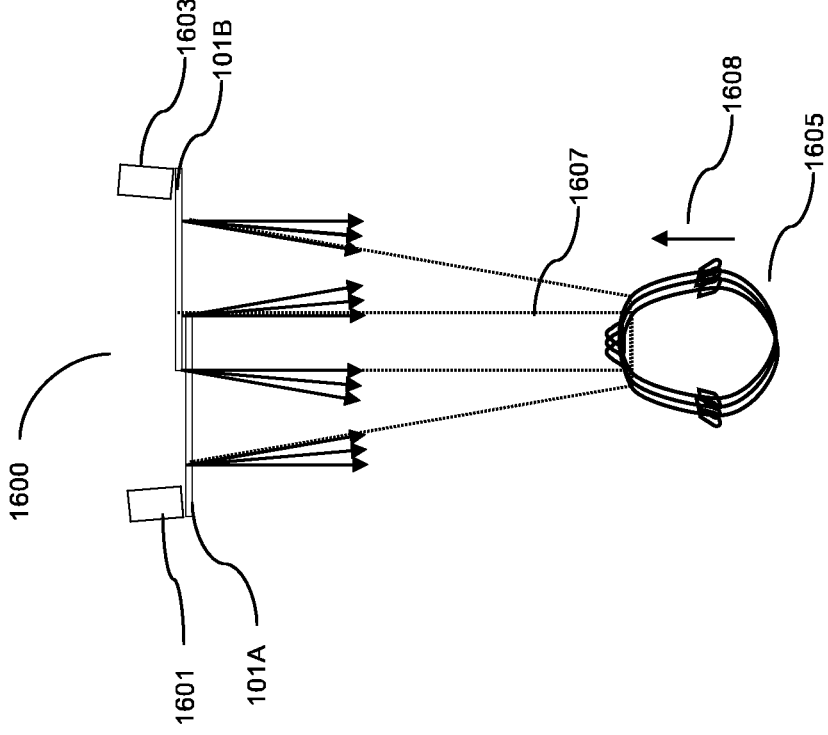

In FIG. 16B, the relative position of the first light guiding means 101A and the second light guiding means 101B is moved which changes the size of the combined field-of-view exit pupil at the second eye relief distance to a third size, which in this example is greater than the second size. The movement of the first light guiding means 101A and the second light guiding means 101B is represented by arrows 1609, 1611 respectively. Therefore, the head-up display device 1600 can optimize the size of the combined field-of-view exit pupil as the user moves from a first eye relief distance to the second eye relief distance. FIGS. 16A, 16B illustrate the different positions the user 1605 can view the third image. As illustrated on the right of FIG. 16B, the user 1605 can see the third image in more viewing positions than the left of FIG. 16B.

In the examples shown, the first light guiding means 101A and the second light guiding means 101B can be stacked when they are configured to move translationally relative to one another.

In the examples illustrated translational movement can be the movement which is parallel to the planar surfaces of the substrates 209, 211.

In the examples illustrated, translational movement to change the relative position of the first light guiding means 101A and the second light guiding means 101B comprises moving either one or both of the first light guiding means 101A and the second light guiding means 101B. In examples where one of the light guiding means is moved, it is also possible to move both the first light guiding means 101A and the second light guiding means 101B. In examples where both of the light guiding means are moved, it is also possible to move one the first light guiding means 101A and the second light guiding means 101B.

In the examples illustrated, the light engines are not shown. It should be noted that their position and orientation in the examples is fixed with the respective light guiding means. Together with the motion of the light guiding means, also the light engines will move in a similar way.

In some examples, the example apparatus 201, 301, 401, 501, 601, 701, 801, 901, 1001, 1250, 1350 comprise the first light engine and the second light engine. The apparatus 501 can comprise the third light engine.

Any suitable means can be provided to enable the first light guiding means 101A and the second light guiding means 101B to move as described in the previous examples. For example, for the translational movement, the first light guiding means 101A and the second light guiding means 101B may be attached together and one or both of the first light guiding means 101A and the second light guiding means 101B can roll on rails, sliders or bearings to change their relative position. Actuators can be used to cause the movement and the first or second light guiding means may be mounted on the actuators to enable the movement. For example, step motors, electromechanical components could be used.

The rotational movement can be provided by mounting the first light guiding means and the second light guiding means on actuators. For example, hinges, step motors, electromechanical components could be used.

In the examples illustrated, where the image content of the first image and the second image comprise the same image content, or comprise portions which have the same image content, this can mean that the image content contains the same high-level features. It can mean that the image content is identical.

The combined exit pupils and combined field-of-view exit pupils described herein may be referred to as multiplexing the exit pupils and/or field-of-views of the individual first light guiding means 101A and the second light guiding means 101B.

In all the examples, only one light guiding means is required to achieve full color output from the system. Nonetheless, the examples are also compatible with solutions where multiple light guiding means are required for multiplexing the colors.

In other examples, the heads-up display device or module is configured to reflect the outcoupled light from the apparatus off the windscreen of the vehicle so that the distortion created by the curved windscreen is being compensated in the heads-up display device or module by some means. Examples of these compensation means include using additional lenses or Fresnel lenses to alter the collimation of the outcoupled light, some holographic solutions to do the same, or some other means to do the same, in order from the outcoupled and compensated light from the apparatus off the windscreen of the vehicle to produce a collimated or focused virtual image reaching the user. The compensation means can be implemented either separately for the different outcoupling diffractive means or together for the whole combined and continuous out-coupling projected area.

Related to any of the above examples, the required rotational and/or translational adjustment may be manual or motorized, controlled manually or automatically. The settings may be based on factory calibration, user calibration, as part of other cockpit adjustments, on the fly during driving, based on ADAS information, etc.

The blocks illustrated in the FIGS. 11, 12A, 13A may represent steps in a method and/or sections of code in a computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
   a first light waveguide comprising at least: a first in-coupling diffraction grating configured to in-couple one or more first input beams of light into the first light waveguide from a first light engine, a first expander configured to expand the one or more first input beams of light from the first light engine to form one or more first expanded beams of light, a first out-coupling diffraction grating configured to out-couple the one or more first expanded beams of light from the first light waveguide; and
   a second light waveguide comprising at least: a second in-coupling diffraction grating configured to in-couple one or more second input beams of light into the second light waveguide from a second light engine, a second expander configured to expand the one or more second input beams of light from the second light engine to form one or more second expanded beams of light, a second out-coupling diffraction grating configured to out-couple the one or more second expanded beams of light from the second light waveguide;
   wherein the first light waveguide is configured to provide a first image, and the second light waveguide is configured to provide a second image;
   wherein the apparatus is configured so that at least one of the first light waveguide or the second light waveguide can be moved between at least two different positions to change the relative positions of the first light waveguide and the second light waveguide;
   wherein the apparatus is configured to maintain a combined exit pupil formed from outcoupled beams from the first light waveguide and the second light waveguide as the relative positions of the first light waveguide and second light waveguide are changed; and
   wherein within at least a part of the combined exit pupil the image viewed is at least a part of the first image and at least a part of the second image.

2. An apparatus as claimed in claim 1, wherein the movement of at least one of the first light waveguide or the second light waveguide between at least two different positions comprises translational movement.

3. An apparatus as claimed in claim 2, wherein the first image and second image comprise the same image content, wherein in at least a part of the combined exit pupil the image viewed is a combination of a part of the first image and a part of the second image, wherein the part of the first image and the part of the second image that combine to form the viewed image vary depending on the viewing position; wherein the translational movement changes the size of the combined exit pupil and changes the brightness of part of the image viewed in at least some of the viewing positions within the combined exit pupil.

4. An apparatus as claimed in claim 2, wherein the combined exit pupil is a combined field-of-view exit pupil, wherein within the combined field-of-view exit pupil, the image viewed is a third image, wherein the third image is a combination of the first image and the second image, wherein the third image has a larger field-of-view than the field-of-view of first image or the field-of-view of the second image;

wherein the translational movement changes the size of the combined field-of-view exit pupil.

5. An apparatus as claimed in claim 2, wherein the first image and second image comprise the same image content, wherein in at least a part of the combined exit pupil the image viewed is a combination of a part of the first image and a part of the second image, wherein the part of the first image and the part of the second image that combine to form the viewed image vary depending on the viewing position; wherein the translational movement from a first relative position of the first light waveguide and the second light waveguide to a second relative position changes the brightness of part of the image viewed in some of the viewing positions within the combined exit pupil.

6. An apparatus as claimed in claim 2, wherein the apparatus comprises a third light waveguide comprising at least: a third in-coupling diffraction grating configured to in-couple one or more third input beams of light into the third light waveguide from a third light engine, a third expander configured to expand the one or more third input beams of light from the third light engine to form one or more third expanded beams of light, a third out-coupling diffraction grating configured to out-couple the one or more third expanded beams of light from the third light waveguide;

wherein the third light waveguide provides a third image;
wherein the first image, the second image, and the third image comprise the same image content;
wherein outcoupled beams from the first light waveguide and the third light waveguide provide a second combined exit pupil,
wherein within a part of the second combined exit pupil, the image viewed is a combination of a part of the first image and a part of the third image, wherein the part of the first image and the part of the third image that combine to form the viewed image vary depending on the viewing position; and
wherein the apparatus is configured so that the second light waveguide can move translationally relative to the first light waveguide and the third light waveguide, wherein the translational movement of the second light waveguide from a first position to a second position changes the brightness of part of the image viewed at some viewing positions within the second combined exit pupil.

7. An apparatus as claimed in claim 2, wherein the first light waveguide provides the first image at a finite distance focus, wherein the second light waveguide provides the second image at infinite distance focus, wherein the apparatus is configured so that the second light waveguide can move between at least two different positions, wherein the position of the combined exit pupil changes between the at least two different positions of the second light waveguide.

8. An apparatus as claimed in claim 1, wherein the movement of at least one of the first light waveguide or the second light waveguide between at least two different positions comprises rotational movement of the first light waveguide or the second light waveguide.

9. An apparatus as claimed in claim 8, wherein in a first relative position of the first light waveguide and the second light waveguide, the first image and the second image comprise the same image content and in at least a part of the combined exit pupil the image viewed is a combination of a part of the first image and a part of the second image, wherein the part of the first image and the part of the second image that combine to form the viewed image vary depending on the viewing position;

wherein in a second relative position of the first light waveguide and the second light waveguide, the first image and the second image comprise image content which is at least partially different and the combined exit pupil is a combined field-of-view exit pupil, wherein within the combined field-of-view exit pupil, the image viewed is a third image, wherein the third image is a combination of the first image and the second image, wherein the third image has a larger field-of-view than the field-of-view of first image or the field-of-view of the second image; and
wherein in the second relative position the first light waveguide and the second light waveguide have rotated from their positions in the first relative position.

10. An apparatus as claimed in claim 9, wherein the apparatus is configured so that when the first light waveguide and the second light waveguide are in the second relative position at least one of the first light waveguide or the second light waveguide can move translationally, so that the first light waveguide or the second light waveguide can move translationally between being in the second relative position to at least one other relative position;

wherein the image content of the first image remains the same between the second relative position and the at least one other relative position;
wherein the image content of the second image remains the same between the second relative position and the at least one other relative position;
wherein within the second relative position and the at least one other relative position the first light waveguide and the second light waveguide are arranged so that in the combined field-of-view exit pupil a portion of the first image and a portion of the second image overlap and align; and
wherein translationally moving from the second relative position to the at least one other relative position changes the size of the combined field-of-view exit pupil.

11. An apparatus as claimed in claim 10, wherein translationally moving from the second relative position to the at least one other relative position changes the brightness of part of the third image viewed at some viewing positions within the combined field-of-view exit pupil.

12. A head-up-display device comprising the apparatus of claim 1.

13. A method, comprising:
providing a first light waveguide comprising at least: a first in-coupling diffraction grating configured to in-couple one or more first input beams of light into the first light waveguide from a first light engine, a first expander configured to expand the one or more first input beams of light from the first light engine to form one or more first expanded beams of light, a first out-coupling diffraction grating configured to out-couple the one or more first expanded beams of light from the first light waveguide; and providing a second light waveguide comprising at least: a second in-coupling diffraction grating configured to in-couple one or more second input beams of light into the second light waveguide from a second light engine, a second expander configured to expand the one or more second input beams of light from the second light engine to form one or more second expanded beams of light, a second out-coupling diffraction grating configured to out-couple the one or more second expanded beams of light from the second light waveguide;

wherein the first light waveguide is configured to provide a first image, and the second light waveguide is configured to provide a second image;

moving at least one of the first light waveguide or second light waveguide between at least two different positions to change the relative position of the first light waveguide or the second light waveguide;

maintaining a combined exit pupil formed from out-coupled beams from the first light waveguide and the second light waveguide as the relative position of the first light waveguide and second light waveguide is changed; and wherein within at least a part of the combined exit pupil the image viewed is at least a part of the first image and at least a part of the second image.

14. An method as claimed in claim 13, wherein the movement of at least one of the first light waveguide or the second light waveguide between at least two different positions comprises translational movement, wherein the first image and second image comprise the same image content, wherein in at least a part of the combined exit pupil the image viewed is a combination of a part of the first image and a part of the second image, wherein the part of the first image and the part of the second image that combine to form the viewed image vary depending on the viewing position; wherein the translational movement changes the size of the combined exit pupil and changes the brightness of part of the image viewed in at least some of the viewing positions within the combined exit pupil, wherein the method additionally comprises:

providing the combined exit pupil at a first eye relief distance with a first size, with the first light waveguide and the second light waveguide in a first relative position; and providing the combined exit pupil at a second eye relief distance with a second size with the first light waveguide and the second light waveguide in the first relative position;

wherein moving at least one of the first light waveguide or the second light waveguide between at least two different positions to change the relative position of the first light waveguide and the second light waveguide comprises: moving at least one of the first light waveguide or the second light waveguide translationally to provide the combined exit pupil at the second eye relief distance at a third size, different to the second size; and wherein maintaining the combined exit pupil comprises providing the combined exit pupil at the second eye relief distance at the third size.

15. A method as claimed in claim 13, wherein the movement of at least one of the first light waveguide or the second light waveguide between at least two different positions comprises translational movement, wherein the first image and the second image comprise image content which is at least partially different and the combined exit pupil is a combined field-of-view exit pupil, wherein in the combined field-of-view exit pupil, the image viewed is a third image, wherein the third image is a combination of the first image and the second image, wherein the third image has a larger field-of-view than the field-of-view of first image or the field-of-view of the second image;

wherein the translational movement changes the size of the combined field-of-view exit pupil; and wherein the method additionally comprises:

providing the combined field-of-view exit pupil at a first eye relief distance with a first size with the first light waveguide and the second light waveguide in a first relative position; and providing the combined field-of-view exit pupil at a second eye relief distance with a second size with the first light waveguide and the second light waveguide in the first relative position;

wherein moving at least one of the first light waveguide or the second light waveguide between at least two different positions to change the relative position of the first light and waveguide or the second light waveguide comprises: moving at least one of the first light waveguide or the second light waveguide translationally to provide the combined field-of-view exit pupil at the second eye relief distance at a third size, different to the second size; and wherein maintaining the combined exit pupil comprises providing the combined field-of-view exit pupil at the second eye relief distance at the third size.

\* \* \* \* \*